United States Patent
Kim et al.

(10) Patent No.: US 11,556,239 B1
(45) Date of Patent: Jan. 17, 2023

(54) INTERACTIVE AIR VENT CONTROL INTERFACE

(71) Applicant: Tesla, Inc., Palo Alto, CA (US)

(72) Inventors: Andrew Kim, Los Angeles, CA (US); Franz von Holzhausen, Malibu, CA (US)

(73) Assignee: Tesla, Inc., Austin, TX (US)

( * ) Notice: Subject to any disclaimer, the term of this patent is extended or adjusted under 35 U.S.C. 154(b) by 462 days.

(21) Appl. No.: 16/144,142

(22) Filed: Sep. 27, 2018

Related U.S. Application Data

(60) Provisional application No. 62/711,330, filed on Jul. 27, 2018.

(51) Int. Cl.
*G06F 3/0488* (2022.01)
*G06F 3/04886* (2022.01)
*G06F 3/04847* (2022.01)
*B60H 1/00* (2006.01)
*B60H 1/34* (2006.01)
*G05D 23/19* (2006.01)

(52) U.S. Cl.
CPC ....... *G06F 3/0488* (2013.01); *B60H 1/00871* (2013.01); *B60H 1/00985* (2013.01); *B60H 1/345* (2013.01); *G05D 23/1917* (2013.01); *G06F 3/04847* (2013.01); *G06F 3/04886* (2013.01)

(58) Field of Classification Search
CPC .............. G06F 3/0488; G06F 3/04847; G06F 3/04886; G05D 23/1917; B60H 1/00985; B60H 1/00871; B60H 1/345
See application file for complete search history.

(56) References Cited

U.S. PATENT DOCUMENTS

| | | | |
|---|---|---|---|
| 2003/0007017 A1* | 1/2003 | Laffey | G06F 3/04812 715/862 |
| 2005/0212756 A1* | 9/2005 | Marvit | G06F 3/0325 345/156 |
| 2008/0122799 A1* | 5/2008 | Pryor | G06F 3/04847 345/173 |
| 2010/0058244 A1* | 3/2010 | Wang | G06F 3/0482 715/838 |
| 2011/0148917 A1* | 6/2011 | Alberth, Jr. | G09G 5/14 345/629 |
| 2013/0194228 A1* | 8/2013 | Tuzar | B60K 37/06 345/174 |
| 2014/0068477 A1* | 3/2014 | Roh | G06F 3/04886 715/765 |
| 2014/0232739 A1* | 8/2014 | Kim | G09G 5/14 345/592 |
| 2015/0094865 A1* | 4/2015 | Choi | G06F 3/0488 700/278 |
| 2015/0328958 A1* | 11/2015 | Winget, Jr. | B60H 1/3414 454/155 |

(Continued)

*Primary Examiner* — Nicholas Klicos
(74) *Attorney, Agent, or Firm* — Knobbe Martens Olson & Bear LLP

(57) ABSTRACT

A moveable graphical user interface object is provided. The moveable graphical user interface object is moveable within a bounded graphical region. A current location of the moveable graphical user interface object in the bounded graphical region corresponds to an indicated direction of concentrated airflow. For example, the moveable graphical user interface object is used to control airflow direction of a HVAC air vent.

20 Claims, 37 Drawing Sheets

(56) References Cited

U.S. PATENT DOCUMENTS

| | | | |
|---|---|---|---|
| 2015/0378513 A1* | 12/2015 | Fontaine | G06F 3/0418 |
| | | | 345/173 |
| 2016/0025369 A1* | 1/2016 | Lim | F24F 11/30 |
| | | | 236/1 C |
| 2017/0166056 A1* | 6/2017 | Buttolo | G06F 3/0482 |
| 2018/0017273 A1* | 1/2018 | Lin | G05B 19/042 |
| 2018/0208017 A1* | 7/2018 | Hernandez | B60H 1/00985 |
| 2019/0135199 A1* | 5/2019 | Galan Garcia | B60R 16/037 |

* cited by examiner

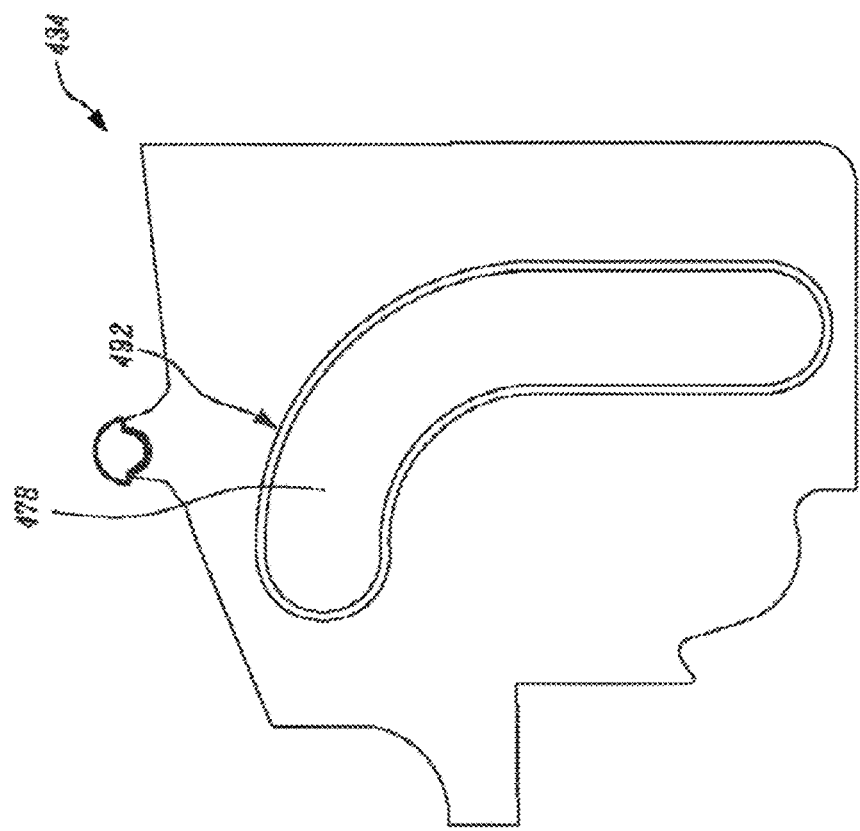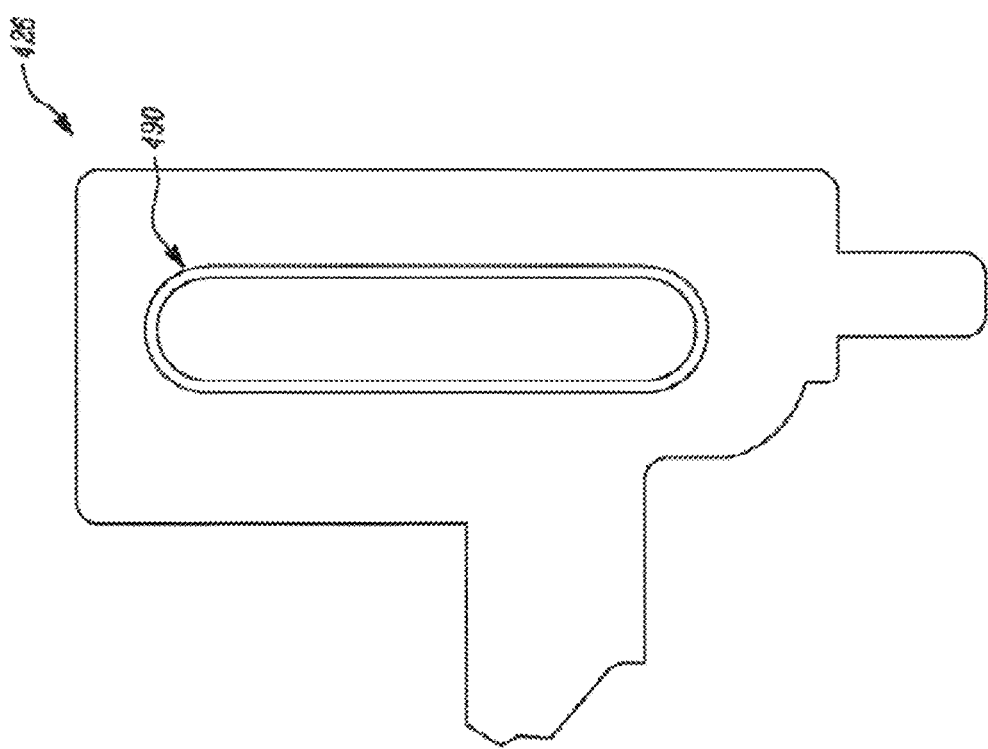
FIG. 14A

INTERACTIVE AIR VENT CONTROL INTERFACE

CROSS REFERENCE TO OTHER APPLICATIONS

This application claims priority to U.S. Provisional Patent Application No. 62/711,330 entitled INTERACTIVE AIR VENT CONTROL INTERFACE filed Jul. 27, 2018 which is incorporated herein by reference for all purposes.

BACKGROUND OF THE INVENTION

Climate within a vehicle can be controlled using a heating, ventilation, and air conditioning (HVAC) system that delivers temperature controlled air via air vents. Traditionally the configuration and direction of air delivered from air vents has been controlled with physical buttons and/or knobs. The required space and design constraints of these physical buttons and knobs often limit the functional and aesthetic design of other features of the vehicle. For example, without these physical buttons and knobs, the size and design of the dashboard can be improved, allowing increased vehicle cabin space and improved outward visibility. Additionally, mechanical switches are prone to mechanical failure and the reduction or elimination of switches may improve reliability and reduce manufacturing cost/complexity.

BRIEF DESCRIPTION OF THE DRAWINGS

Various embodiments of the invention are disclosed in the following detailed description and the accompanying drawings.

FIG. 14A illustrates cam-groove geometries for the first and second actuating members of the air vent assembly according to certain embodiments of the invention.

DETAILED DESCRIPTION

Figure 1:
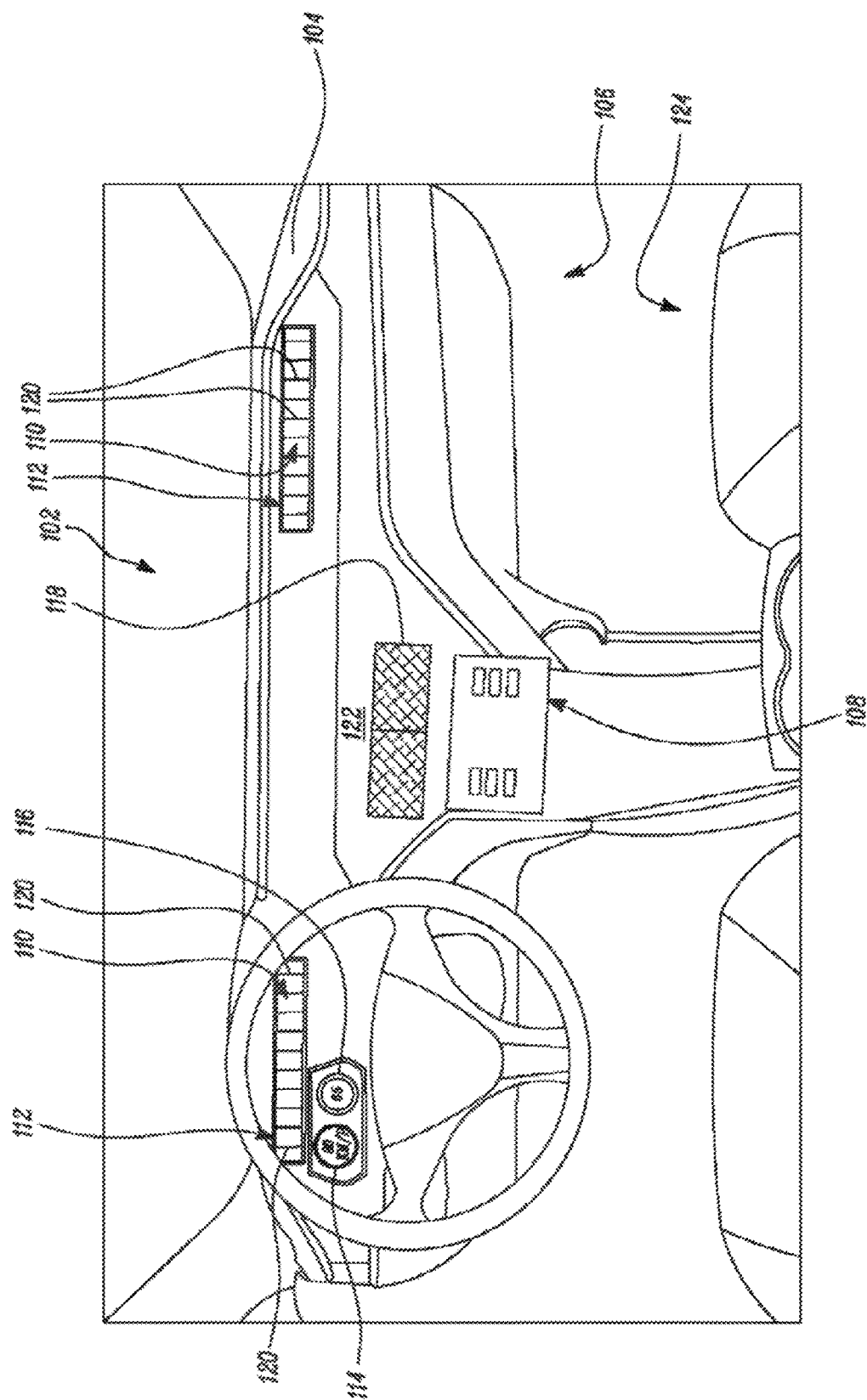
FIG. 1 illustrates an interior of a vehicle showing the air vent assembly of an HVAC system that is capable of being controlled by an infotainment system according to certain embodiments of the invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A user interface for controlling airflow from one or more air vents is disclosed. In some embodiments, a moveable graphical user interface object is provided within a bounded graphical user interface region. For example, rather than using a physical knob to control directly control direction/location of airflow from an HVAC system within a vehicle, the direction/location of airflow from one or more vents is controlled via a graphical user interface provided on a touchscreen. The graphical user interface object is moveable within the bounded graphical user interface region, and a current location of the moveable graphical user interface object in the bounded graphical user interface region corresponds to an indicated direction/location of concentrated airflow (e.g., corresponds to where the strongest portion of airflow is to be directed/located). A user may move the moveable graphical user interface object to specify a new location of the moveable graphical user interface object within the bounded graphical user interface region corresponding to a new indicated direction/location of concentrated airflow. In response, a mechanical configuration (e.g., vane, door, damper, and/or flow strength configuration) corresponding to the new location is determined and one or more signals/commands are provided to implement the mechanical configuration.

In some embodiments, the bounded graphical region includes at least one fixed reference marker identifying at least one reference location component of concentrated airflow. For example, a fixed horizontal reference line displayed in the bounded graphical region serves as a location reference for a vertical location of the moveable graphical user interface object and/or a fixed vertical reference line displayed in the bounded graphical user interface region serves as a location reference for a horizontal location of the moveable graphical user interface object. In some embodiments, the moveable graphical user interface object is able to be selectively separated into a plurality of moveable graphical user interface object components to split the desired direction/location of concentrated airflow into a plurality of different directions/locations corresponding to the different locations of the plurality of moveable graphical user interface object components within the bounded graphical user interface region. In some embodiments, an intensity pattern of diffused airflow corresponding to the indicated airflow direction/location configuration is visually provided in the bounded graphical user interface region via rendered gradient shadings to indicate the pattern/locations and relative intensities/strengths of diffused airflow at various different directions/locations surrounding the indicated desired direction/location of concentrated airflow.

In some embodiments, the described user interface is provided via a touchscreen of an infotainment system and the user interface controls a particular air vent assembly. The air vent assembly according to the present disclosure introduces a new way of delivering airflow to a user. According to certain embodiments, the air vent assembly includes a first vent portion placed in front of the driver and a second vent portion that is placed in front of the passenger. These vent portions may be elongated as compared to traditionally known designs of air vent assemblies in that they have longer, more linear vents instead of more circular or boxy vents. Also, each of the vent portions from the air vent assembly of the present disclosure typically includes more than one vent for each of the driver and passenger.

Embodiments of the present disclosure enhance the capabilities of this air vent assembly to provide air flow in a leftward, rightward, onward, and a split configuration using a single rotary actuator. In certain embodiments, the user interface may also allow a user to define the degree to which the vents may cause air to flow in the rightward, leftward, or split direction. In certain other embodiments, the infotainment display may be configured to provide pre-defined degrees of movement to the vents for causing air to flow around the driver or passenger.

According to certain embodiments, the driver and/or the passenger may control the vents using menu options provided on the user interface of the infotainment device. Some of the menu options provided on the user interface when actuated may configure the rotary actuator to close the vents, or cause the vents to accomplish a rightward air flow, a leftward air flow, an onward air flow, or a split air flow.

According to certain embodiments, the air vent assembly includes an actuating mechanism having a single rotary actuator therein for controlling a pair of actuating members-a first actuating member and a second actuating member. Each actuating member can control half of the vanes, although in certain other embodiments, each actuating member may control more or less than half of the vanes provided in the vent portions of the air vent assembly. Using the pair of actuating members together with the single rotary actuator, the vanes can be rotated about their respective rotational axes to close, or cause air to flow in the leftward, rightward, onward, or a split flow configuration in which flow of air is directed around the driver and/or the passenger of the vehicle. In certain embodiments, the user customizes the airflow, for example, the specific direction of the airflow. This can allow for a more comfortable experience for the occupants of a vehicle. For example, certain occupants may desire for air to be directed towards themselves while other occupants may desire the temperature of the vehicle cabin to be set to a certain value without having air directly impinging on themselves.

According to certain embodiments, the actuating mechanism includes a cam member that is rotatively driven by the rotary actuator in a range of 180 degrees, which in other embodiments could include other ranges of angular motion for accomplishing a movement of the vanes in their respective vane-closeout position, leftward flow guiding position, onward flow guiding position, rightward flow-guiding position, and a split flow-guiding position.

Air supply for the benefit of a person is used in a variety of contexts. One such area is the passenger compartment of a vehicle, where air is typically introduced through one or more vents. For example, such vents can be positioned in the instrument panel for use primarily by the front seat occupants, and sometimes also in a second (or higher) row of seats for other passengers as well. The vents are usually controlled to regulate the flow of air entering the cabin, and the direction thereof. The vents are connected to the vehicle's heating, ventilation, and air conditioning (HVAC) system so that hotter, colder, and/or dehumidified air can be supplied as desired.

Traditional automotive vents have a low aspect ratio, meaning that their width is relatively similar to their height. For example, circular or rectangular vents are common. These vents are generally positioned flush with the surface of the instrument panel. However, these point-like outlets are not optimized for distributing the air over a wider area, which necessitates the use of multiple vents for each passenger. Also, the appearance of the vents may be unsightly and can disrupt an otherwise uniform design of the instrument panel or other interior surface.

In some embodiments, a thermal system with high aspect ratio vents for a vehicle comprises: at least one HVAC unit; a first vent with a first high aspect ratio, the first vent coupled to the HVAC unit and configured to generate a first plane of air in a passenger compartment of the vehicle; and a second vent coupled to the HVAC unit and configured to generate a second plane of air in the passenger compartment, the second vent positioned so that the second plane of air intersects the first plane of air.

Implementations can include any or all of the following features. The second vent has a second high aspect ratio and wherein the first high aspect ratio is different from the second high aspect ratio. The second vent includes multiple vent outlets, and wherein each of the vent outlets is shorter than the first vent. The thermal system further comprises a common duct supplying air from the HVAC unit, a first duct leading from the common duct to the first vent, a second duct leading from the common duct to the second vent, and a valve in the second duct. The thermal system further comprises a curved duct leading to the first vent, and a vane positioned in the curved duct away from a line of sight entering the curved duct from the passenger compartment. The thermal system further comprises a duct leading to the first vent, and a step inside the duct that faces toward the passenger compartment. The thermal system further comprises one or more ribs partially covering an opening of the second vent. The first and second vents are positioned in an instrument panel of the vehicle. The instrument panel comprises a first structure on a long side of the first vent, and a second structure on an opposite side of the long side, wherein an angle between the first structure and the first plane of air is greater than an angle between the second structure and the first plane of air, and wherein the second vent is positioned in the second structure. The first plane of air forms a reduced air pressure zone at the second structure, and wherein the second vent is positioned so that the second plane of air feeds into the reduced air pressure zone. The second vent is positioned so that the second plane of air pushes the first plane of air away from the second structure. The first vent and the second vent have no adjustment mechanisms visible on the instrument panel. Respective openings for the first vent and the second vent are essentially parallel to each other. The first vent is mounted above the second vent.

In some embodiments, a thermal system for a vehicle comprises: at least one HVAC unit; first means coupled to the HVAC unit for generating a first plane of air with a first high aspect ratio in a passenger compartment of the vehicle; and second means coupled to the HVAC unit for generating a second plane of air with a second high aspect ratio in the passenger compartment, wherein the second plane of air intersects the first plane of air.

Implementations can include any or all of the following features. The first means comprises a first vent and the second means comprises a second vent, the first vent mounted above the second vent in an instrument panel of the vehicle. The second vent includes multiple vent outlets, and wherein each of the vent outlets is shorter than the first vent. The first vent is oriented so that the first plane of air is essentially horizontal, and wherein the second vent is oriented upward so that the second plane of air intersects the first plane of air.

In some embodiments, a method comprises: providing a supply of air using an HVAC unit of a vehicle; generating a first plane of air into a passenger compartment of the vehicle from the supply of air, the first plane of air having a first high aspect ratio; and generating a second plane of air into the passenger compartment from the supply of air, the second plane of air having a second high aspect ratio, wherein the second plane of air intersects the first plane of air. Implementations can include the following feature. The method further comprises controlling a direction of the first plane of air in the passenger compartment by regulating a flow of air of the second plane of air.

In some implementations, a system is provided that allows a vent to have a high aspect ratio. The system can provide good control of the vertical position of the planar jet of air also when the vent is mounted in a non-flush position with regard to an instrument panel or other structure. This can be accomplished by a secondary outlet downstream of the main vent. For example, the secondary outlet can control the main air jet by feeding a low pressure zone that would otherwise keep the main jet attached to the instrument panel. As another example, the secondary outlet can push the main jet away from the structure, thereby adding momentum to it, in analogy with free air jets colliding.

Some examples herein refer to a passenger vehicle for illustration, such vehicle having a front seat with an instrument panel positioned in front of either or both of the first row occupants. Other implementations, however, can be used with vehicles that are not conventional passenger vehicles, or can be used elsewhere in the vehicle other than in a first row, such as in a second or higher row of seats.

Examples are mentioned herein where a vent generates a plane of air into the passenger compartment. Planes of air can be generated by vents that have high aspect ratios, such as a large width and a narrow height. Vents with high aspect ratios generate air streams that have special fluid dynamic behavior. In general, the core of a fluid jet can be regarded as two dimensional when the aspect ratio of the jet is above eight. That is, if the vent is more than eight times wider than it is tall, then the air stream produced by the vent can be considered as a two-dimensional surface in certain regards.

The two-dimensional air jet can behave in particular ways relative to nearby structures, some of which may not be desirable. This can occur when the vent is not mounted flush with the instrument panel, but rather the instrument panel has structure extending forward from the vent alongside the generated jet. If the angle between the jet and such structure is less than a particular value (e.g., on the order of 64 degrees), the jet can tend to bend from influence of the structure and travel along the surface thereof. This is sometimes referred to as the stream sticking to the surface, with the understanding that air continues to flow inside the stream but that the stream as a whole has been diverted in another (here undesirable) direction. Generally, such a plane of air gives rise to a region where the air has a lower pressure than in the immediately surrounding areas. That is, the aspect ratio of the air stream influences the angle at which the jet would begin sticking to nearby structure. The term Coanda effect is sometimes used for this phenomenon.

Moreover, this effect is aggravated if the structure of the instrument panel that encloses the non-flush vent is not symmetrical on both sides of the vent. Consider an example where the instrument panel structure extends forward along the jet stream on one side thereof (e.g., below the vent) but on the other side (e.g., above the vent) the structure does not extend forward to the same degree, or not at all. This can reduce the angle at which the jet stream tends to stick to the instrument panel. As such, non-symmetric surrounding structures can complicate the control of an air stream from a non-flush air vent.

As a particular example, if the vent in an instrument panel were to generate a plane of air, but the location of the vent (e.g., in a non-flush position) caused such unwanted sticking of the air stream, the air stream could end up aimed at only one area inside the cabin (e.g., toward the occupants' legs) with little or no opportunity to control its direction. If the orientation of the non-flush vent were changed to overcome this problem, such as by aiming the vent further upward and away from the interfering surface, then the jet can end up aimed essentially toward the ceiling of the vehicle and may therefore still miss the intended target zone. Such an approach can result in a vent that at best has a binary behavior and does not provide adequate passenger comfort.

Based on the foregoing, the present description exemplifies thermal systems with one or more main vents that have high aspect ratios. For each main vent, there is at least one other, secondary vent oriented so that the plane of air it generates will intersect the plane of air from the high aspect ratio vent. As used herein, a high aspect ratio refers to a relationship where one dimension of the thing (e.g., the width of a vent) is more than eight times greater than a different dimension thereof (e.g., the height of the vent). For example, a vent has a high aspect ratio when it is capable of producing an air stream that can practically be regarded as a two-dimensional surface for purposes of analyzing its fluid dynamic behavior.

That is, if the main vent had a greater angle (such as above 60 degrees) relative to the instrument panel, or if the aspect ratio were less (such as below six), the sticking problem could be reduced or eliminated. However, with high aspect ratios and shallow angles it becomes challenging to control the direction of the air flow. Therefore, the systems and techniques described herein provide control of such a jet also when the angle between the outlet and a nearby structure (e.g., the instrument panel) is relatively shallow, such as less than 30 degrees.

The secondary vent can, but does not necessarily, have a high aspect ratio. The secondary vent should cover essentially the entire width of the main vent and be relatively narrow so that the outlet area remains small. This can be accomplished by either a single secondary vent that has a high aspect ratio, or by a series of vents spaced across essentially the entire width such that the secondary vent effectively has a high aspect ratio.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates an interior 102 of a vehicle 100 according to certain embodiments of the invention. As shown, a dash console 104 is disposed in an anterior region 106 of the vehicle 100. The dash console 104 is configured to provide a host of spaces for fitment of various devices including, but not limited to, an infotainment device 108, an air vent assembly 112 of an HVAC system 110, a speedometer 114, an odometer 116, a stereo system 118, and other like devices provided to the vehicle 100 depending on specific requirements of a vehicular application. Embodiments of the present disclosure are directed to the air vent assembly 112 of the HVAC system 110 and the infotainment device 108 that is configured to operatively control, amongst other things, the movement of vanes 120 in the air vent assembly 112 of the HVAC system 110.

Figure 2:
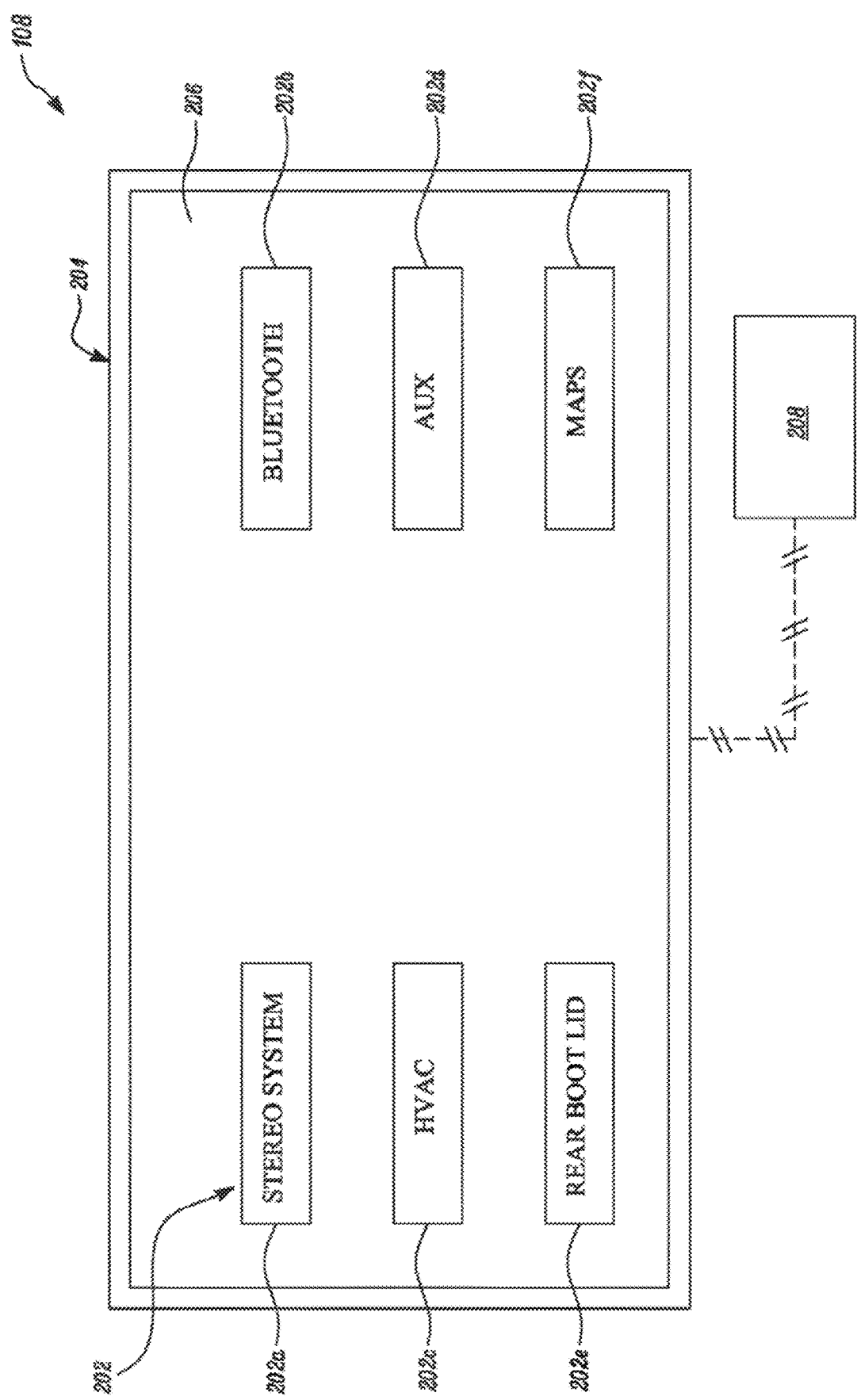
FIG. 2 illustrates an interface of the infotainment system showing a variety of high-level menu options according to certain embodiments of the invention.

FIG. 2 illustrates an interface 206 of the infotainment device 108 showing a variety of high-level menu options 202 according to certain embodiments of the invention. Each of the menu options 202 is provided on the user interface 206 of a display 204 associated with the infotainment device 108. This way, a user may select an appropriate menu option 202 on the user interface 206 of the infotainment device 108. Consequently, a processor 208 of the infotainment device 108 detects the menu option 202 that is being selected by the user and provides appropriate control signals to a desired device present in the vehicle 100 and corresponding with the selected menu option 202 so that an operation of the desired device is controlled. As disclosed earlier in this embodiment, the user input is provided by selecting from the menu options 202 listed on the user interface 206. According to certain other embodiments of this invention, the user can provide a voice command to the user interface 206 in lieu of physically selecting a menu option to control the air flow in vehicle 100.

As shown in the illustrated embodiment of FIG. 2, a host of high-level menu options 202 are shown provided on the user interface 206 of the infotainment device 108. Each of these high-level menu options 202 are user selectable for controlling an operation of the desired device. For example, as shown in FIG. 2, a menu option 202a when selected may be configured to direct the processor 208 to turn ON the stereo system 118. Likewise, a menu option 202b when selected may be configured to direct the processor 208 to turn ON a Bluetooth device while a menu option 202c when selected by the user would direct the processor 208 to open a rear boot lid of the vehicle 100. Similarly, a menu option 202d when selected may configure the processor 208 to turn ON the HVAC system 110 of the vehicle 100. Other menu options including, but not limited to, the menu options 202e and 202f may, additionally or optionally, be provided on the user interface 206 to facilitate AUX input at the stereo system 118 and enable navigation maps at the user interface 206 itself respectively.

It may be noted that the processor 208 may be a single microprocessor or multiple microprocessors that include components for performing functions consistent with the present disclosure. Numerous commercially available microprocessors can be configured to perform the functions of the processor 208 disclosed herein. It should be appreciated that the processor 208 could readily be embodied in a general purpose microprocessor capable of controlling numerous functions associated with each of the devices present in the vehicle 100. The processor 208 may also include a memory, a secondary storage device, and any other components for running an application. Various circuits may be associated with the processor 208 such as power supply circuitry, a solenoid driver circuitry, a signal conditioning circuitry for e.g., an analog-to-digital converter circuitry, and other types of circuitry. Various routines, algorithms, and/or programs can be programmed within the processor 208 for execution thereof. Moreover, it should be noted that the processor 208 disclosed herein may be a stand-alone processor 208 or may be configured to co-operate with existing processor/s, for example, an electronic control module (ECM) (not shown) provided to the vehicle 100 to perform functions that are consistent with the present disclosure.

Figure 3:
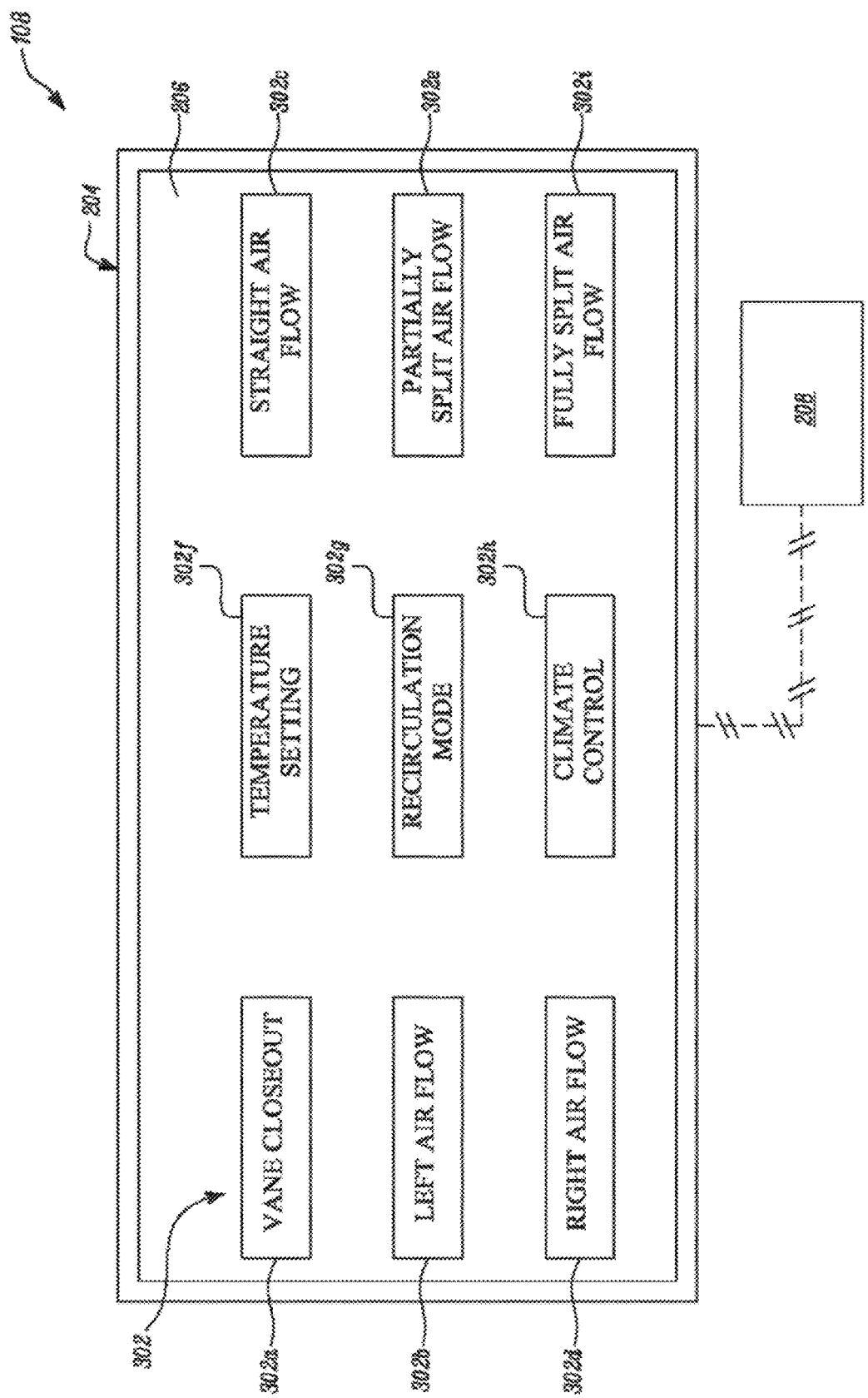
FIG. 3 illustrates an interface of the infotainment system showing a variety of low-level menu options for controlling the HVAC system according to certain embodiments of the invention.
Figure 28:
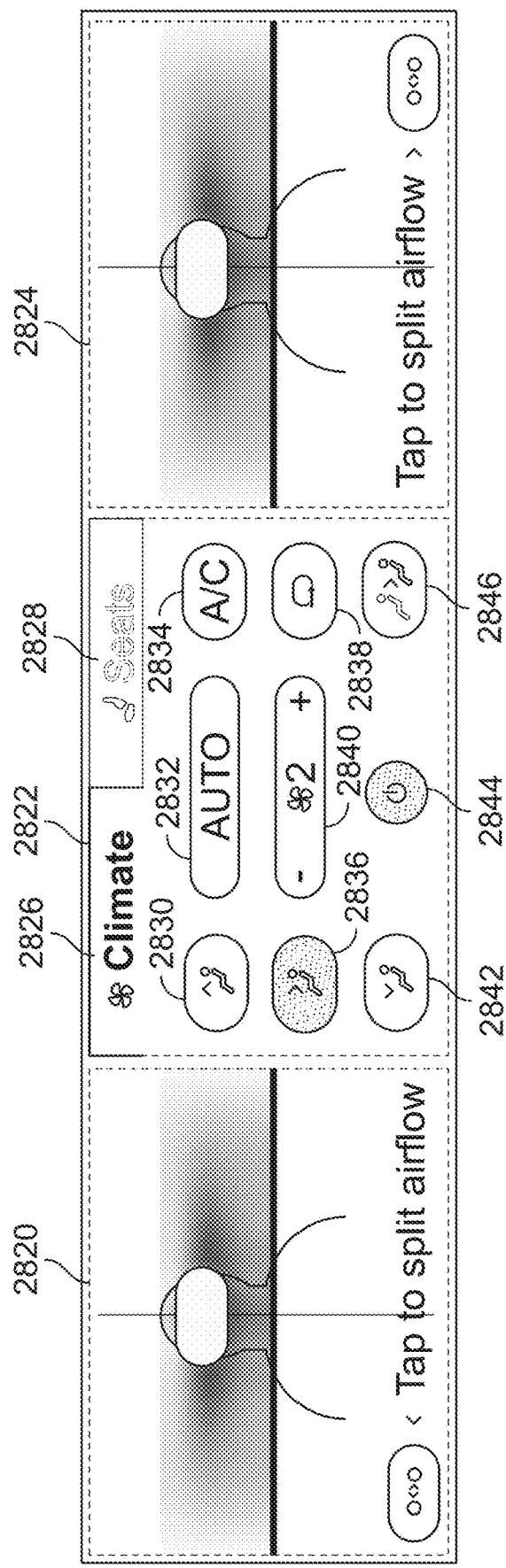
FIG. 28 is a diagram illustrating an embodiment of a user interface for specifying climate control settings.

Referring to FIG. 3, a host of low-level menu options 302 are displayed on the user interface 206 of the infotainment device 108 in accordance with certain embodiments of the invention. In particular, the low-level menu options 302 shown in FIG. 3 may be displayed on the user interface 206 in response to the user having previously selected the HVAC menu option 202d listed in the high-level menu options 202 from FIG. 2. As shown in FIG. 3, the low-level menu options 302 may include, but are not limited to, a temperature setting menu option 302f, a menu option 302g for enabling a recirculation mode of air conditioning in the vehicle 100, a menu option 302h for enabling climate control in the vehicle 100. The menu options shown in FIG. 3 are merely an example, and another example is shown in FIG. 28.

According to specific embodiments of this invention, at least some low-level menu options 302 are additionally provided to a user for particularly controlling the vanes 120 of the air vent assembly 112. As shown in FIG. 3, these low-level menu options 302 include a menu option 302a for directing the vanes 120 to move to a vane closeout position, a menu option 302b for directing the vanes 120 to move to a leftward flow-guiding position, a menu option 302c for directing the vanes 120 to move to an onward flow-guiding position, a menu option 302d for directing the vanes 120 to a rightward flow-guiding position, a menu option 302e for directing the vanes 120 of the air vent assembly 112 to a partially-split flow-guiding position, and another menu option 302i for directing the vanes 120 of the air vent assembly 112 to a fully-split flow-guiding position.

Referring back to FIG. 1, an air vent assembly 112 is shown typically disposed in front of the driver seat and front-passenger seat on the dash console 104. Therefore, references to the flow-guiding positions of the vanes 120 such as closeout, leftward, rightward, onward, and split are to be construed as being taken in relation to the seats or occupants of the vehicle 100 who would typically be located in a front portion 124 of the vehicle 100. Additional detail for each of the aforementioned flow-guiding positions appears below in the detailed description of the other figures.

Moreover, although it is disclosed in the illustrated embodiment of FIG. 1 that two air vent assemblies are disposed on the dash console 104—one in front of the driver seat and one in front of the passenger seat—it may be noted that the number and position of the air vent assembly 112 or assemblies within the interior 102 of the vehicle 100 is non-limiting of this invention. Other alternative positions within the interior 102 of the vehicle 100 may include, but is not limited to, the center of the console, a right inner side of the vehicle 100, a left inner side of the vehicle 100, a top inner side of the vehicle 100, or stretching from the right side of the vehicle 100 to the left side of the vehicle 100. Such alternative positions may be contemplated depending on specific requirements of a vehicular application.

Figure 4:
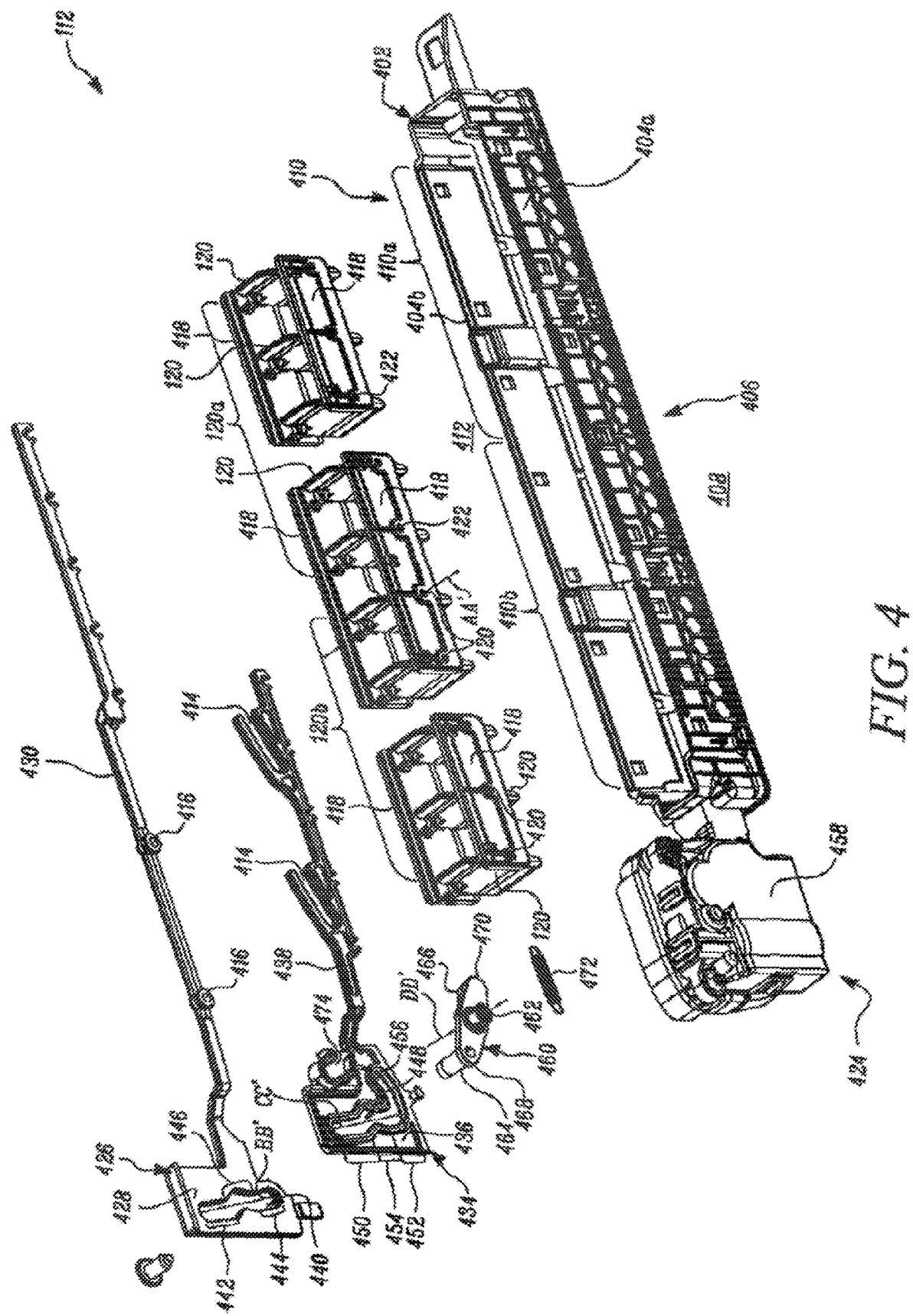
FIG. 4 illustrates an exploded top perspective view of an air vent assembly of the HVAC system according to certain embodiments of the invention.
Figure 5:
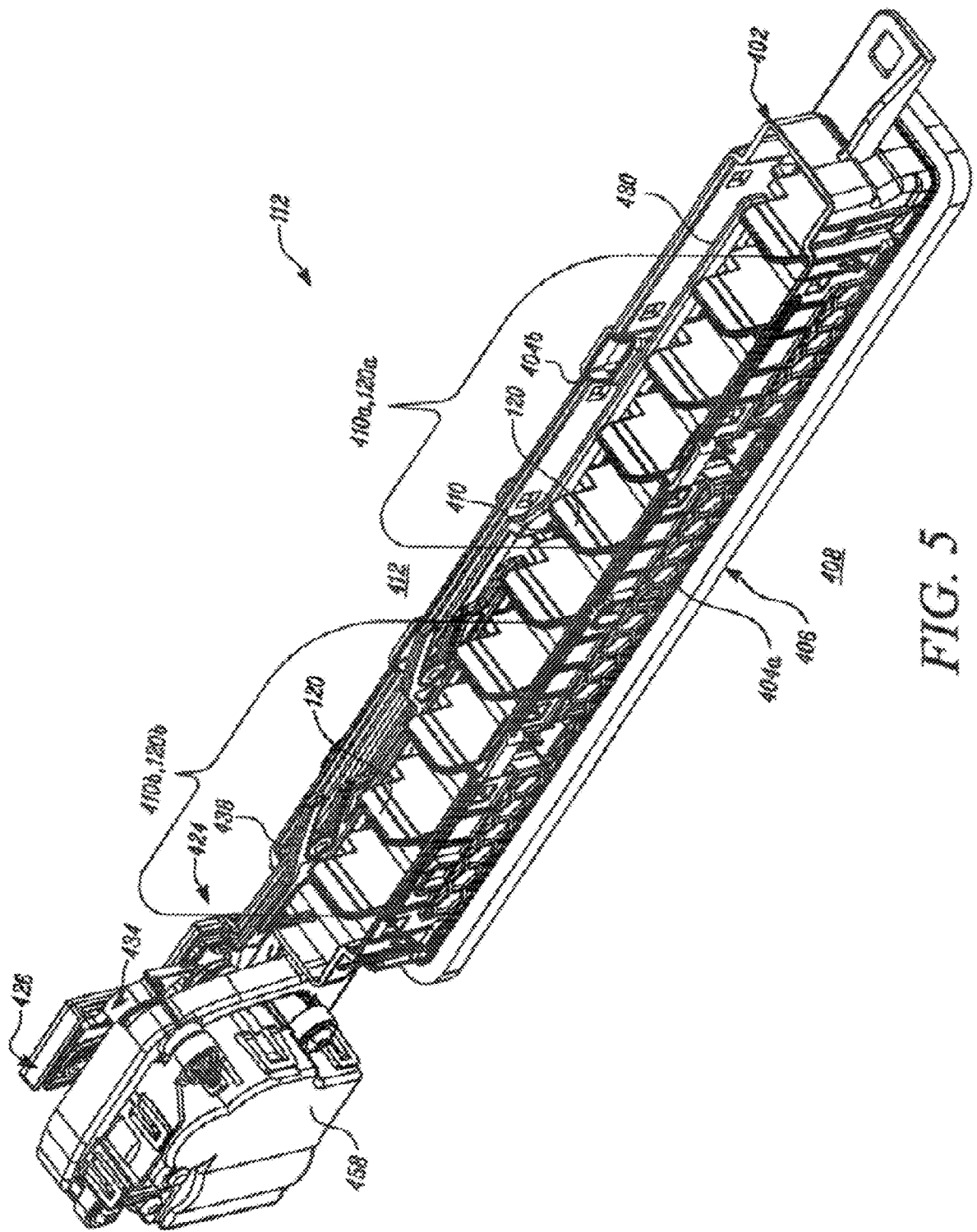
FIG. 5 illustrates an assembled top perspective view of the air vent assembly according to certain embodiments of the invention.

FIG. 4 shows an exploded top perspective view of the air vent assembly 112 in accordance with certain embodiments of this invention. As shown, the air vent assembly 112 includes a cover member 402. An outer shape and size of the cover member 402 may be selected so as to correspond with a size and shape of a space provided by the dash console 104 of the vehicle 100 (refer to FIG. 1). In instances where the air vent assembly 112 is to be installed in a location other than the space provided by the dash console 104, for example, the left inner side, the right inner side, or the top inner side of the vehicle 100, the outer size and shape of the cover member 402 may be suitably selected to correspond with a size and shape of that space.

With continued reference to FIG. 4, the cover member 402 has a pair of elongated walls 404a and 404b disposed in an opposing relation to one another. The cover member 402 has an inlet 406 defined on an aft side 408 thereof. The inlet 406 allows a flow of air to enter the cover member 402, particularly, when the HVAC system 110 is turned ON in response to the user input at the interface being indicative of the HVAC menu option 202d.

The cover member 402 also has a vent 410 extending from the inlet 406 toward a fore side 412 of the cover member 402. The vent 410 is configured to allow a flow of air to exit the cover member 402. The vent 410 consists of a first vent portion 410a and a second vent portion 410b located adjacent to the first vent portion 410a. As shown, the first vent portion 410a has vanes 120 disposed therein. For purposes of simplicity, the vanes 120 from the first vent portion 410a are hereinafter referred to as 'the first set of flow-guiding vanes' and denoted with like alpha-numeral '120a'. Likewise, the second vent portion 410b has a second set of flow-guiding vanes disposed therein, which for purposes of simplicity and differentiation from the first set of flow-guiding vanes 120a is denoted with like alpha-numeral '120b'.

In the illustrated embodiment of FIG. 4, the first set of flow-guiding vanes 120a is shown to consist of five vanes 120. Likewise, the second set of flow-guiding vanes 120b consists of five vanes 120 therein. It may be noted that a number and distribution of vanes 120 between the first and second sets of flow-guiding vanes 120a, 120b is merely a matter of design choice and hence, the number and distribution of vanes 120 between the first and second sets of flow-guiding vanes 120a, 120b may vary from one application to another depending on specific requirements of an application. Moreover, although the number of vanes 120 in the air vent assembly 112 of the present disclosure is limited to five in each of the first and second sets of flow-guiding vanes 120a, 120b, it will be acknowledged by persons skilled in the art that an unequal number of vanes 120 may be present in the first and second sets of flow-guiding vanes 120a, 120b depending on specific requirements of an application.

Further, each of the vanes 120 from the first and second set of flow-guiding vanes 120b are spaced apart from one another. Moreover, the vanes 120 from the first and second vent portions 410a, 410b extend at least partially between the aft and fore sides 408, 412 of the cover member 402. Furthermore, each vane 120 from the first and second sets of flow-guiding vanes 120a, 120b are pivotally coupled to the pair of mutually opposing elongated walls 404a, 404b of the cover member 402. In the illustrated embodiment of FIGS. 4-7, three sets of cover plates 418 are provided to establish a pivotal connection of each vane 120 from the first and second sets of flow-guiding vanes 120a, 120b with the pair of mutually opposing elongated walls 404a, 404b of the cover member 402. As best shown in FIG. 4, each pair of mutually opposing cover plates 418 defines multiple corresponding recesses 420. Each of the recesses 420 on the cover plates 418 receives a pivot pin 422 associated with the vane from either the first or second set of flow-guiding vanes 120b.

According to certain embodiments of this invention, the first set of flow-guiding vanes 120a and the second set of flow-guiding vanes 120b are independently moveable with respect to each other using an actuating mechanism 424 that is coupled to each of the first and second sets of flow-guiding vanes 120a, 120b. The actuating mechanism 424 includes a first actuating member 426. The first actuating member 426 has a first base portion 428, and a first link member 430 extending from the first base portion 428. The first link member 430 is engaged with each vane 120 from the first set of flow-guiding vanes 120a. The first link member 430 is operable to pivot each vane 120 from the first set of flow-guiding vanes 120a about its corresponding rotational axis AA'.

Referring to FIGS. 4-7, the actuating mechanism 424 further includes a second actuating member 434 located adjacent to the first actuating member 426. The second actuating member 434 has a second base portion 436 that is disposed below the first base portion 428 of the first actuating member 426. The second actuating member 434 also has a second link member 438 extending from the second base portion 436. The second link member 438 is pivotally engaged with each vane 120 from the second set of flow-guiding vanes 120b. The second link member 438 is selectively operable to pivot each vane 120 from the second set of flow-guiding vanes 120b about its corresponding rotational axis AA'.

Additionally, the first base portion 428 of the first actuating member 426 defines a first cam groove 440 therein. The first cam groove 440 includes a first portion 442, a second portion 444 spaced-apart from the first portion 442, and a mid-portion 446 disposed between the first and second portions 442, 444. As shown, the mid-portion 446 of the first cam groove 440 is curved away from an axis BB' connecting the first and second portions 442, 444 of the first cam groove 440.

The second base portion 436 of the second actuating member 434 defines a second cam groove 448 therein. The second cam groove 448 includes a first portion 450, a second portion 452 spaced-apart from the first portion 450, and a mid-portion 454 disposed between the first and second portions 450, 452. As shown, the mid-portion 454 of the second cam groove 448 is curved away from an axis CC' connecting the first and second portions 450, 452 of the second cam groove 448. Additionally, the second cam groove 448 includes a third portion 456 extending from a distal end of the second portion 452. The third portion 456 is arcuately disposed in relation to the second portion 452. According to certain embodiments, the first, second, and mid-portions 442-446, 450-454 of the first and second cam grooves 440, 448 correspond with one another. However, it may be noted that other configurations of the first and second cam grooves 440, 448 may be implemented by persons skilled in the art to realize the features of this invention.

The actuating mechanism 424 further includes a rotary actuator 458 communicably coupled with the processor 208 of the infotainment device 108. The actuating mechanism 424 further includes a cam member 460 having a central portion 462 coupled to the rotary actuator 458. The rotary actuator 458 operatively rotates the cam member 460 about its central portion 462 in response to control signal output by the processor 208. The cam member 460 also has a primary pin 464 and a secondary pin 466. The primary pin 464 is disposed at a first end 468 of the cam member 460. The secondary pin 466 is disposed at a second end 470 of the cam member 460. The primary pin 464 is disposed in engagement with the first and second cam grooves 440, 448 from respective ones of the first and second actuating members 426, 434.

Figure 6:
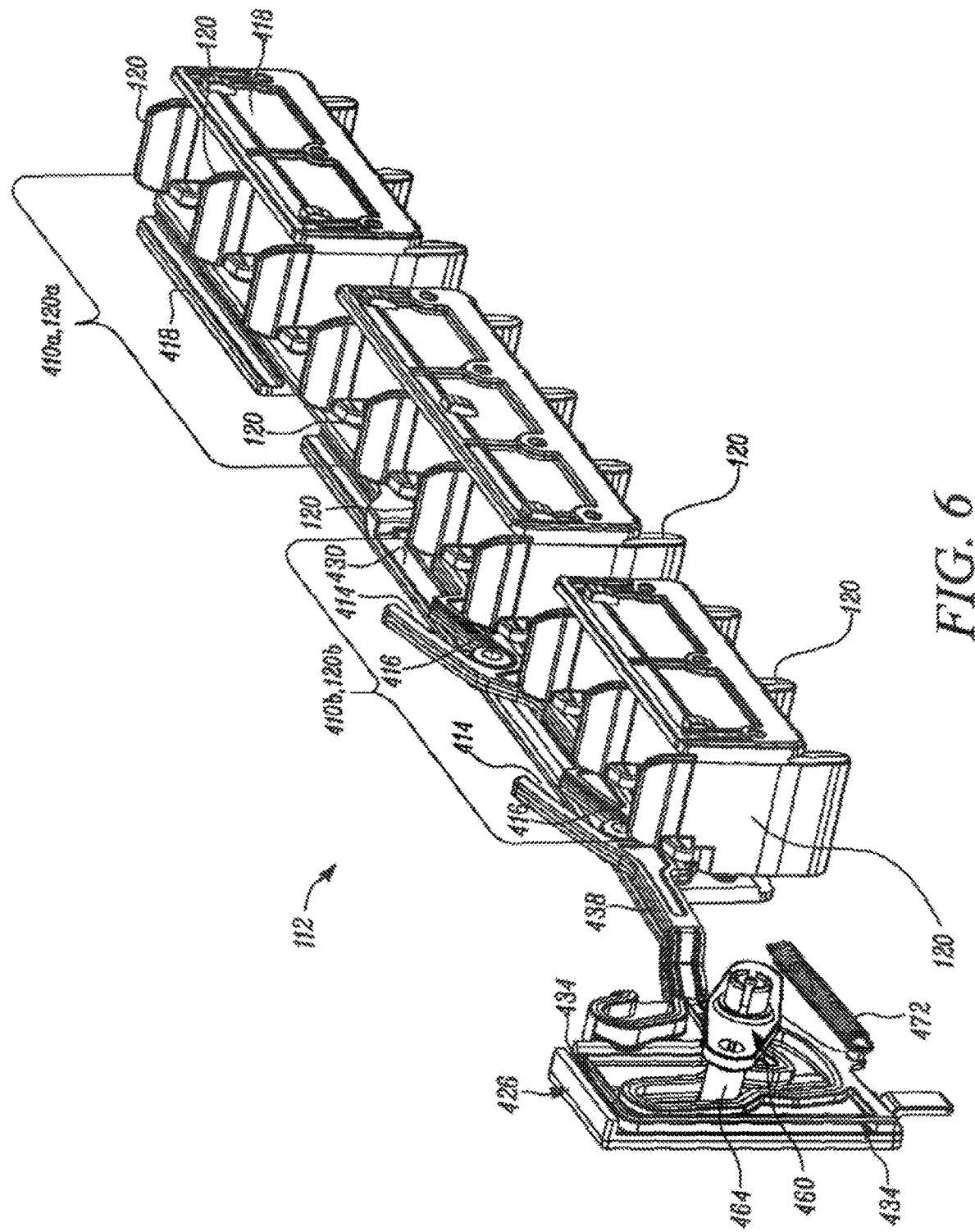
FIG. 6 illustrates a partially assembled top perspective view of the air vent assembly without a cover member according to certain embodiments of the invention.
Figure 7:
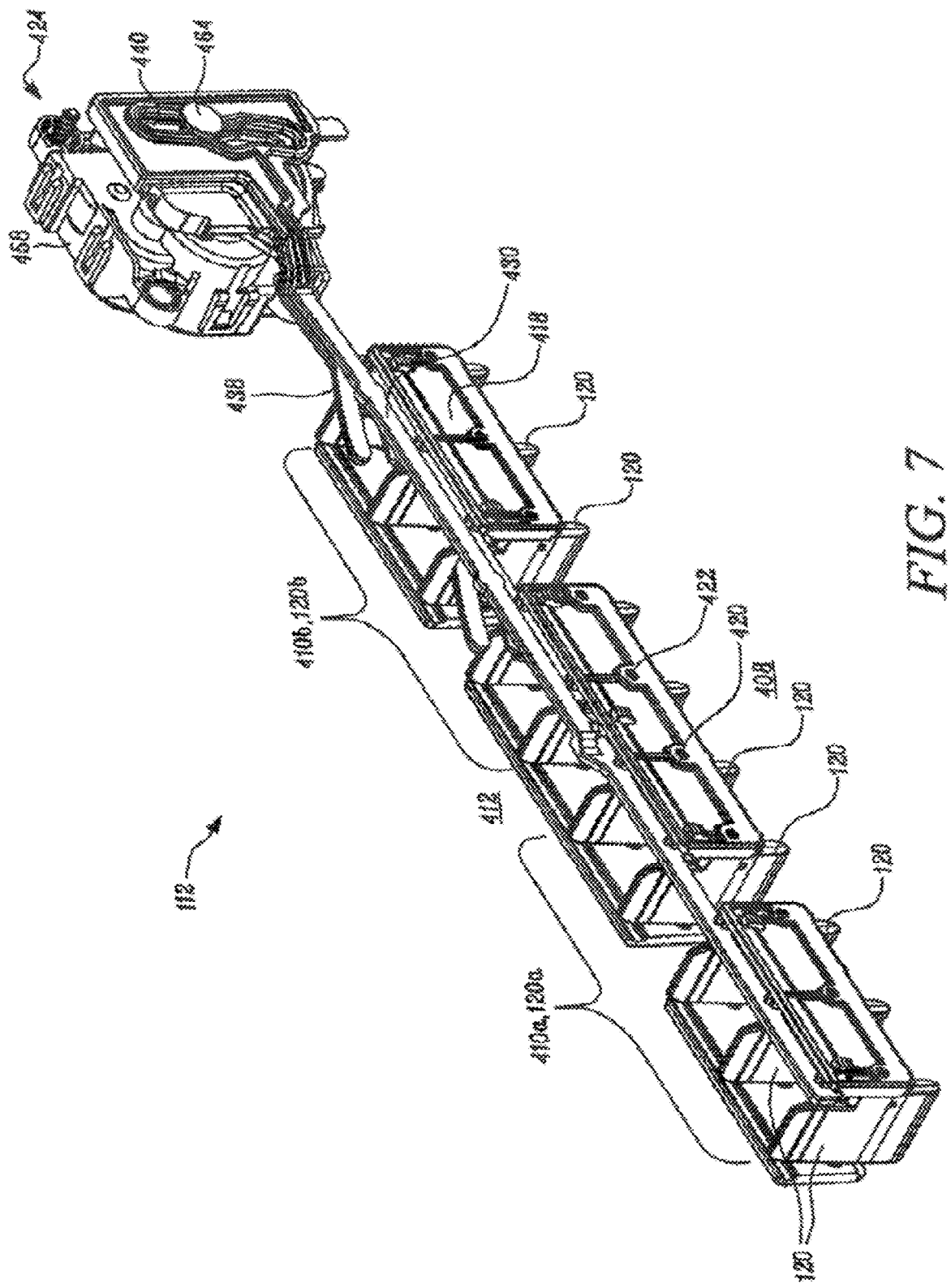
FIG. 7 illustrates a side perspective view of the air vent assembly without the cover member according to certain embodiments of the invention.

Additionally, as best shown in FIG. 6, the second link member 438 of the second actuating member 434 is slidably coupled to the first link member 430 of the first actuating member 426 with the help of a slot-pin arrangement in which each of the slots are denoted by numeral 414 while each of the sliding pins are denoted by numeral 416. Moreover, as best shown in FIG. 6, the second link member 438 may be resiliently biased by a spring 472 coupled to the cover member 402. The spring 472 facilitates a default position for each of the first and second actuating members 426, 434 which in turn would cause the first and second sets of flow-guiding vanes 120a, 120b to be generally disposed in their respective default positions. The spring may assist secondary pin 466 in pulling the second link member 438 back to a centralized location. Further, when no user input is received at the user interface 206 for turning ON the HVAC system 110 or for effecting a particular flow-guiding position other than the vane closeout position, the default position of the first and second actuating members 426, 434 may be effected by the spring 472 as the spring 472 generally biases the first and second actuating members 426, 434 into their respective default positions, which according to a particular embodiment of this disclosure, is the vane closeout position. Alternatively, it has also been contemplated that when a user input is received vis-à-vis the high-level menu option 202d for turning OFF the HVAC system 110, the spring 472 offers a bias force to each of the first and second actuating members 426, 434 such that the first and second sets of flow-guiding vanes 120a, 120b are disposed in their respective vane closeout positions. It may be noted that the terms 'vane closeout position' disclosed herein may be regarded as a position in which the vanes 120 from the first and second sets of flow-guiding vanes 120a, 120b fully obstruct the flow of air from the air vent assembly 112 towards the interior 102 of the vehicle 100.

According to certain embodiments, a rotation of the cam member 460 about an axis DD' of the central portion 462 causes an engagement of the primary pin 464 with one of the first, second, and mid-portions 442-446, 450-454 of respective ones of the first and second cam grooves 440, 448 for positioning the first and second sets of flow-guiding vanes 120a, 120b in one of: the vane closeout position, the rightward flow-guiding position, the onward flow-guiding position, and the leftward flow-guiding position. Explanation to each of these functions is made in the appended disclosure.

Figure 8:
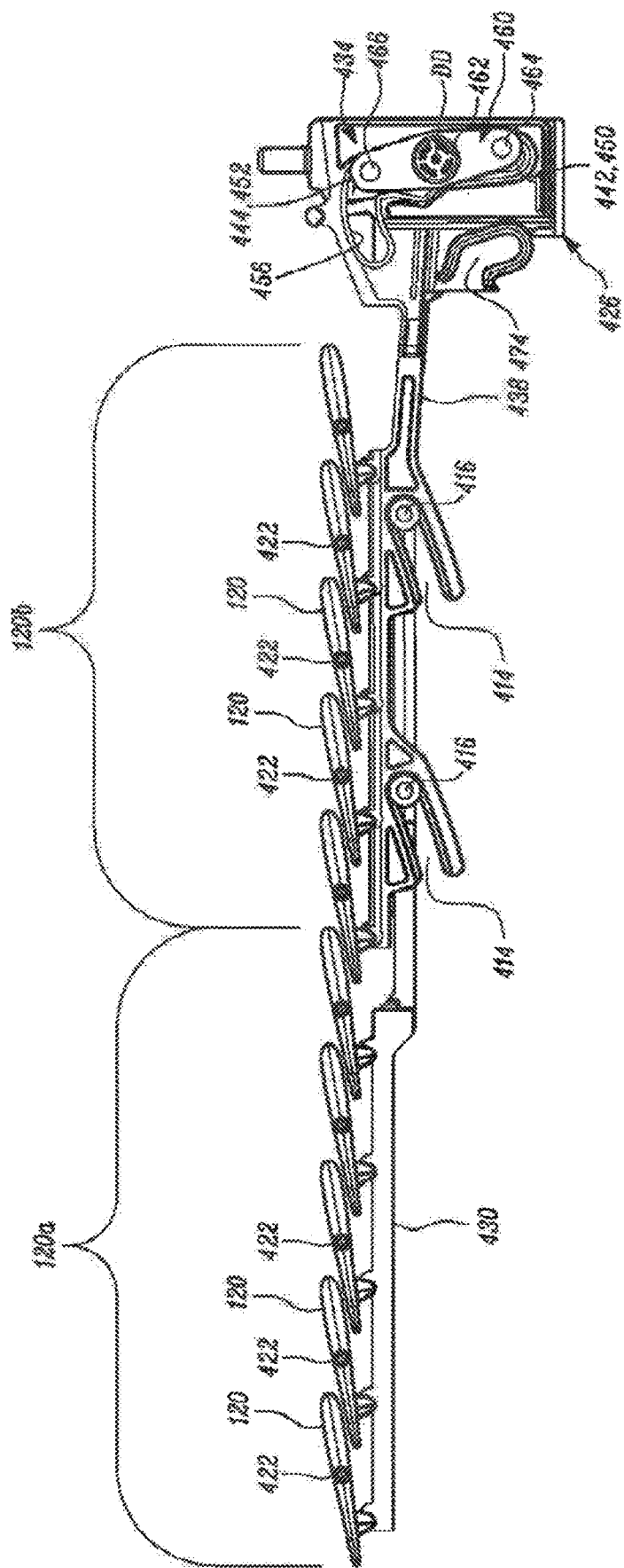
FIG. 8 illustrates a top view of the air vent assembly showing vanes disposed in a vane closeout position according to certain embodiments of the invention.

According to specific embodiments as shown in FIG. 8, when the primary pin 464 of the cam member 460 is operatively moved into engagement with the first portions 442, 450 of respective ones of the first and second cam grooves 440, 448 (refer to FIG. 4) and is located distally away from the mid-portions 446, 454 of respective ones of the first and second cam grooves 440, 448, a corresponding movement of the first and second actuating members 426, 434 causes respective ones of the first and second sets of flow-guiding vanes 120a, 120b to be positioned in their respective vane close-out positions.

Figure 9:
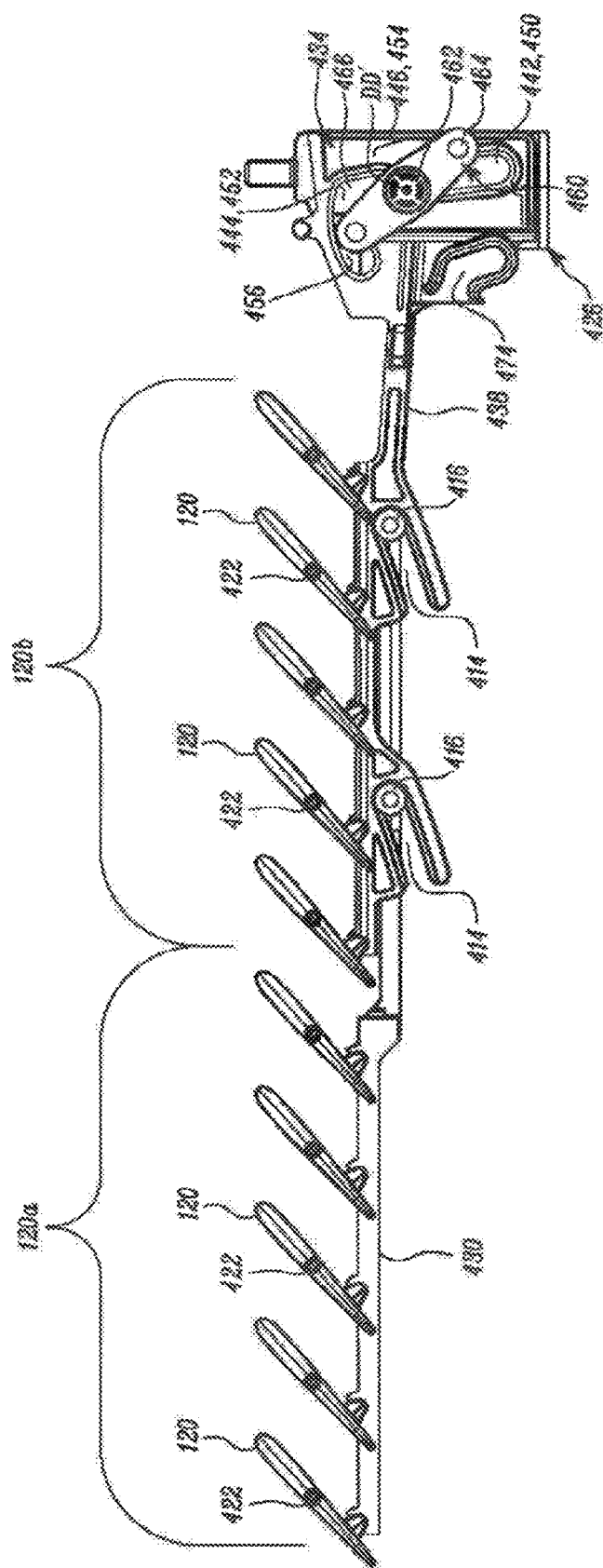
FIG. 9 illustrates a bottom view of the air vent assembly showing vanes disposed in a rightward flow-guiding position according to certain embodiments of the invention.

According to other embodiments as shown in FIG. 9, when the primary pin 464 of the cam member 460 is operatively moved into engagement with the first portions 442, 450 of respective ones of the first and second cam grooves 440, 448 (refer to FIG. 4) so as to be located partway along a length of the first portions 442, 450 of respective ones of the first and second cam grooves 440, 448, a corresponding movement of the first and second actuating members 426, 434 causes respective ones of the first and second sets of flow-guiding vanes 120*a*, 120*b* to be positioned in their respective rightward flow-guiding positions. It may be noted that the flow-guiding vanes 120*a*, 120*b* as shown in FIG. 9 are pointing in a leftward and downward direction as the view of FIG. 9 is the bottom view of the air vent assembly 112.

Figure 10:
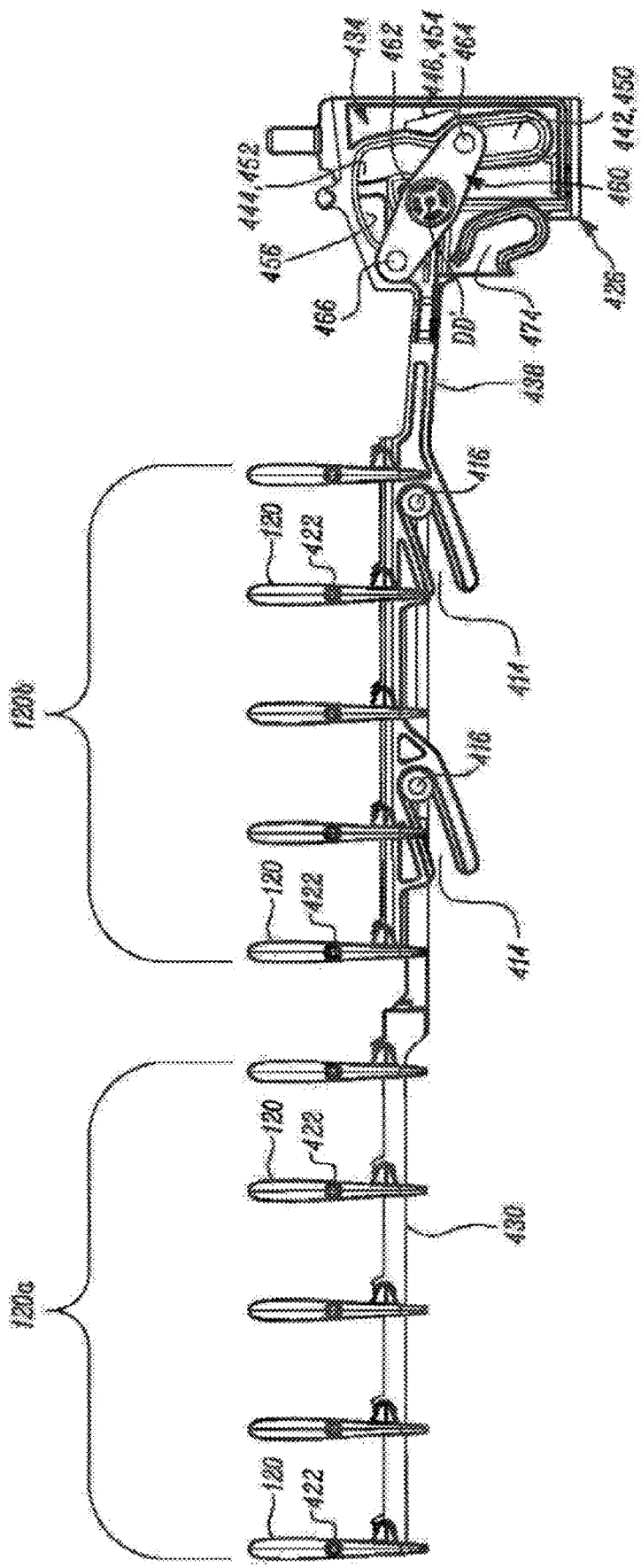
FIG. 10 illustrates a bottom view of the air vent assembly showing vanes disposed in an onward flow-guiding position according to certain embodiments of the invention.

According to other embodiments as shown in FIG. 10, when the primary pin 464 of the cam member 460 is operatively moved into engagement with the first portions 442, 450 of respective ones of the first and second cam grooves 440, 448 (refer to FIG. 4) so as to be located proximal to the mid-portions 446, 454 of respective ones of the first and second cam grooves 440, 448, a corresponding movement of the first and second actuating members 426, 434 causes respective ones of the first and second sets of flow-guiding vanes 120*a*, 120*b* to be positioned in their respective onward flow-guiding positions.

Figure 11:
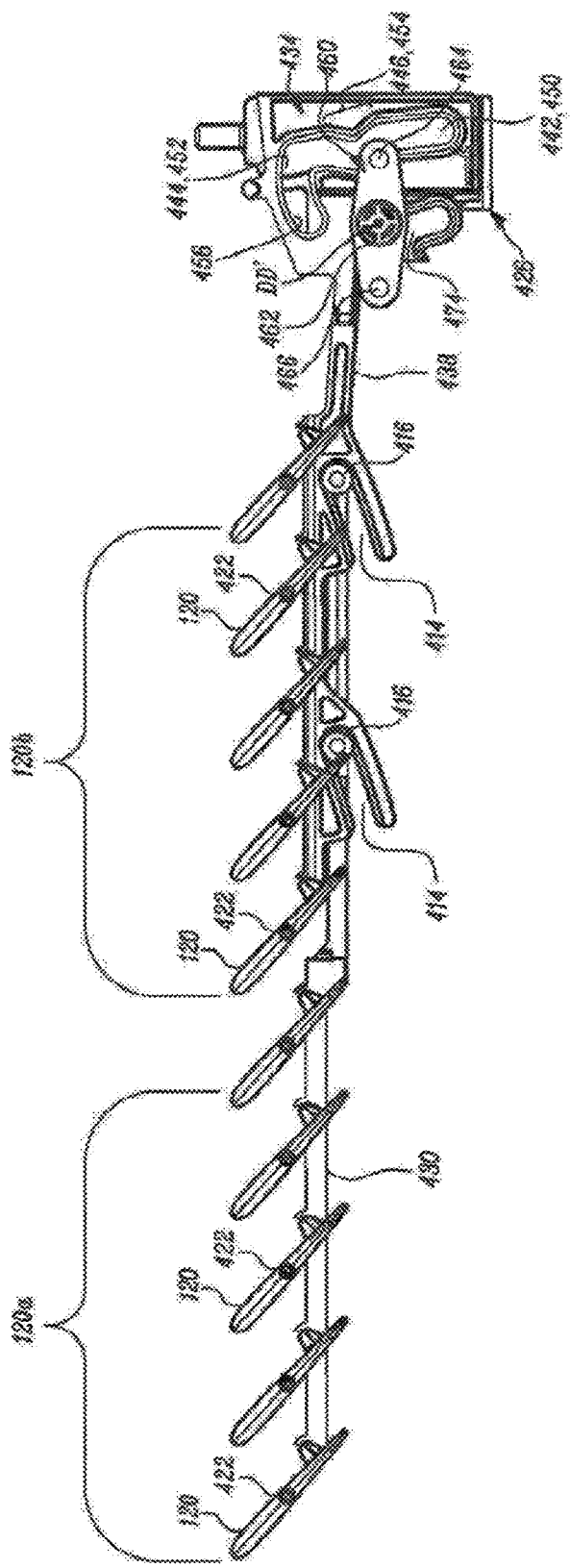
FIG. 11 illustrates a bottom view of the air vent assembly showing vanes disposed in a leftward flow-guiding position according to certain embodiments of the invention.

According to other embodiments as shown in FIG. 11, when the primary pin 464 of the cam member 460 is operatively moved into engagement with the mid-portions 446, 454 of respective ones of the first and second cam grooves 440, 448 (refer to FIG. 4) and is located at a center of the mid-portions 446, 454 of respective ones of the first and second cam grooves 440, 448, a corresponding movement of the first and second actuating members 426, 434 causes respective ones of the first and second sets of flow-guiding vanes 120*a*, 120*b* to be positioned in their respective leftward flow-guiding positions. The flow-guiding vanes 120*a*, 120*b* as shown in FIG. 11 are pointing in a rightward and downward direction as the view of FIG. 9 is the bottom view of the air vent assembly 112.

Figure 12:
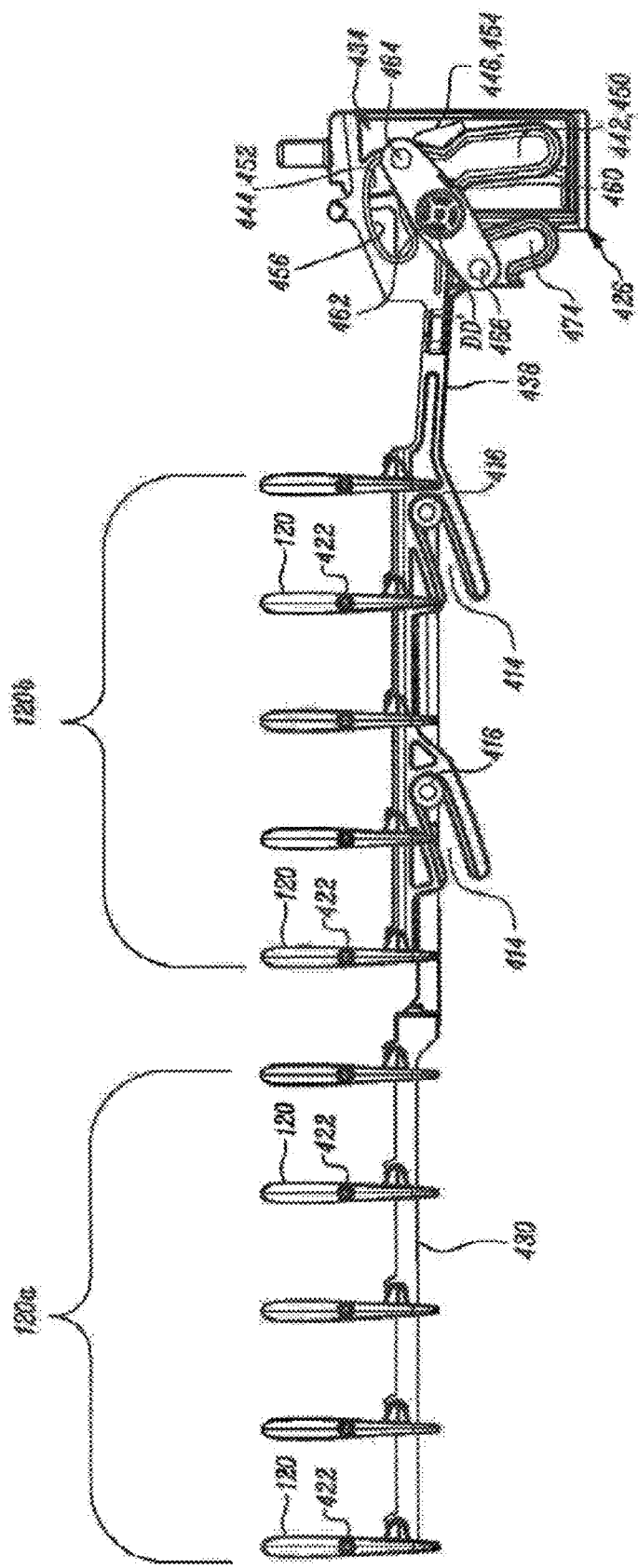
FIG. 12 illustrates a bottom view of the air vent assembly showing vanes disposed in an onward flow-guiding position according to certain embodiments of the invention.

According to other embodiments as shown in FIG. 12, when the primary pin 464 of the cam member 460 is operatively moved into engagement with the mid-portions 446, 454 of respective ones of the first and second cam grooves 440, 448 (refer to FIG. 4) so as to be located proximal to the second portions 444, 452 of respective ones of the first and second cam grooves 440, 448, a corresponding movement of the first and second actuating members 426, 434 causes respective ones of the first and second sets of flow-guiding vanes 120*a*, 120*b* to be positioned in their respective onward flow-guiding positions.

Figure 13:
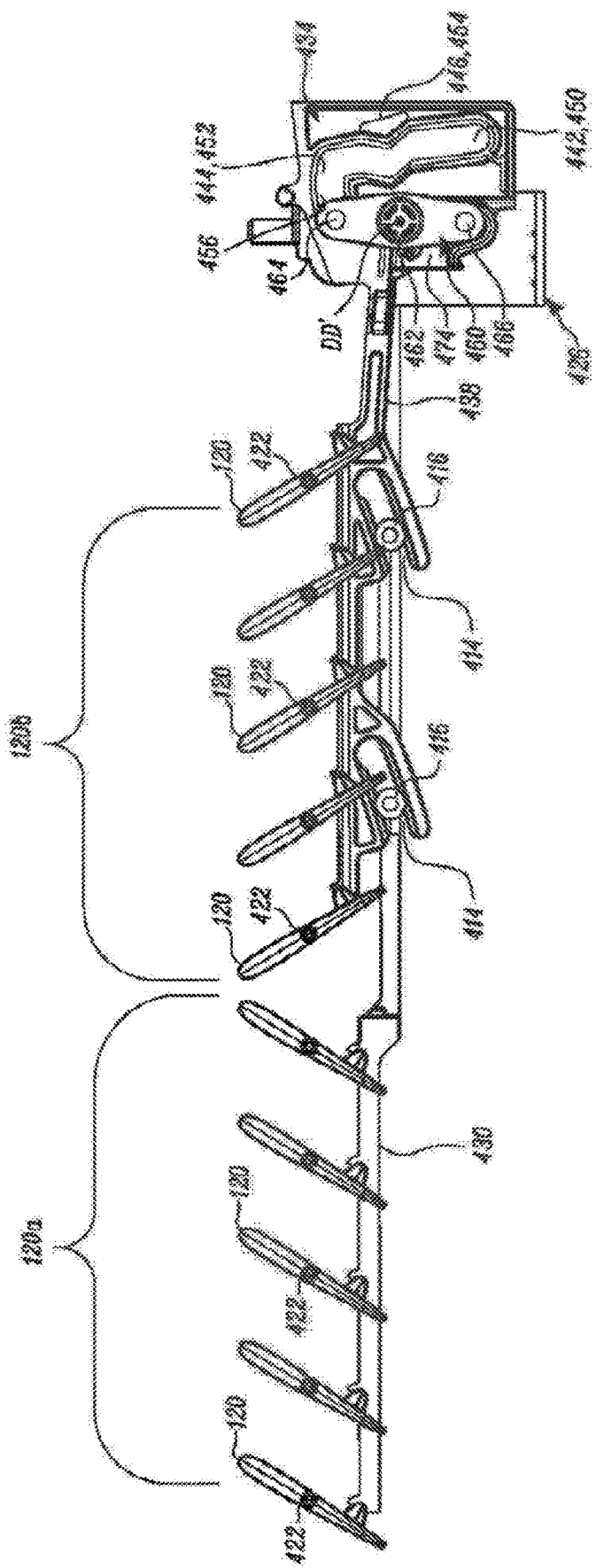
FIG. 13 illustrates a bottom view of the air vent assembly showing vanes disposed in a split flow-guiding position according to certain embodiments of the invention.

According to certain embodiments, as shown in FIG. 13, a rotation of the cam member 460 about the axis DD' of the central portion 462 causes a partially-split flow-guiding position, and if the rotation is continued further a fully-split flow-guiding position. When the primary pin 464 engages with the second portion 442 of the first cam groove 440 to be located distally away from the mid-portions 446, 454 of the first and second cam grooves 440, 448. In this instance, upon further rotation of the cam member 460, the first set of flow-guiding vanes 120*b* rotate about their respective rotational axes AA' towards a leftward flow-guiding position. As the second cam groove 448 comprises a third portion 456, the primary pin 464 of the rotating cam member 460 does not cause the second set of flow-guiding vanes 120*a* to rotate. Rather, the secondary pin 466 of the cam member 460 engages with a retainer groove 474 defined on the second base portion 436, causing the vanes 120 from the second set of flow-guiding vanes 120*b* to rotate about their respective rotational axes AA' towards a rightward flow-guiding position.

For the purposes of this disclosure, the rightward and leftward flow-guiding positions of respective ones of the first and second sets of flow-guiding vanes 120*a*, 120*b* from the foregoing embodiments may be regarded as a split flow-guiding position in which angular positions of respective ones of the first and second flow-guiding vanes 120 may be dissimilar from angular positions of the first and second flow-guiding vanes 120 when both of the first and second flow-guiding vanes 120 are disposed in either of the leftward flow-guiding position or the rightward flow-guiding position. The terms 'partially-split flow-guiding position' disclosed herein is used to refer to a type of the split flow-guiding position in which the first and second sets of flow-guiding vanes 120*a*, 120*b* would be disposed at a first pre-defined angle with respect to one another. The first pre-defined angle disclosed herein may be, in an example, 45 degrees between the first and second sets of flow-guiding vanes 120*a*, 120*b*. In another example, the first pre-defined angle disclosed herein may be 60 degrees. The terms 'fully-split flow-guiding position' is however, another type of the split flow-guiding position in which the first and second sets of flow-guiding vanes 120*a*, 120*b* would be disposed at a second pre-defined angle with respect to one another, the second pre-defined angle being greater than the first pre-defined angle. In an example, if the first pre-defined angle is 45 degrees, then the second pre-defined angle may be implemented by way of a 90-degree angle between the first and second sets of flow-guiding vanes 120*a*, 120*b*. In another example, if the first pre-defined angle is 60 degrees, then the second pre-defined angle may be implemented by way of a 120-degree angle.

In another embodiment, the first and second pre-defined angles may result in the two sets of vanes being asymmetric with respect to one another. By selecting pre-determined lengths of the first and second cam grooves 440, 448, and in particular, a pre-determined length of the third portion 456 of the second cam groove 448 to achieve other values of the second pre-defined angle, such values however being greater in relation to the first pre-defined angle. For example, if the first pre-defined angle is 45 degrees, then the second pre-defined angle may be implemented by way of a 60-degree angle between the first and second sets of flow-guiding vanes 120*a*, 120*b*. In another example, the first pre-defined angle may be 45 degrees while the second pre-defined angle is 120 degrees.

According to certain other embodiments of this invention, the first and second pre-defined angles corresponding to the partially and fully split-flow-guiding positions of the first and second flow-guiding vanes 120 can be pre-defined to the user interface 206 by the user. For example, the user interface 206 of the infotainment device 108 can present to the user via other menu options (not shown)—a range of values for selecting each of the first and second pre-defined angles for subsequent implementation by the processor 208 for rotating the cam member 460 via the rotary actuator 458.

Figure 14B:
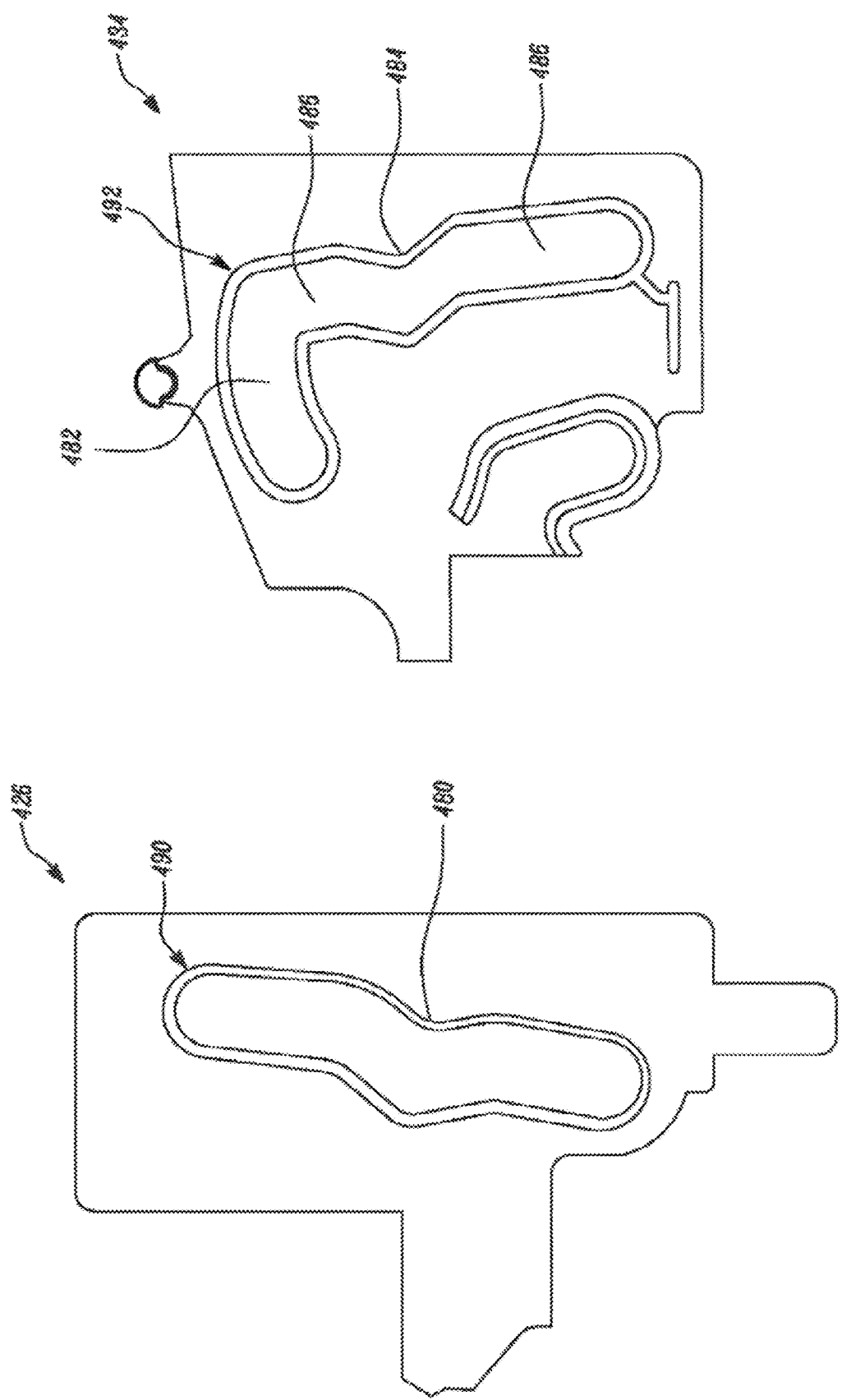
FIG. 14B illustrates cam-groove geometries for the first and second actuating members pursuant to the air vent assembly of FIG. 4 according to certain embodiments of the invention.

FIG. 14A illustrates cam-groove geometries for the pair of actuating members of the air vent assembly according to certain other embodiments of the invention. FIG. 14A illustrates a cam-groove geometry for the first actuating member 426 that is linear and a cam groove geometry for the second actuating member 434 that is curved so as to define a "J" shaped portion 478 therein. FIG. 14B illustrates a different set of cam-groove geometries for the pair of actuating members 426, 434 of the air vent assembly 112 according to certain embodiments of the invention. FIG. 14B illustrates a cam-groove geometry for the first actuating member 426 that that is predominantly linear but includes a bend 480 and a cam-groove geometry for the second actuating member 434 that is curved in a "J" portion 482 and also includes a bend 484 in the linear portion 486 of the cam groove. The specific geometries of the cam grooves 490, 492 defined on the first and second actuating members 426, 434 may be different according to certain embodiments of the invention.

In both of the cam-groove geometries illustrated in FIGS. 14A and 14B, a portion of the cam-groove geometries is the same, and a portion of the cam-groove geometries is different. This allows for the single cam member 460 to cause the vanes 120 from both the first and second sets of flow-guiding vanes 120a, 120b to move in the same direction when the cam member 460 engages the portion of the cam grooves that are of the same geometry and also allows the cam member 460 to move the vanes 120 such that the vanes 120 associated with the first set of flow-guiding vanes 120a are in a different direction than the vanes 120 associated with the second set of flow-guiding vanes 120b when the primary pin 464 engages with the dissimilar portions from respective cam grooves of the first and second actuating members 426, 434. This is particularly important to produce the partial and full split flow-guiding positions disclosed herein.

The specific configurations of the first and second actuating members 426, 434 described above to close the vanes 120 or move the vanes 120 from respective ones of the first and second sets of flow-guiding vanes 120a, 120b into the leftward, rightward, and split flow-guiding position is non-limiting of this disclosure. Rather, it will be acknowledged by persons skilled in the art that various other mechanisms may be used in place of the first and second actuating members 426, 434 disclosed herein without deviating from the spirit of the present disclosure.

Figure 15:
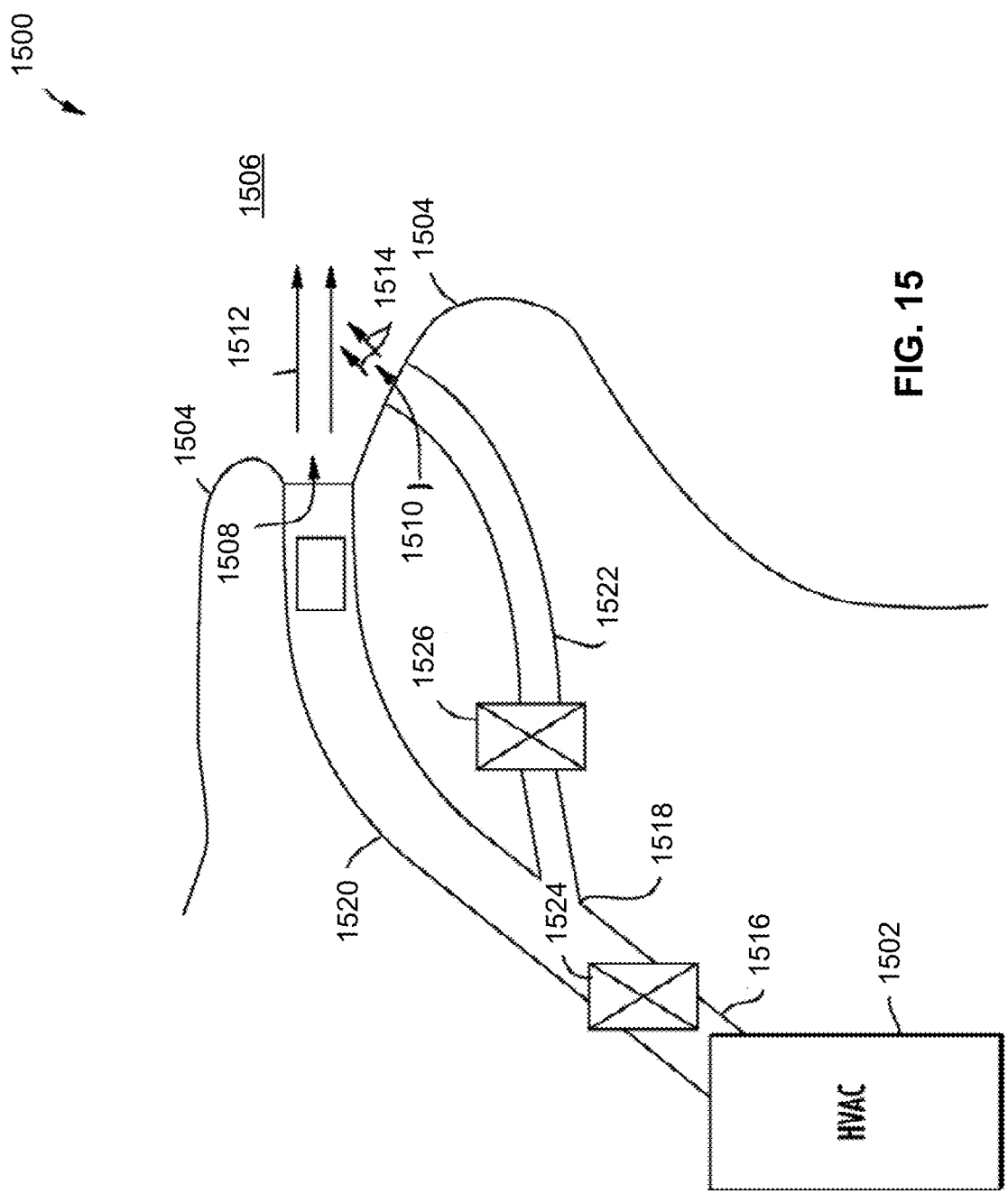
FIG. 15 shows a cross section of an example of a thermal system.

FIG. 15 shows a cross section of an example of a thermal system 1500. The system can be installed in any type of vehicle, such as in a passenger vehicle. For example, the system can be located toward the front of the vehicle. Here, the system includes an HVAC unit 1502. Different types of HVAC units can be used in various implementations. For example, the operation of the HVAC unit is regulated using one or more controls (not shown) so as to selectively provide heating, ventilation and/or air conditioning to vehicle occupants.

An instrument panel 1504 is here provided in the vehicle, the panel facing a passenger compartment 1506. For example, the passenger compartment has seats (e.g., one or more chairs and/or benches) that accommodate occupants. The instrument panel can provide vent openings for the purpose of conditioning the air in the passenger compartment.

Here, a first vent 1508 and a second vent 1510 are provided through the instrument panel. In this example, the vent 108 is regarded as the one that produces a main air stream, in form of a plane of air 1512, and is therefore sometimes referred to as the wave vent. The vent 1510, on the other hand, is here regarded as the one that produces a secondary air stream, in form of a plane of air 1514, and is therefore sometimes referred to as the bleed vent. In this example, the wave vent is oriented essentially in a horizontal direction (e.g., being horizontal or a few degrees above or below horizontal) and the bleed vent is oriented in an upward direction such that the second plane of air intersects the first plane of air.

The supply of air from one or more HVAC units (e.g., the unit 1502) to the respective vents can be facilitated in any of a number of ways. In some implementations, a common duct 1516 originates at the HVAC unit and has one or more branch points 1518. For example, the branch point can create a wave duct 1520 and a bleed duct 1522. The wave duct can lead to the wave vent 1508, and the bleed duct can lead to the bleed vent 1510.

The flow rate can be controlled in one or more ways. In some implementations, a valve 1524 can be positioned in the common duct 1516, or in the HVAC unit. For example, this can regulate the overall air flow that is available to be split between the wave duct and the bleed duct. In some implementations, a valve 1526 can be positioned in the bleed duct 1522. This can be used to control the amount of flow through the bleed vent. Combinations of these approaches can be used. That is, the present example illustrates the common duct 1516 supplying air from the HVAC unit 1502 into the duct 1520 leading to the wave vent 1508, and into the bleed duct 1522 leading to the bleed vent 1510.

The amounts of air flow through the respective ducts can be set to a variety of levels relative to each other depending on the particular implementation and the situation in which the system is being used. In some implementations, the flow through the bleed vent can be regulated to control the relative position and direction of the air stream generated by the wave vent. For example, increasing the flow through the bleed vent can raise the wave air stream, and decreasing the flow can lower the air stream.

That is, the foregoing illustrates an example of the thermal system 1500 having the vents 1508 and 1510. The vent 1508 has a high aspect ratio and is coupled to the HVAC unit 1502 so as to generate the plane of air 1512 in the passenger compartment 1506. The vent 1510 also has high aspect ratio and is coupled to the HVAC unit 1502 to generate the plane of air 1514 in the passenger compartment 1506. Finally, the vent 1510 is positioned so that the plane of air 1514 intersects the plane of air 1512.

The foregoing also illustrates an example of a method that can be performed in a vehicle. Such a method can include providing a supply of air using the HVAC unit 1502.

The method can include generating the plane of air 1512 into the passenger compartment 1506 from the supply of air, wherein the plane of air 1512 has a high aspect ratio. The method can also include generating the plane of air 1514 into the passenger compartment 1506 from the supply of air. The plane of air 1514 intersects the plane of air 1512.

Figure 16:
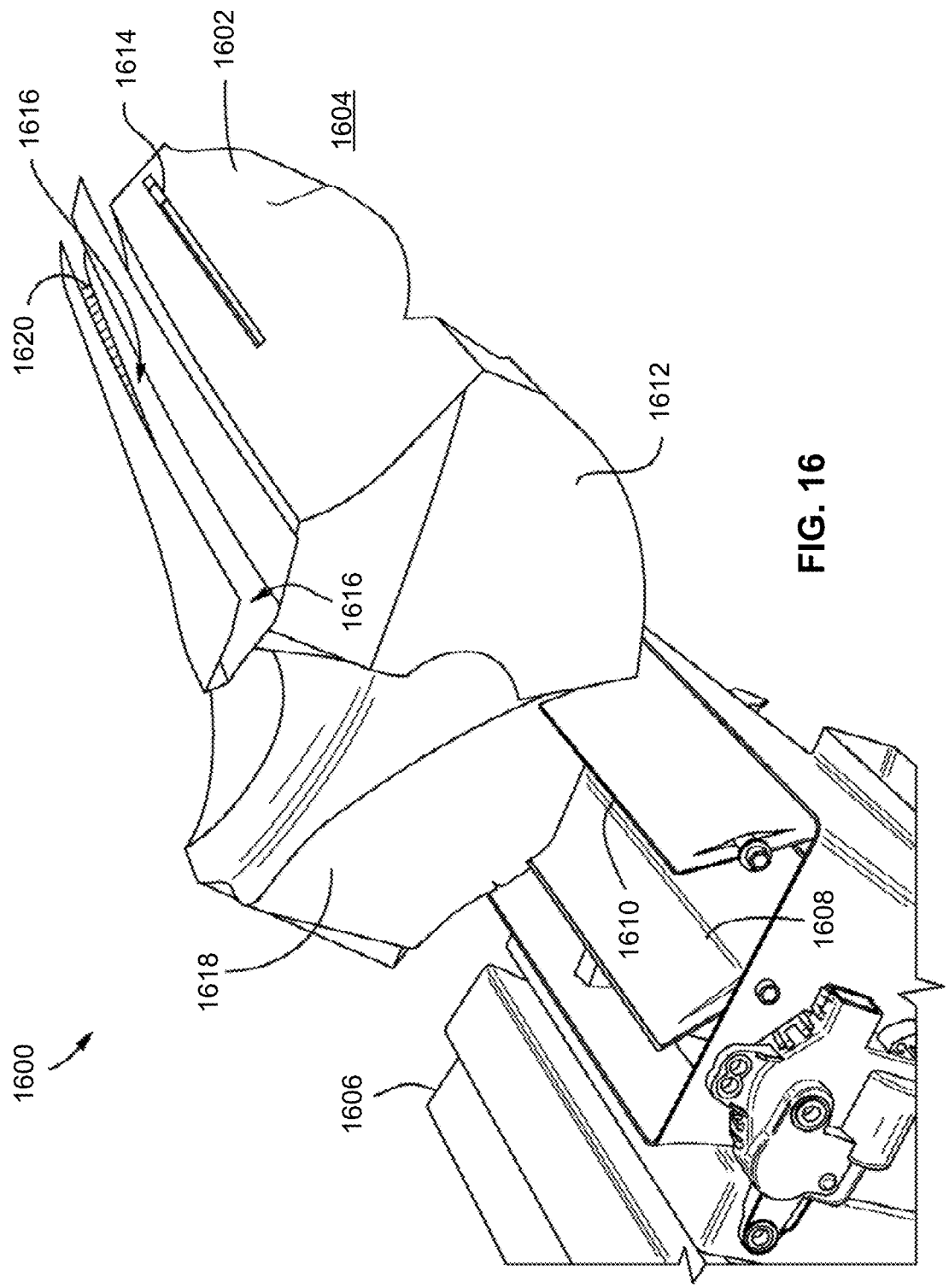
FIG. 16 shows a cross section of another example of a thermal system.

FIG. 16 shows a cross section of another example of a thermal system 1600. Some components of the system 1500 (FIG. 15) can also be used in the system 1600 and these components will not be described in detail. Here, an instrument panel 1602 is partially shown, the instrument panel facing toward the interior of the cabin of a vehicle 1604. An HVAC unit 1606 is partially shown. For example, the HVAC unit is configured for receiving air through one or more inlets and conditioning the air in one or more ways before introducing it into the cabin. A panel door 1608 regulates air flow from the HVAC unit to the instrument panel. For example, the door can include a flat member that is controlled to pivot relative to an outlet of the HVAC unit to regulate the air supply therefrom. A bleed door 1610 regulates the amount of air flow into a bleed duct 1612 which in turn leads to a bleed outlet 1614. For example, the bleed door can be pivoted relative to the bleed duct and the outlet of the HVAC unit so as to allow varying amounts of air flow into that duct.

A wave outlet 1616 is here partially shown. The wave outlet can provide the main air stream from the instrument panel toward the occupant(s), and can be fed through a wave duct 1618 coupled to the HVAC unit. The wave outlet and the bleed outlet can both have high aspect ratios. For example, this can allow the wave outlet to be positioned as a non-flush vent that generates a first plane of air into the passenger compartment, and the bleed outlet can act as a secondary vent generating a second plane of air that intersects the first plane.

The ducts leading to either of the vents, or both, can have one or more vanes to control a direction of the air flow. Here, the wave outlet 1616 has a guide vane 1620. In this example, the wave vent is positioned above the bleed vent on the instrument panel 1602. For example, the guide vane 1620 controls the left-right direction, whereas the bleed vent can regulate the up-down direction, of the air jet from the wave outlet. The user can change these settings (e.g., left-right or up-down directions) using one or more virtual controls presented on a touchscreen in the vehicle. A user input made using such control(s) can then trigger a control signal that changes the orientation of the vanes (for left-right direction) and/or a control signal that changes the amount of flow through the bleed outlet 1614 (for up-down direction).

The wave outlet 1616 and the bleed outlet 1614 here each has a high aspect ratio. While the entire wave outlet is not visible due to the section (which is done for illustrative purposes), the figure shows that the respective vents are essentially parallel to each other, and that the wave vent is longer than the bleed vent. In some implementations, the problem of a planar air stream from a non-flush vent sticking to the instrument panel can be satisfactorily addressed also when the secondary vent (that here generates the bleed air stream) is shorter than the main vent. In some implementations, multiple bleed vents can be used with one wave vent, or vice versa. In other implementations, the vents can have approximately the same size as each other. For example, the bleed outlet cannot be more than about 30% narrower than the wave outlet.

This figure illustrates an example of a benefit that can be obtained using high aspect ratio vents: that an instrument panel (or other surface inside the cabin) can be made with a clean design that is free of obtrusive mechanical features and other primarily functional elements. For example, the vents here present streamlined horizontal openings that give a much different visual impression than the traditional vents that have significantly lower aspect ratios. As such, the vents may have no mechanical adjustment mechanisms visible on the instrument panel. Rather, the vents can be regulated using virtual controls.

Figure 17:
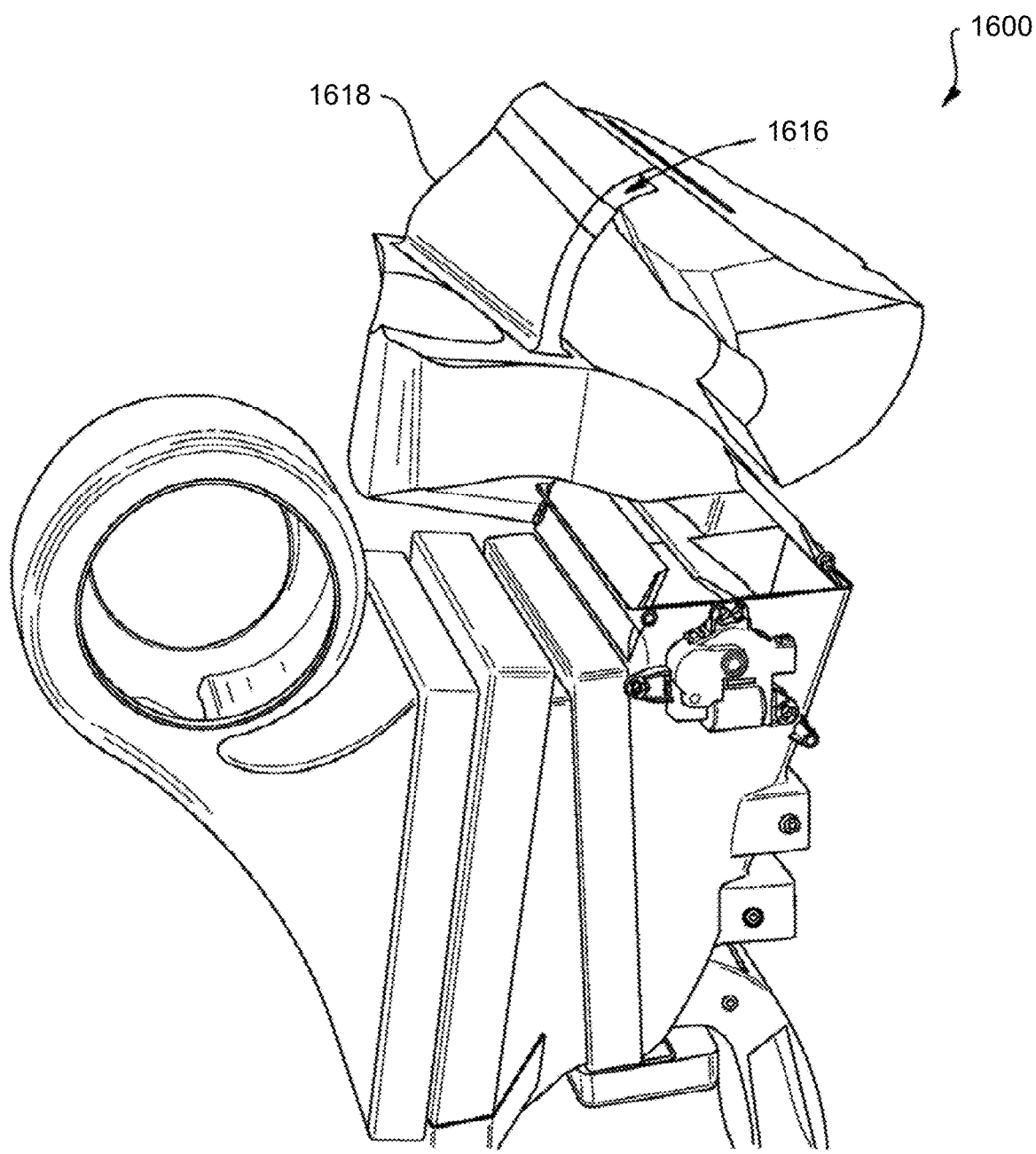
FIG. 17 shows another cross section of the thermal system in FIG. 16.

FIG. 17 shows another cross section of the thermal system 1600 in FIG. 16. The illustration shows that the wave duct 1618 can have a relatively flat configuration nearest the wave outlet 1616. For example, this can be done to meet packaging constraints. Here, this end of the wave duct is somewhat curved, resulting in the vent being oriented essentially in a horizontal direction.

Figure 18:
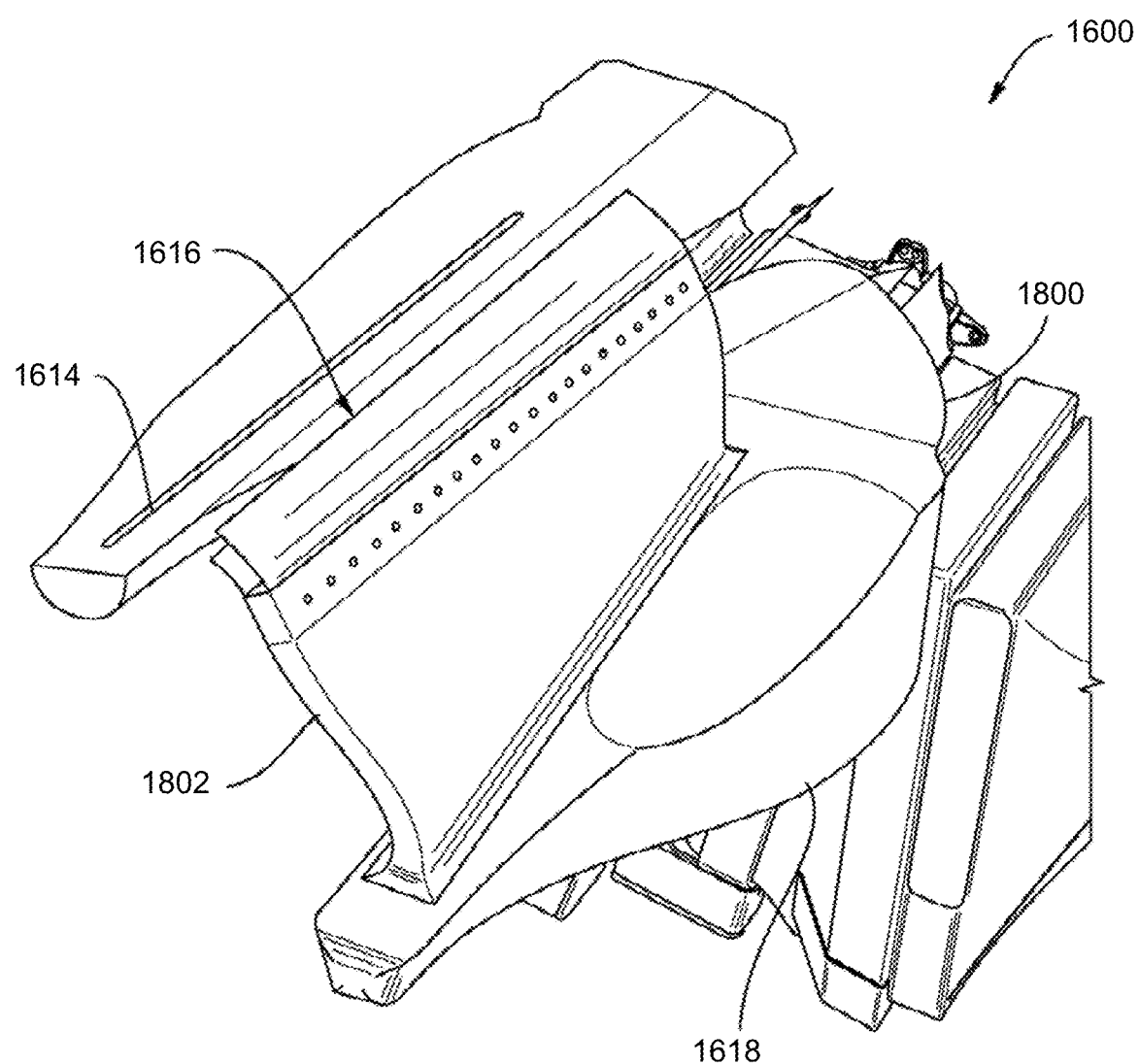
FIG. 18 shows another view of the thermal system in FIG. 16.

FIG. 18 shows another view of the thermal system 1600 in FIG. 16. This illustration shows the wave outlet 1616 and the bleed outlet 1614 somewhat from above so as to present more of the wave duct 1618 into view. In particular, the wave duct here has a voluminous portion 1800 nearest the HVAC unit, which portion then feeds into a narrower wave duct 1802 that leads to the wave outlet. For example, this can improve the characteristics of the air flow into the main vent.

Figure 19:
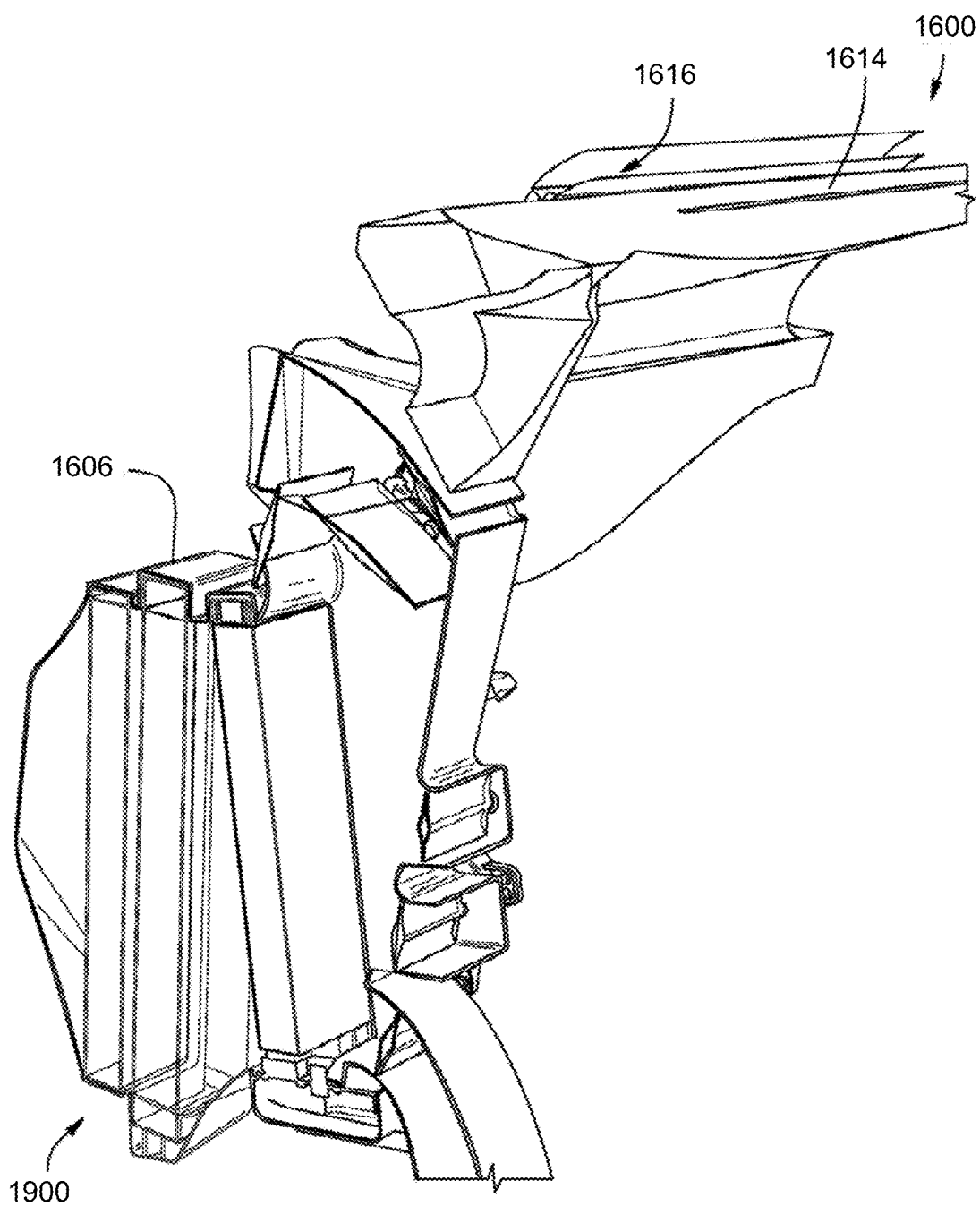
FIG. 19 shows another cross section of the thermal system in FIG. 16.

FIG. 19 shows another cross section of the thermal system 1600 in FIG. 16. This illustration shows the wave outlet 1616 and the bleed outlet 1614 more from the side so as to present more of the HVAC unit 1606. In particular, the HVAC unit can include a filter section 1900 that can facilitate filtering of one or more air streams. For example, a fresh-air filter (e.g., a HEPA filter) can be applied to air that is drawn from an inlet of the HVAC unit (e.g., from outside the vehicle) before that air is supplied into the duct(s) for the passenger compartment. As another example, a recirculation air filter can be applied to air that the HVAC system draws from the cabin before re-supplying that air into the cabin again.

Figure 20:
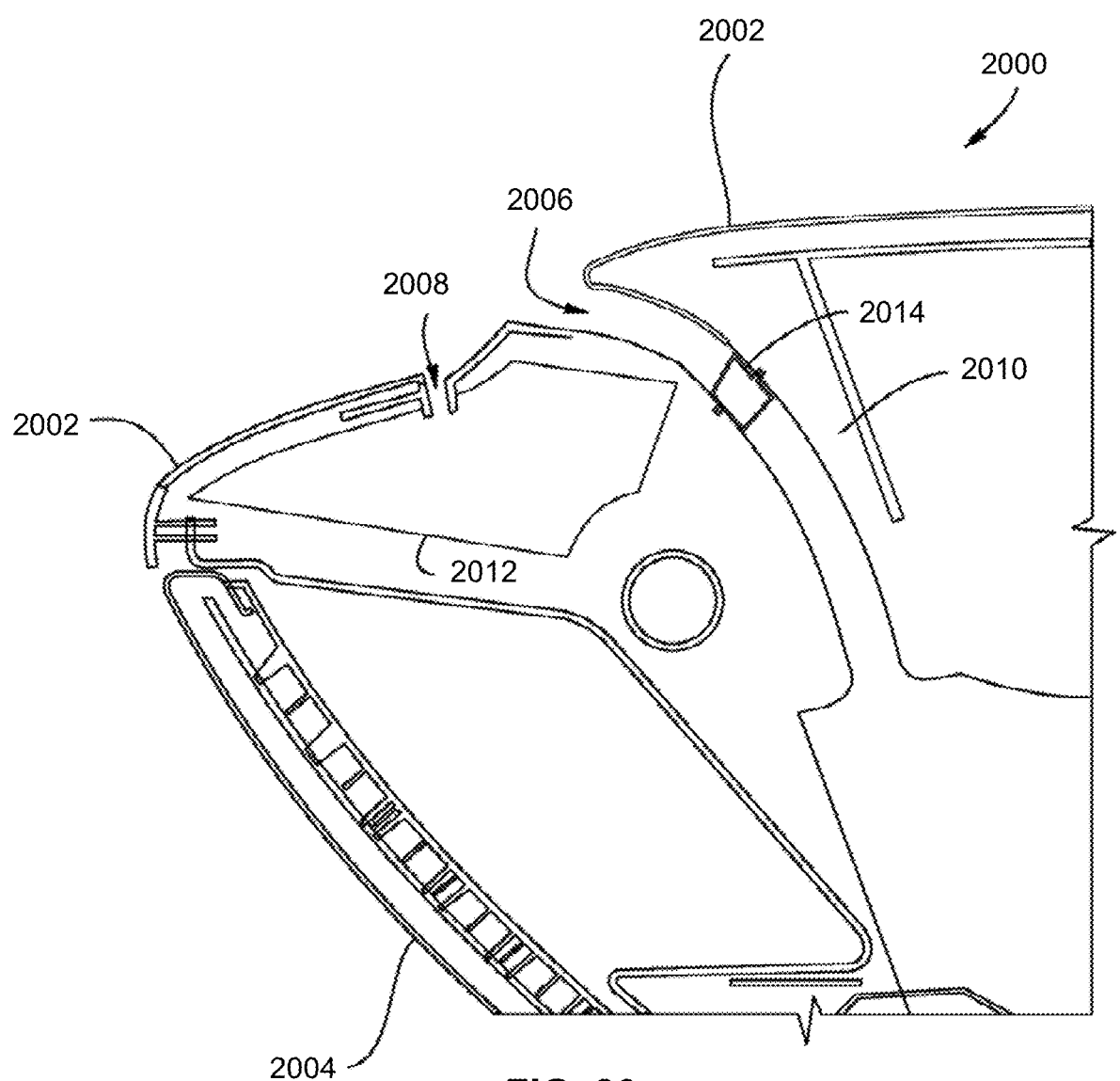
FIG. 20 shows a cross section of another example of a thermal system.

FIG. 20 shows a cross section of another example of a thermal system 2000. The system includes an instrument panel 2002, a glove compartment door 2004, a vent 2006 that is non-flush with regard to the instrument panel, another vent 2008 in the instrument panel, a duct 2010 leading to the vent 2006, a duct 2012 leading to the vent 2008, and a vane 2014 (e.g., vanes shown in FIGS. 4-13) in the duct 2012 for controlling the flow of air through the vent 2006. As such, the vent 2006 can receive air supplied from an HVAC unit (not shown) and as a result generate a first plane of air that emanates from the instrument panel 2002. The vent 2008, moreover, can also be supplied with air (e.g., from the same HVAC unit) and can generate a second plane of air that intersects the first plane.

Figure 21:
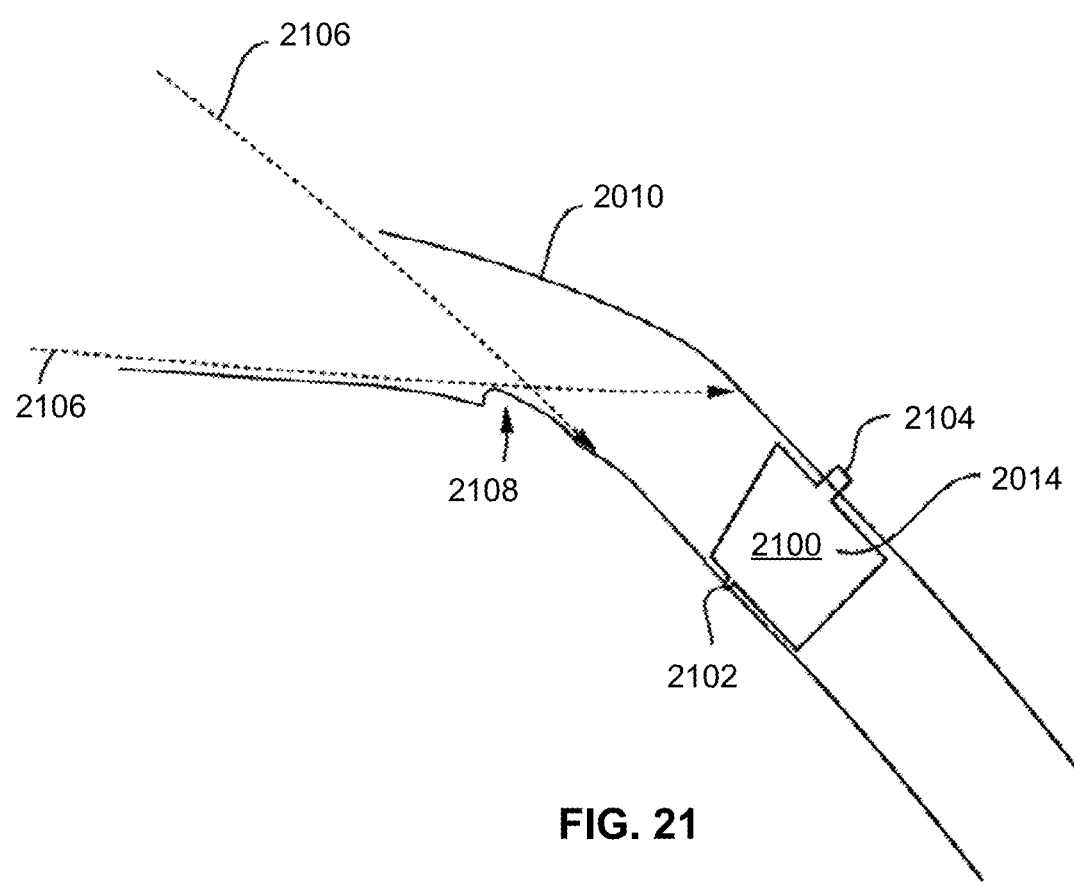
FIG. 21 shows an example of the duct with the vane from FIG. 20.

FIG. 21 shows an example of the duct 2010 with the vane 2014 from FIG. 20. Here, the vane includes a body 2100 (e.g., a relatively flat member) that is pivotable about at least one point 2102. A control shaft 2104 can be used to set the vane in a particular direction relative to the duct. For example, the control shaft can be actuated using a motor that is controlled directly by a user, or indirectly by the vehicle's control system. One or more vanes can be used in the same duct, such as side-by-side with each other.

The duct 2010 is curved. For example, this can accommodate a particular orientation of the vent relative to the instrument panel and/or can accommodate a desirable placement of the rest of the ductwork and the HVAC unit relative to the vehicle interior. As another example, the curvature can facilitate an aesthetic appearance to the vent such that the vane and other functional elements are not immediately visible. For example, lines-of-sight 2106 are here indicated, corresponding to the extreme angles from which a person can look into the duct. In some implementations, the curved duct and the vane are arranged so that the vane is away from the lines-of-sight.

A step 2108 is here provided inside the duct 2010. For example, this can prevent that liquids, debris or other objects accidentally fall into the vent and its duct. The step can have any suitable shape and can be formed from the material of the duct, or as a separate piece.

Figure 22:
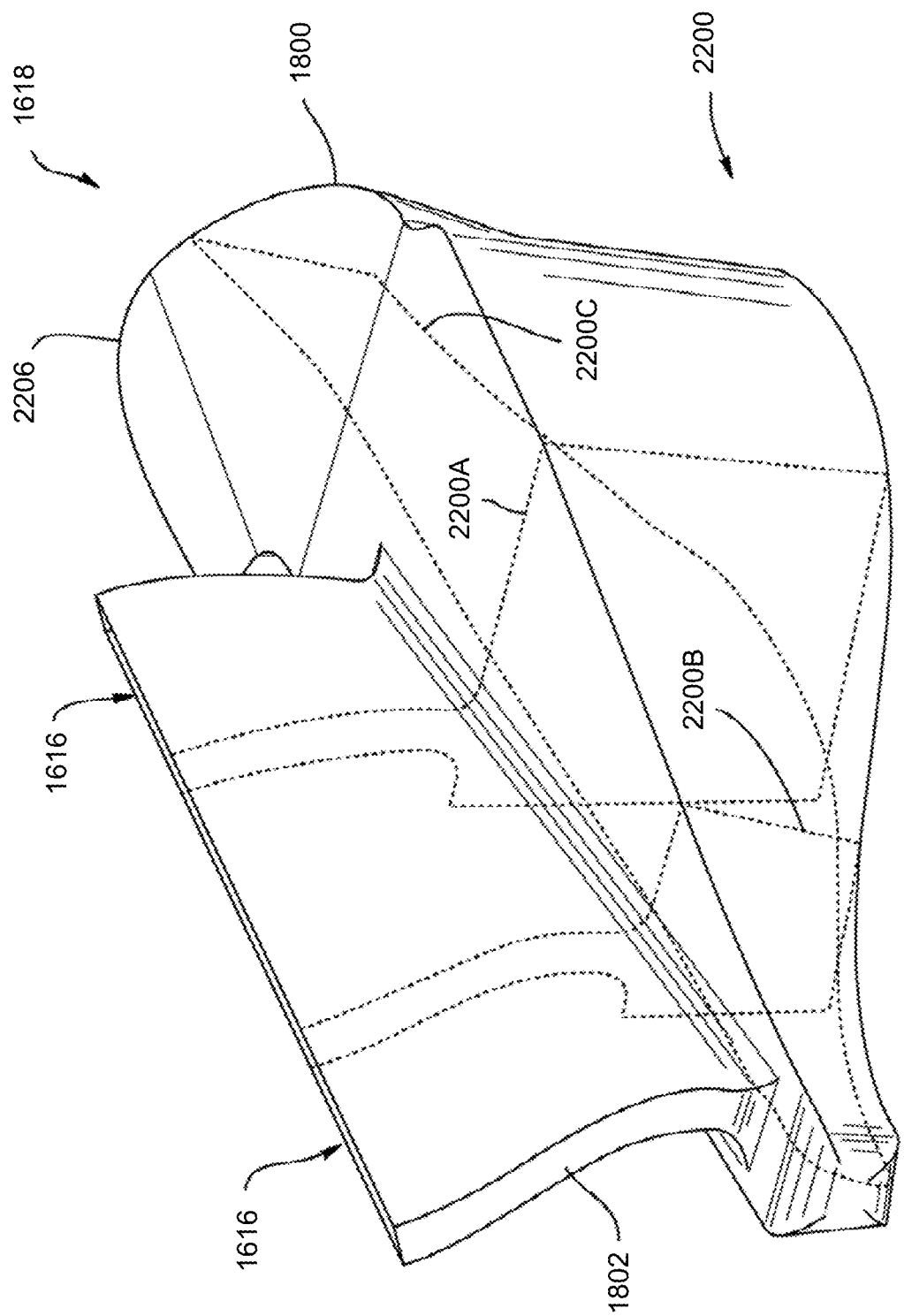
FIG. 22 schematically shows the duct for the vent of the thermal system in FIG. 16.

FIG. 22 schematically shows the duct 1618 for the vent 1616 of the thermal system in FIG. 16. The duct here includes the voluminous portion 1800 and the narrower wave duct 1802. The voluminous portion 1800 can be the one placed nearer the HVAC unit of these two components, whereas the narrower wave duct 1802 can feed air from inside the portion 1800 toward the vent 1616.

As indicated, the interior of the voluminous portion 1800 is hollow so as to accommodate a volume of air. Here, the interior shape of the portion 1800 is schematically represented by profile lines 2200. In particular, profile lines 2200A and 2200B indicate the transverse size and shape of the large duct, and how it feeds into the narrower wave duct 1802. A profile line 2200C, moreover, indicates the longitudinal size and shape of the larger duct from one end (e.g., near the HVAC unit) to the other (e.g., farthest from the HVAC unit).

Figure 23:
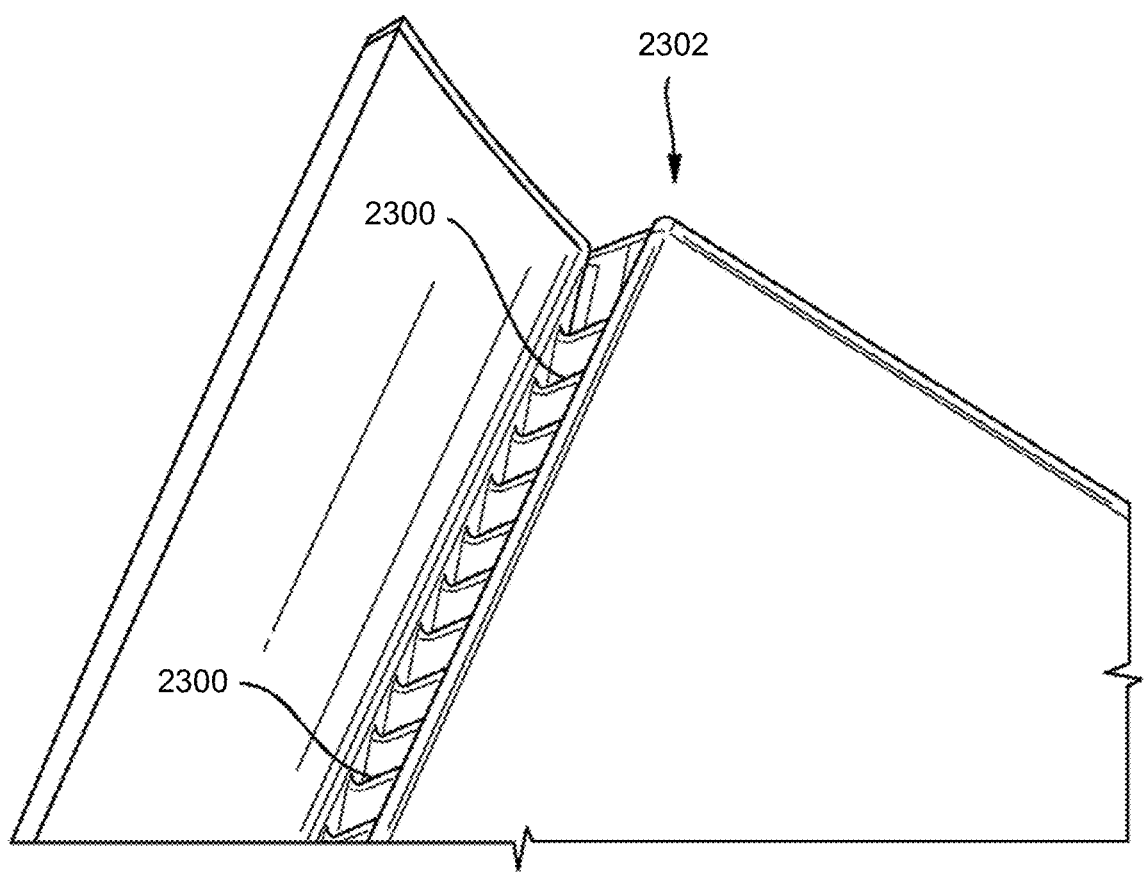
FIG. 23 shows an example of ribs on a vent.

FIG. 23 shows an example of ribs 2300 on a vent 2302. In some implementations, the vent can be considered the secondary vent in regard to a main vent (not shown), such that the vent 2302 is configured to provide a plane of air that affects the direction and flow of the plane of air generated by the main vent. For example, the vent 2302 can be located on an instrument panel of a vehicle, such as in a position below and parallel to, the main vent. The ribs can prevent that debris or other objects accidentally fall into the vent and its duct.

The secondary vent can have any suitable shape. In some implementations, the secondary vent can include a mesh-covered opening that extends over part or all of an interior surface in the vehicle.

Figure 24:
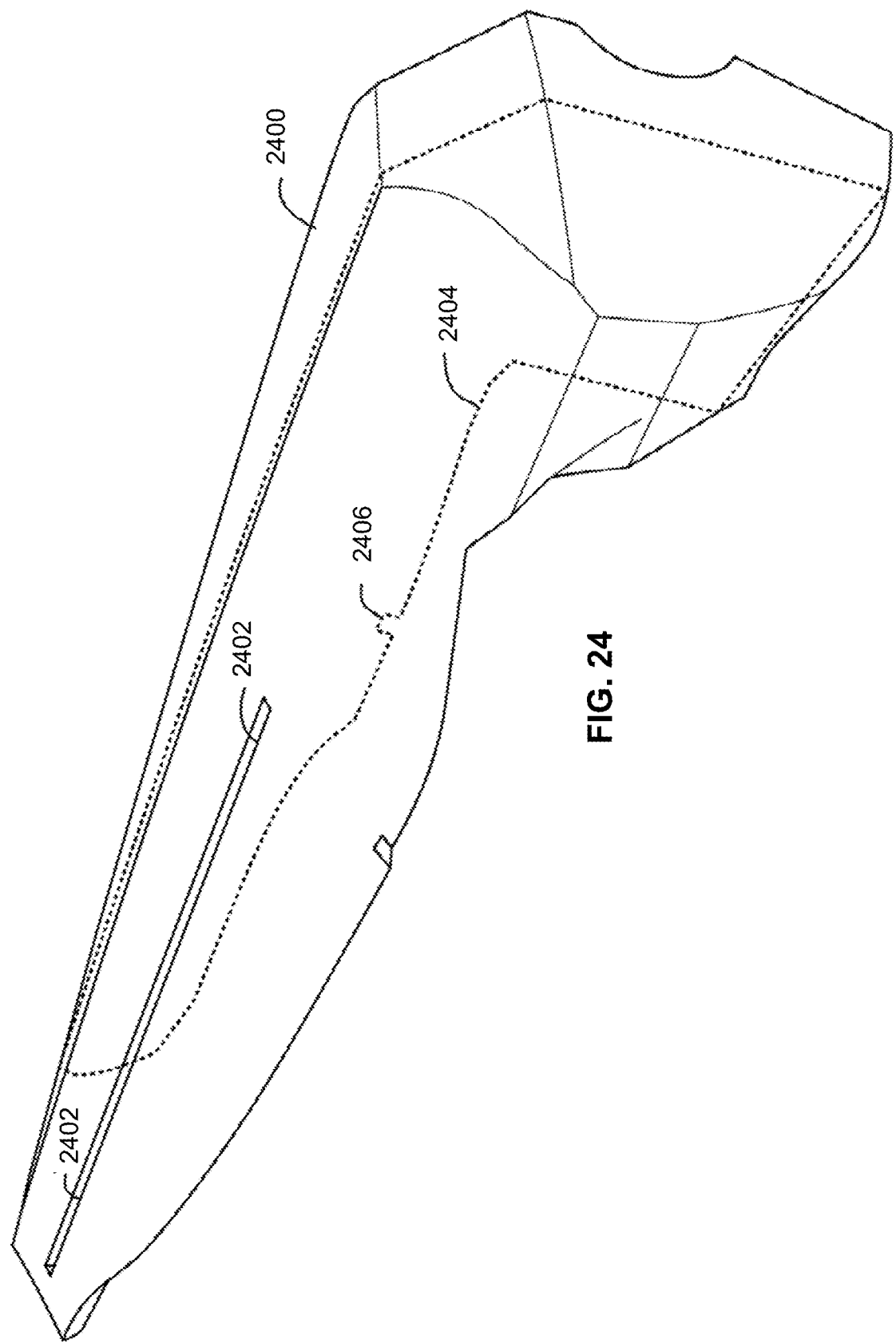
FIG. 24 shows an example of a step within a duct.

FIG. 24 shows an example of a step within a duct 2400. Here, the duct leads to a vent 2402. For example, in an instrument panel where a main vent generates a plane of air, the vent 2402 can serve as a secondary vent that guides the main plane of air. The inside of the duct is at least partially hollow and forms a plenum inward of the vent 2402. The interior shape of the duct is here schematically indicated by a profile line 2404. The hollow interior can have at least one step 2406. In some implementations, when items or liquid enter the duct through the vent, the step can prevent it or them from passing further into the thermal system. For example, if the items were to pass all the way into the HVAC unit this would require a more complex service procedure. The step can have any suitable shape and can be formed from the material of the duct, or as a separate piece. In some implementations, the ribs 2300 (FIG. 23) are provided on the vent 2402.

Figure 25:
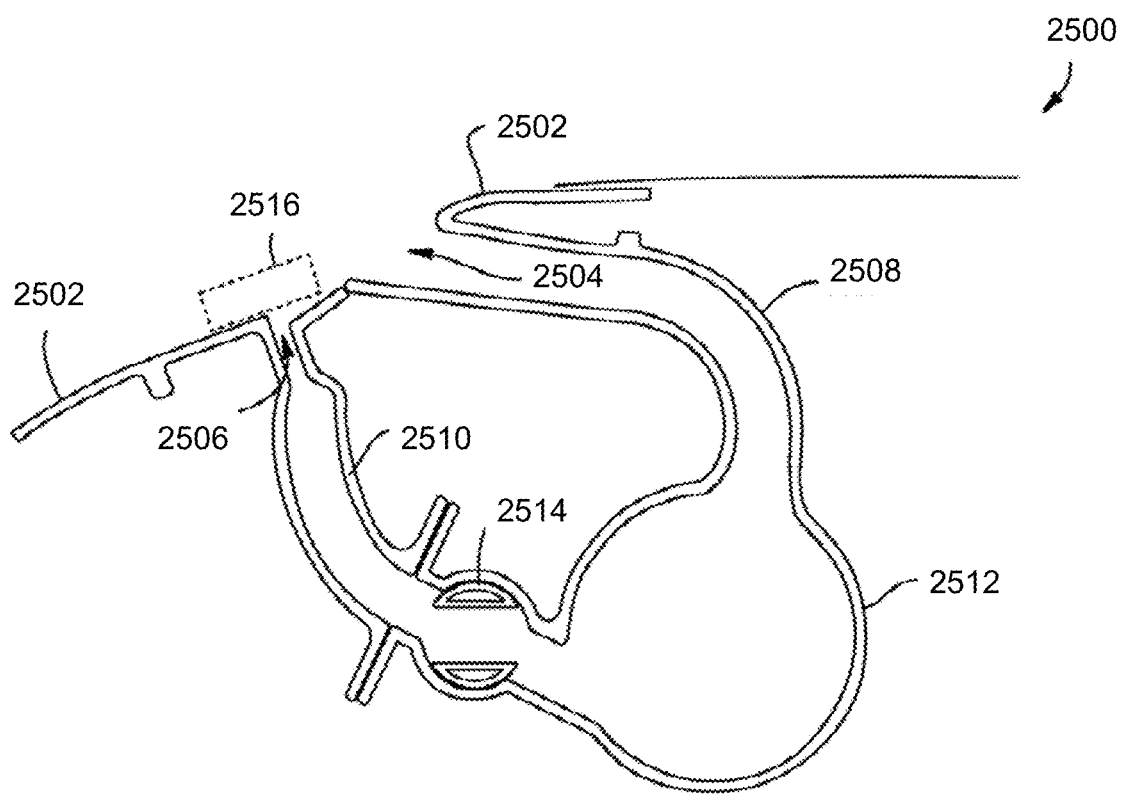
FIG. 25 shows a cross section of another example of a thermal system.

FIG. 25 shows a cross section of another example of a thermal system 2500. The system includes an instrument panel 2502, a vent 2504 that is non-flush with regard to the instrument panel, another vent 2506 in the instrument panel, a duct 2508 leading to the vent 2504, a duct 2510 leading to the vent 2506, and a common duct 2512. A valve 2514 is here positioned in the duct 2510. As such, the vent 2504 can receive air supplied from an HVAC unit (not shown) and as a result generate a first plane of air that emanates from the instrument panel 2502. The vent 2506, moreover, can also be supplied air (e.g., from the same HVAC unit) and can generate a second plane of air that intersects the first plane.

In examples above, it has been mentioned that when a high aspect ratio vent is non-flush with the instrument panel it can tend to stick to the surface thereof under certain circumstances. A region 2516, which is here schematically illustrated as a rectangle, is generated by the air stream. Such a region, which occurs in this implementation and the other examples described herein, can be considered a reduced air pressure zone at or near the instrument panel and can cause the above situation of sticking. The vent 2506, moreover, can be positioned so that it feeds into this zone of lower air pressure. This can tend to reduce the sticking of the main air stream to the surface and therefore facilitate a more effective directional control thereof. Accordingly, this is one mechanism by which the vent 2506 or corresponding structures can provide a useful advantage. In a sense, the bleed vent can then be placed before the point where the main jet stream would attach to the surface of the instrument panel, to prevent or reduce the occurrence of this.

Another mechanism by which the vent 2506 can provide a useful advantage is by way of collision between the respective planes of air (e.g., from the vents 2504 and 2506), which can allow the secondary jet to push the primary jet toward a desired direction, for example so that it becomes aimed at an occupant, or a particular place on that occupant's body. In a sense, the bleed vent can then be placed after the point where the main jet stream attaches to the surface of the instrument panel, to facilitate a de-attachment therefrom.

The duct 2510 for the vent 2506 is here shown as having a separate piece downstream of the valve 2514. For example, this can facilitate substitution of a different piece to relocate the secondary vent, such as to obtain a different instrument panel configuration, for example with a different type/model of vehicle.

Figure 26:
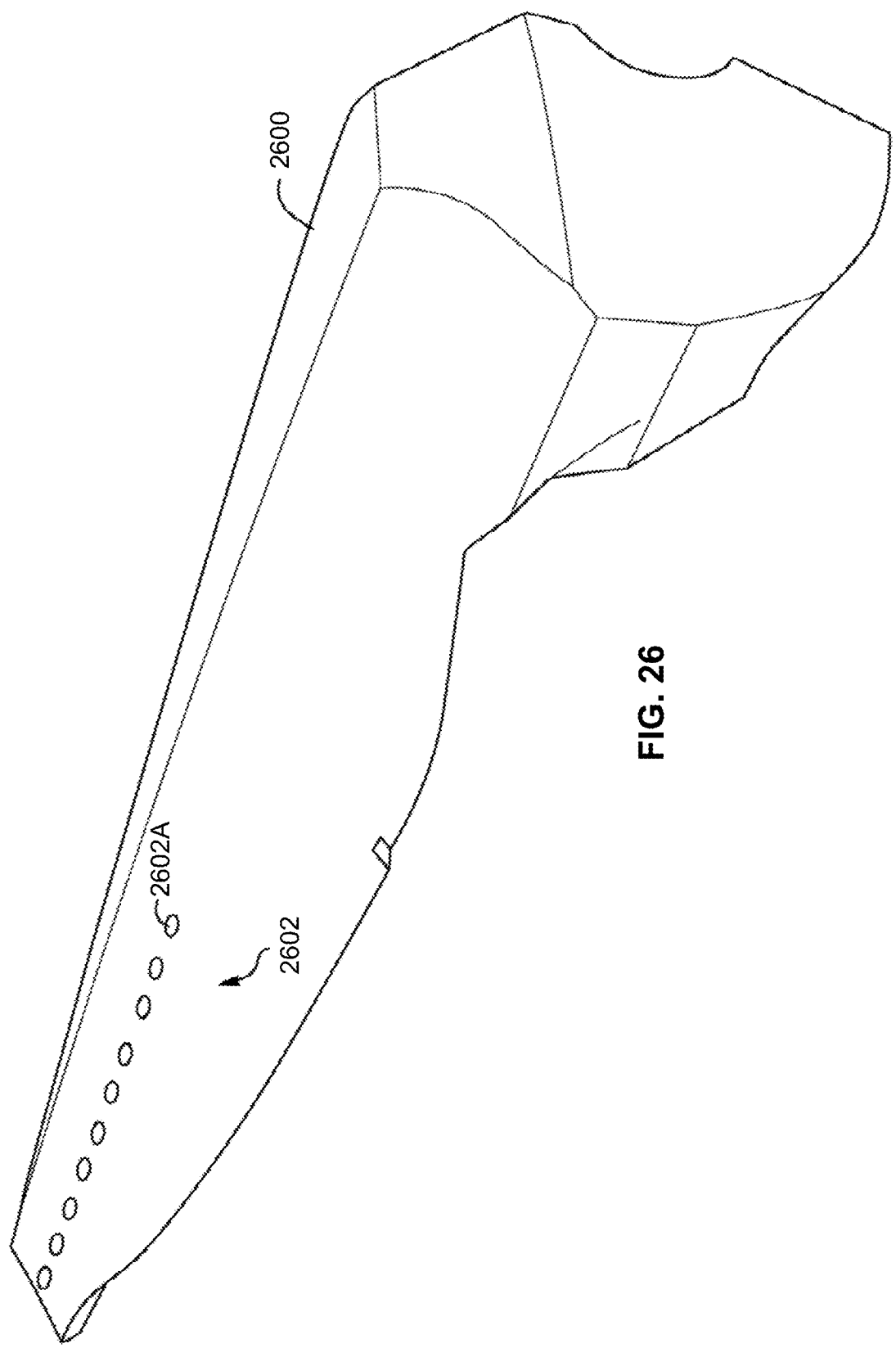
FIG. 26 shows another example of a duct with a secondary vent.

FIG. 26 shows another example of duct 2600 with a secondary vent 2602. For example, the secondary vent 2602 can serve to guide a plane of air generated by a main duct in an instrument panel. The secondary vent can do so by generating a plane of air that intersects with the jet stream from the main vent. The secondary vent 2602 here includes a number of vent outlets 2602A. In this example, each individual vent outlets does not have a high aspect ratio. Rather, the grouping of multiple vent outlets within the secondary vent 2602 effectively gives this vent a high aspect ratio. These vent outlets are essentially circular but can have a different shape in another implementation, including, but not limited to, square.

It was mentioned earlier that one or more high aspect ratio vents can be used in an instrument panel, among other places of a vehicle. Moreover, some examples above (e.g., FIG. 16) have illustrated vents directed primarily toward a right side seat in the first row (which is the passenger seat in certain countries, such as the US). However, vents can also or instead be provided for the seat on the opposite side. In some implementations, a similar or identical set of vents are provided for each seat in the first row. For example, the driver side can have one main vent with one or more secondary vents, and the passenger side can have one main vent with one or more secondary vents. A central interruption between the sets of vents can then accommodate other structure in the instrument panel, including, but not limited to, a touchscreen control pane.

Figure 27A:
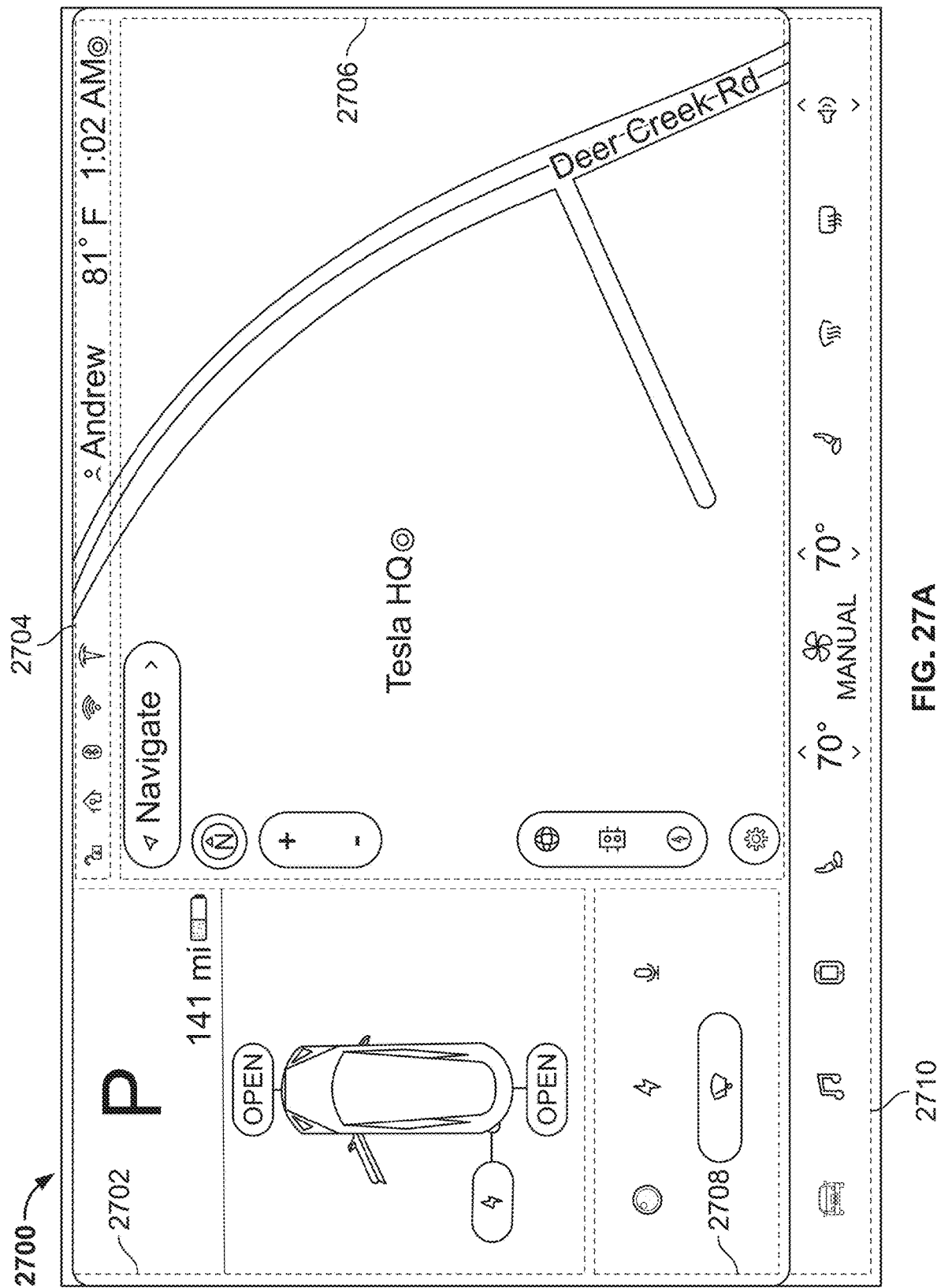
FIG. 27A is a diagram illustrating an embodiment of a user interface for displaying a status of a vehicle and controlling configurations of the vehicle.

FIG. 27A is a diagram illustrating an embodiment of a user interface for displaying a status of a vehicle and controlling configurations of the vehicle. In some embodiments, graphical user interface 2700 is an example of user interface 206 of FIG. 2 and/or an interface shown on infotainment device 108 of FIG. 1. For example, graphical user interface 2700 is displayed on a touchscreen display coupled to (e.g., placed in the middle of) a dash console. A user may interact with the user interface via touch inputs. The example shown in FIG. 27A is merely one example of various different embodiments. In various other embodiments, other display regions, information, configurations, menus, buttons, and icons may be provided. In some embodiments, one or more elements shown in the example of FIG. 27A are not included. User interface 2700 includes regions 2702, 2704, 2706, 2708, and 2710.

Region 2702 dynamically displays the current status of a vehicle. For example, one or more of the following is indicated in region 2702: gear selection, vehicle speed, door open status, light status, warning message, detected lane lines, detected surrounding vehicles, parking sensor information, cruise control status, autonomous driving status, battery status, driving range, etc. By interacting with buttons in region 2702, the user is able to open a rear truck, a front trunk, and an electric vehicle charge port.

Region 2708 dynamically updates to display other vehicle information (e.g., on overlaid cards). For example, one or more of the following is indicated in region 2708: telephone call information, seat belt status, window wiper state, voice command status, trip computer information, tire pressure information, etc. By interacting with buttons in region 2708, the user is able to view an image from a rear camera, invoke the vehicle charging menu, initiate a voice command, and/or control windshield wipers.

Region 2704 displays the time, outdoor temperature, shortcut (e.g., "T" icon) to display vehicle information, network strength, Bluetooth status, passenger airbag status, and warning message indicator. It also provides shortcuts to lock/unlock the vehicle and to access settings for features such as HomeLink, driver profiles, software updates, and Wi-Fi settings.

Region 2706 displays a navigation map and Global Positioning System (GPS) route guidance information. Using buttons and text input fields of region 2706, a user is able to view and navigate a map and search for addresses, points of interest, electric vehicle charging locations, etc.

Region 2710 displays a persistent navigation bar including buttons/icons to trigger features and/or invoke a new interface area/window that provides configuration controls/options to control corresponding features. For example, as shown in region 2710, buttons/icons are provided to control/configure: vehicle controls and settings (e.g., "car" icon), media/music player (e.g., "musical note" icon), phone (e.g., "phone" icon), driver seat heater (e.g., left "seat" icon), desired driver climate temperature (e.g., left "temperature number" icon with up and down arrows), climate control (e.g., "fan" icon), desired passenger climate temperature (e.g., right "temperature number" icon with up and down arrows), passenger seat heater (e.g., right "seat" icon), front windshield climate control (e.g., "front windshield" icon), rear window heater (e.g., "rear window" icon), and volume control (e.g., "speaker" icon with up and down arrows).

Figure 27B:
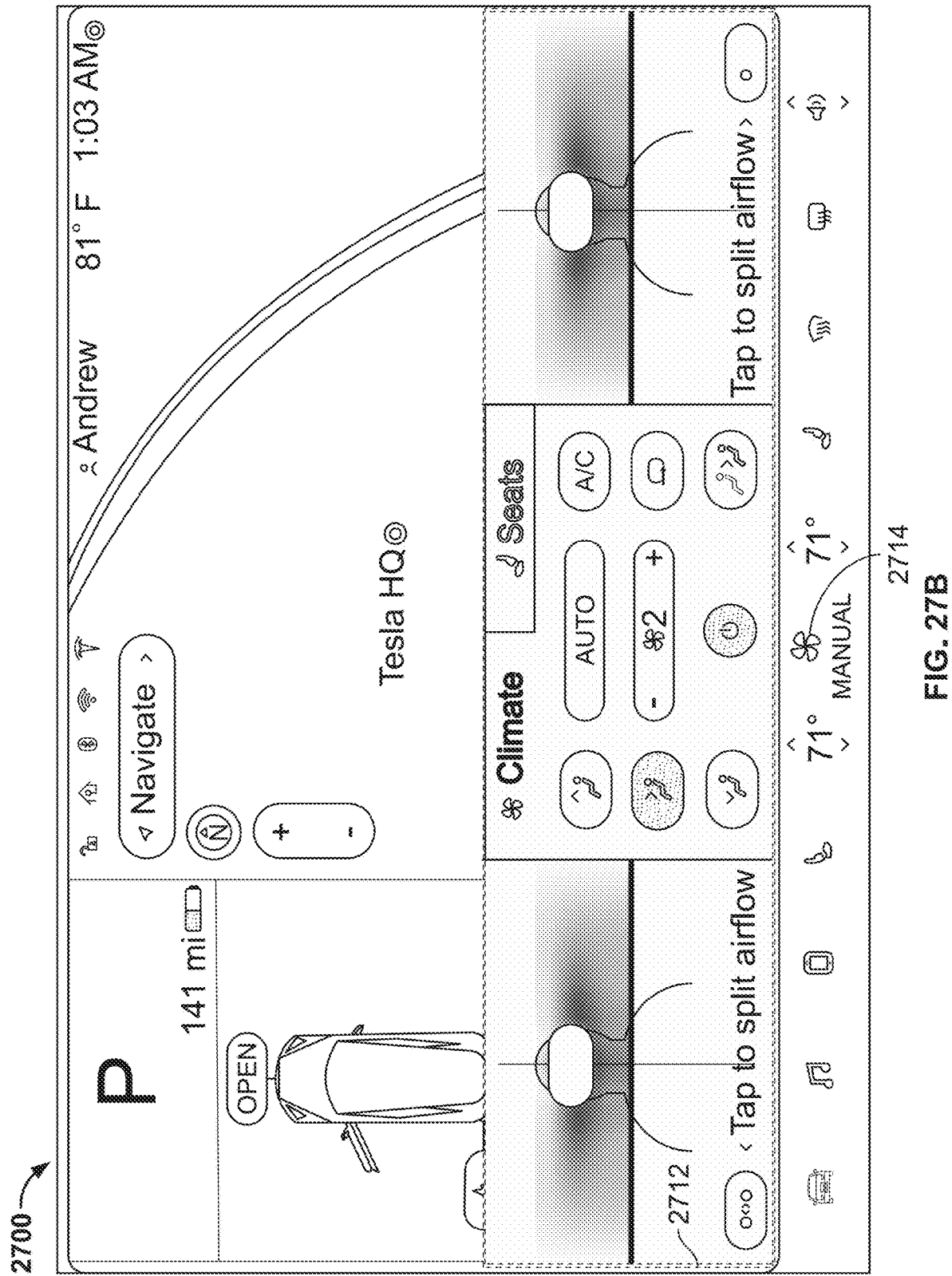
FIG. 27B is a diagram illustrating an embodiment of a user interface that includes a climate control setting interface.

FIG. 27B is a diagram illustrating an embodiment of a user interface that includes a climate control setting interface. The example shown in FIG. 27B is merely one example of various different embodiments. In other embodiments, other display regions, information, configurations, menus, buttons, and icons may be provided. In some embodiments, one or more elements shown in the example of FIG. 27B are not included. Icon 2714 may be selected to display to hide climate control configuration display region 2712. For example, when invoked via icon 2714, climate control configuration display region 2712 is overlaid over at least a portion of regions 2702, 2708, and 2706 of user interface 2700 above persistent region 2710 shown in FIG. 27A. Components of climate control configuration display region 2712 will be further described later in this specification.

Figure 27C:
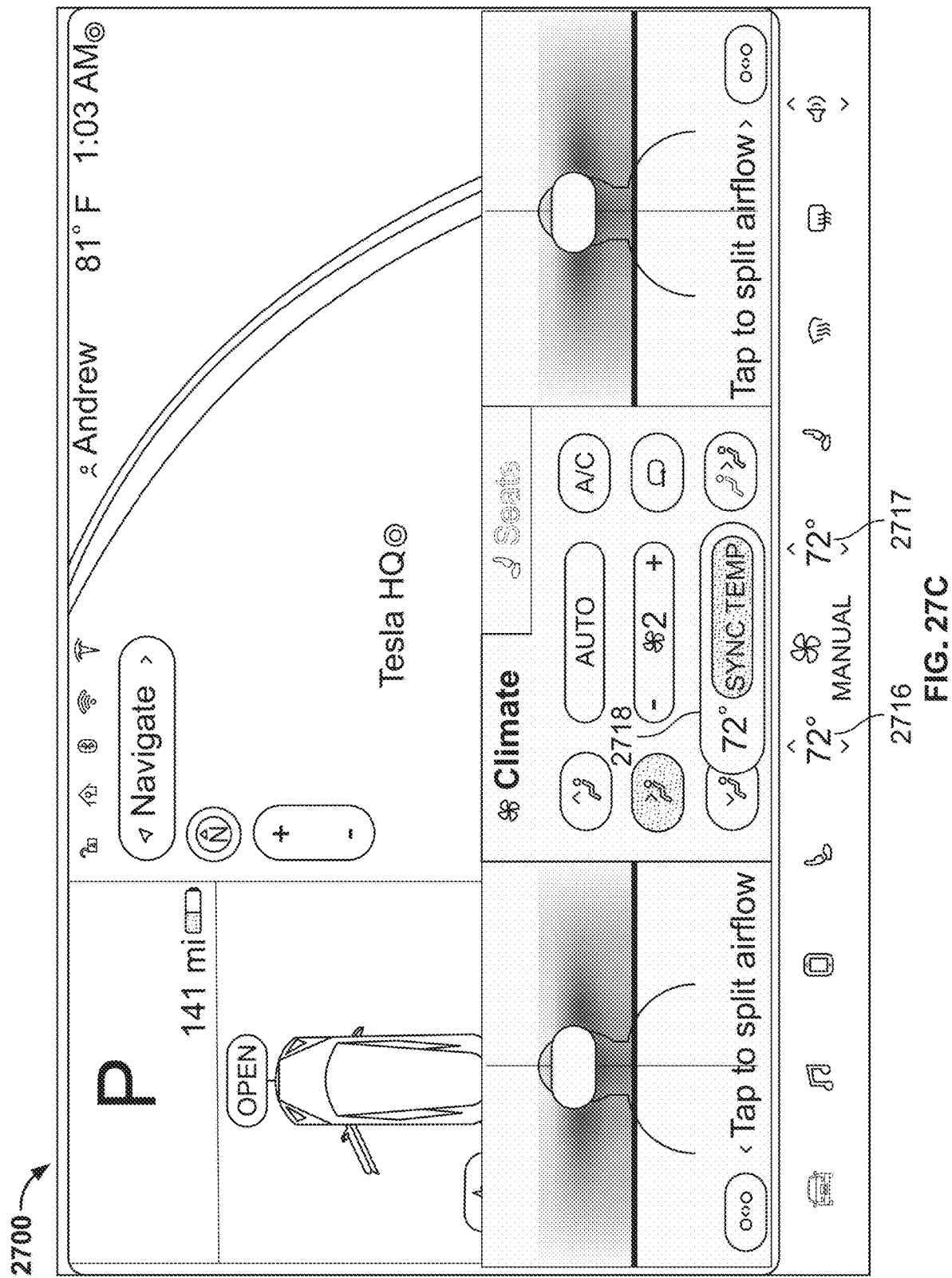
FIG. 27C is a diagram illustrating an embodiment of a user interface for specifying a climate control temperature.

FIG. 27C is a diagram illustrating an embodiment of a user interface for specifying a climate control temperature. The example shown in FIG. 27C is merely one example of various different embodiments. In other embodiments, other display regions, information, configurations, menus, buttons, and icons may be provided. In some embodiments, one or more elements shown in the example of FIG. 27C are not included. Element 2716 displays a current set desired climate temperature for a driver zone of a vehicle cabin. An HVAC system, when operational, functions (e.g., either heat or cool) to maintain this temperature within the driver zone. The up and down arrows above the displayed temperature value of element 2716 can be selected correspondingly to increase or decrease the set desired temperature. When either the up or down arrow of element 2716 is selected, overlaid pop up element 2718 is displayed. After a period of time has passed since the selection of the up or down arrow of element 2716, pop up element 2718 disappears. Pop up element 2718 displays the corresponding set temperature as well as a button that can be selected to link together the set temperature of the driver zone with a front passenger zone of the vehicle cabin. If the "SYNC TEMP" is not in the selected state, a set temperature for the front passenger zone of the vehicle cabin can be independently set from the driver zone. Element 2717 displays a current set desired climate temperature for the front passenger zone of the vehicle cabin. The up and down arrows above the displayed temperature value of element 2717 can be selected correspondingly to increase or decrease the set desired temperature for the front passenger zone.

FIG. 28 is a diagram illustrating an embodiment of a user interface for specifying climate control settings. In some embodiments, the elements shown in FIG. 28 are included in region 2712 of FIG. 27B. In some embodiments, the elements shown in FIG. 28 are displayed on the user interface 206 of FIG. 2 in response to the user having previously selected the HVAC menu option 202c listed in the high-level menu options 202 from FIG. 2. In some embodiments, FIG. 28 is an alternative embodiment of the user interface shown in FIG. 3. In some embodiments, the elements shown in FIG. 28 are displayed on a touchscreen display coupled to (e.g., placed in the middle of) a vehicle dash console. The example shown in FIG. 28 is merely one example of various different embodiments. In other embodiments, other display regions, information, configurations, menus, buttons, and icons may be provided.

Region 2820 of the shown graphical user interface can be used to specify a desired direction/location of climate control airflow for a driver side vent or a group of one or more interacting driver side vents, and region 2824 of the shown graphical user interface can be used to specify a desired direction/location of climate control airflow for a front passenger vent or a group of one or more interacting front passenger vents. For example, rather than physically moving a knob on a vent, a direction of air coming from one or more vents facing a driver can be set by dragging a movable element in region 2820. In response, the mechanical configuration of the climate control system is automatically modified to achieve the specified direction/location of airflow. Similarly, a direction of air coming from one or more vents facing a front passenger can be set by dragging a movable element in region 2824

Region 2822 of the shown graphical user interface includes buttons and tabs that can be selected to specify desired climate control settings. Tab 2826 has been selected to display the buttons shown in FIG. 28. Selection of tab 2828 causes the interface element shown in FIG. 29 to be displayed in region 2822.

Selections of button 2832 can be used to toggle between automatic climate control mode (e.g., automatically control airflow fan speed, air conditioning/heat setting, and which vents are active) and manual climate control mode. Button 2830 can be used to turn windshield vents on or off. Button 2836 can be used to turn face-level vents on or off. Button 2842 can be used to turn foot-level vents on or off. The "+" and "−" sections on element 2840 can be selected to correspondingly increase or decrease airflow fan speed intensity level. The current fan speed intensity level number is indicated on element 2840. Button 2844, when selected, turns off the climate control system. For example, when button 2844 is selected, the climate control user interface elements shown in FIG. 28 (e.g., elements in region 2712 of FIG. 27B) disappear, and button 2714 shown in FIG. 27B can be selected to turn on the climate control system and bring back and display the climate control user interface elements shown in FIG. 28. Button 2834 can be used to toggle air conditioning on and off. Button 2838 can be used to toggle air recirculation on and off. Button 2846 can be used to toggle air flow to rear cabin on and off.

Figure 29:
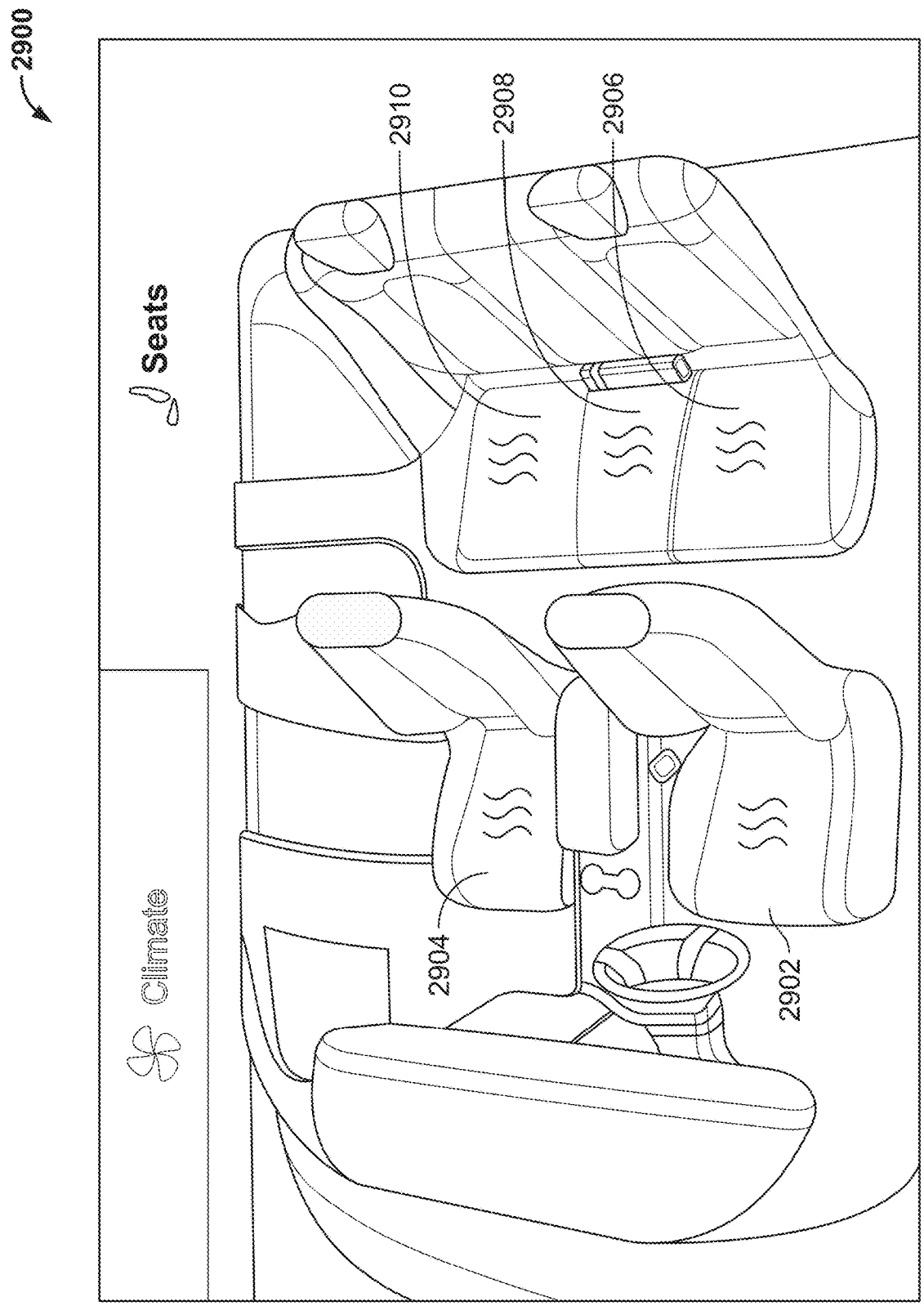
FIG. 29 is a diagram illustrating an embodiment of a user interface for specifying seat heating settings.

FIG. 29 is a diagram illustrating an embodiment of a user interface for specifying seat heating settings. The example shown in FIG. 29 is merely one example of various different embodiments. In other embodiments, other display regions, information, configurations, menus, buttons, and icons may be provided. In some embodiments, user interface 2900 is displayed in region 2822 when tab 2828 is selected in the embodiment shown in FIG. 28. To turn on/off and adjust the intensity of the heating of a seat, the corresponding graphical representation of the desired seat can be selected. Three levels of intensity and the "off" setting are cycled through upon each selection of the corresponding seat. The current seat heater intensity for each seat is shown via shading/coloring of corresponding three twisting lines. The number of twisting lines that are colored (as opposed to greyed out) corresponds to the seat heater intensity level from 3 (highest) to 1 (lowest). When none of the twisting lines are colored (i.e., all greyed out), the heater for the corresponding seat is off. Twisting lines 2902 indicate the current seat heat intensity level for the driver seat. Twisting lines 2904 indicate the current seat heat intensity level for the front passenger seat. Twisting lines 2906 indicate the current seat heat intensity level for the rear left passenger seat. Twisting lines 2908 indicate the current seat heat intensity level for the rear center passenger seat. Twisting lines 2910 indicate the current seat heat intensity level for the rear right passenger seat. Any of twisting lines 2902, 2904, 2906, 2908, and 2910 can be selected via a touch input to cycle between various different heat intensities for the corresponding seat.

FIGS. 30A-30E are diagrams illustrating embodiments of user interfaces for specifying direction/location of airflow. For example, direction/location of airflow from a certain vent or a certain group of one or more interacting vents (e.g., main vent and associated bleed vent that work together to create a combined airstream) is controlled using the graphical user interfaces shown in the embodiments of FIGS. 30A-30E. In some embodiments, one or more of the elements shown in FIGS. 30A-30E are included in region 2712 of FIG. 27B. In some embodiments, one or more of the elements shown in FIGS. 30A-30E are included in region 2820 of FIG. 28. A second vent or a second group of one or more interacting vents may be controlled using a second concurrently shown interface (e.g., interface shown in region 2824 of FIG. 28) that may function in the same or similar manner to the embodiments above and described along with FIGS. 30A-30E. In some embodiments, one or more of the elements shown in FIGS. 30A-30E are displayed on a touchscreen display coupled to a vehicle dash console and a user interacts with the elements via a touch input. The examples shown in FIGS. 30A-30E are merely some examples of various different embodiments. In other embodiments, other display regions, information, configurations, menus, buttons, and icons may be provided.

Oval element 3002 can be used to specify a desired direction/location of concentrated airflow from a vent or a group of one or more interacting vents. For example, rather than physically moving a knob on a vent, a new desired direction of air coming from one or more vents in front of a user can be set by dragging oval element 3002 (e.g., via touch input) to a new location or by directly selecting (e.g., touching) a new location to indicate the desired direction/location of concentrated air flow. The location where oval element 3002 can be placed is confined within the boundary of user interface region 3000 that represents the allowed directions/locations of concentrated air flow from one or more corresponding air vents.

Each different location of oval element 3002 within region 3000 may correspond to a different mechanical configuration of the described climate control system to achieve the desired concentrated airflow at the direction/location of the vehicle cabin corresponding to the location of oval element 3002 within region 3000. In some embodiments, the horizontal location component of a location of oval element 3002 within region 3000 controls the flow guiding position (e.g., position of the first set of flow-guiding vanes 120a and the second set of flow-guiding vanes 120b shown in FIGS. 4-13) of vanes of an air vent. For example, moving oval element 3002 left or right within region 3000 causes vanes of the air vent to turn correspondingly in magnitude left or right (e.g., see examples in FIGS. 8-12). In some embodiments, a degree of rotation of flow-guiding vanes is automatically controlled via an actuator/motor (e.g., actuator 458 shown in FIGS. 4, 5, and 7) and different possible horizontal locations of oval element 3002 within region 3000 map to different rotational positions of the actuator corresponding to the different degrees of rotation of the flow-guiding vanes. When a user indicates a new location for oval element 3002 and the new location is received at a processor, a horizontal component (e.g., x-coordinate) of the new location in region 3000 may be mapped (e.g., using a data structure) to a specific corresponding rotational position of an actuator controlling positions of vanes and an instruction/signal is sent to cause the actuator to be placed in the corresponding determined rotational position.

In some embodiments, the vertical location component of a location of oval element 3002 within region 3000 controls an interaction between different streams (e.g., planes) of air to control a vertical flow direction of the combined air (e.g., control different relative strengths of air streams from vents 1508 and 1510 shown in FIG. 15, vents 1616 and 1614 of FIGS. 16-19, vents 2006 and 2008 of FIG. 20 and/or vents 2504 and 2506 of FIG. 25). Increasing the flow through a bleed vent interacting with a main vent can raise a combined air stream, and decreasing the flow can lower the combined air stream. For example, moving oval element 3002 up or down within region 3000 causes relative strengths of interacting streams of air from a plurality of different vents to be adjusted to move the combined airstream correspondingly up or down (e.g., see examples in FIGS. 15-26). In some embodiments, relative strengths of interacting air streams are controlled by controlling relative positions of airflow channel doors/dampers (e.g., panel door 1608 and bleed door 1610) and the positions of the airflow channel doors/dampers are controlled via one or more actuators/motors. Different possible vertical locations of oval element 3002 within region 3000 may map to different rotational positions of one or more actuators controlling the amount of opening of doors/dampers of air channels of vents. When a user indicates a new location for oval element 3002 and the new location is received at a processor, a vertical component of the new location (e.g., y-coordinate) in region 3000 may be mapped (e.g., using a data structure) to a specific corresponding rotational position of one or more actuators controlling positions and amount of opening of doors/dampers and an instruction/signal is sent to cause the one or more actuators to be placed in the corresponding rotational position(s).

Horizontal line 3004 and vertical line 3006 (e.g., in the middle of region 3000 horizontally/vertically) divide region 3000 and serve as reference marker lines that stay fixed in region 3000 as oval element 3002 is placed/moved/dragged within region 3000. In effect, horizontal line 3004 and vertical line 3006 form a grid to guide a user in placing oval element 3002 at a precise desired location within region 3000. Horizontal line 3004 is shown as thicker than vertical line 3006 and may serve to convey a horizontal functional shape (and associated generally horizontal airflow pattern) of one or more vents being controlled via the shown interface.

Figure 30A:
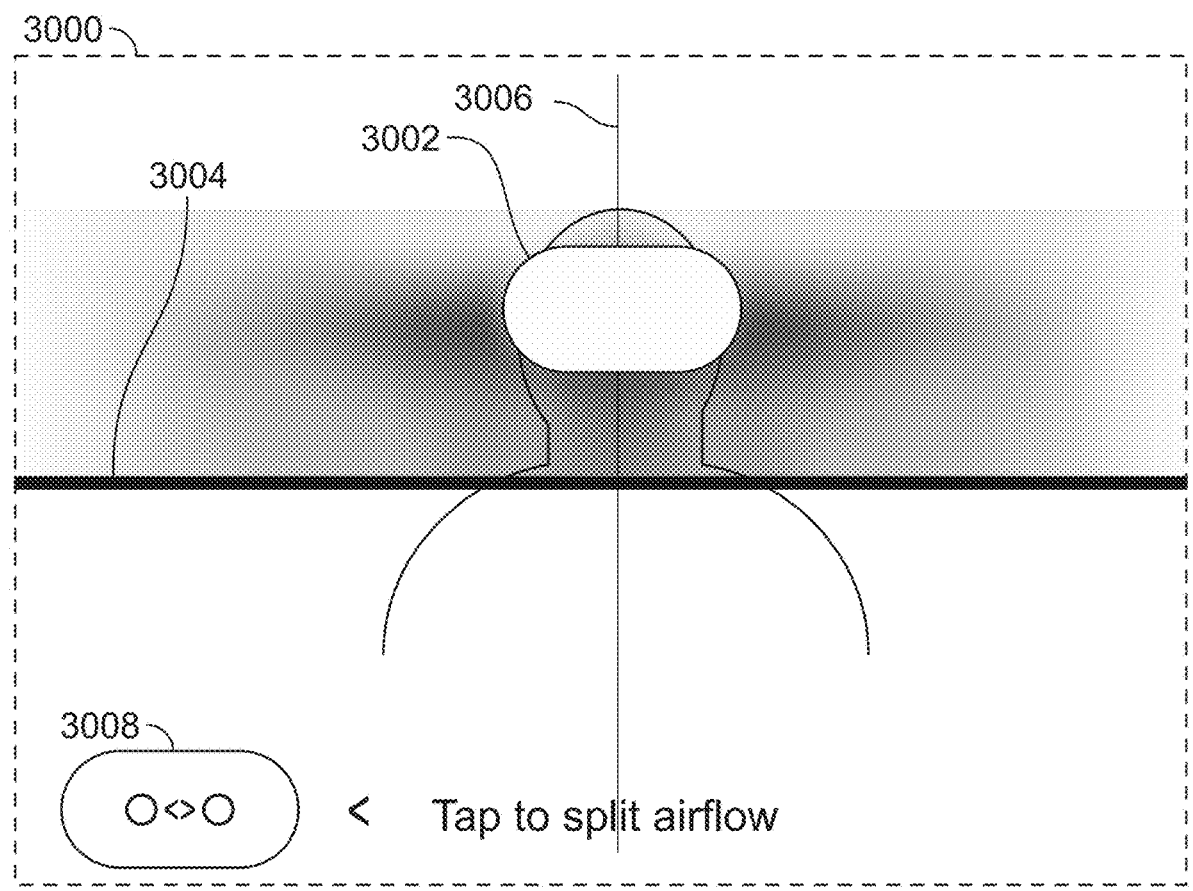
FIGS. 30A-30E are diagrams illustrating embodiments of user interfaces for specifying direction/location of airflow.
Figure 30B:
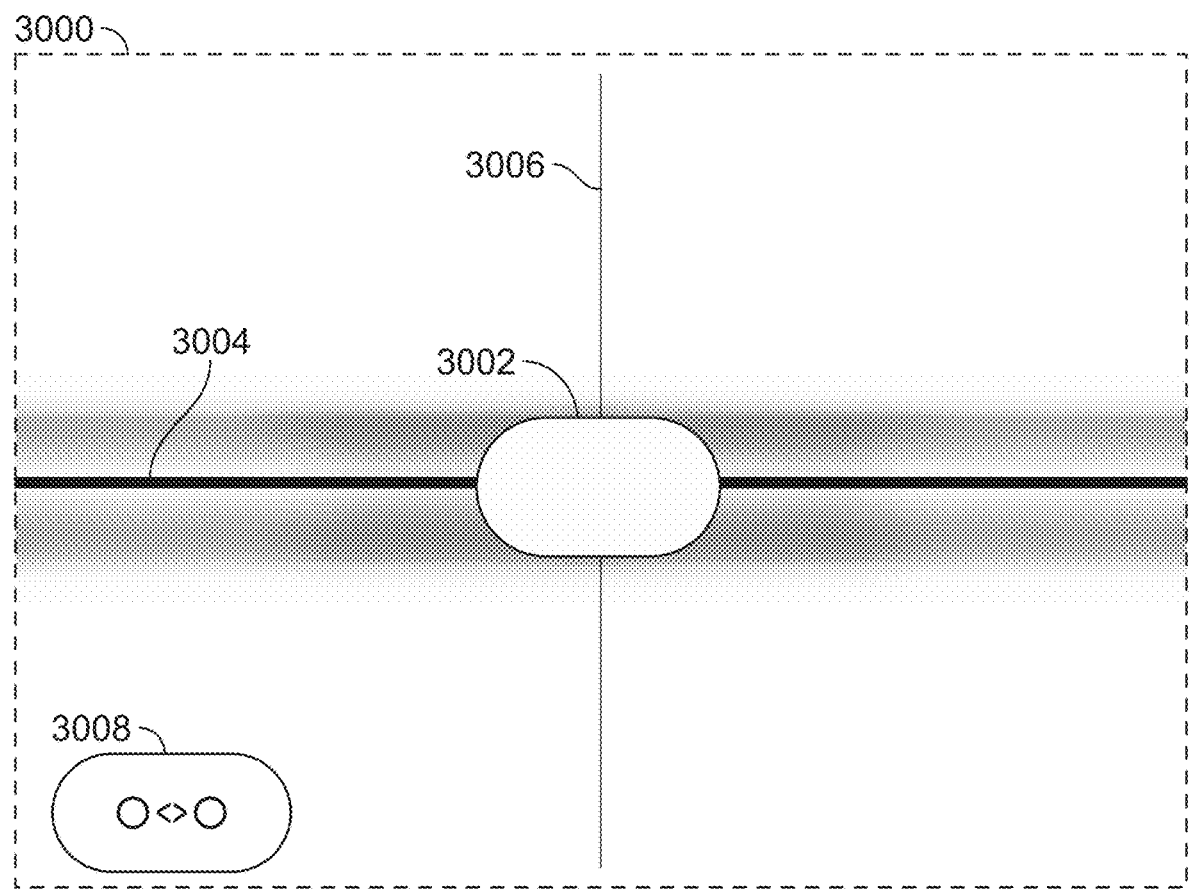

In addition to lines 3004 and 3006, a silhouette of a person/seat is shown in region 3000 of FIG. 30A, allowing a user to visualize relative location of horizontal line 3004, vertical line 3006, and oval element 3002 with respect to a person seated in the seat. In some embodiments, this silhouette of the person/seat is shown when region 3000 is invoked to be displayed (e.g., when icon 2714 of FIG. 27B is selected) but when a user interacts with region 3000 (e.g., via a touch input), the silhouette disappears, providing a more clean and decluttered interface to better visualize other elements. For example, once a user interacts with a touchscreen displaying the user interface of FIG. 30A to move oval element 3002 to a new location shown in FIG. 30B, the silhouette of the person/seat disappears, as shown in FIG. 30B. Button 3008 splits element 3002 (and corresponding concentrated airflow) into two different elements, allowing direction of concentrated airflow to be split in two different directions. Identification that selection of button 3008 splits airflow is provided in region 3000 by the text "Tap to split airflow." Like the silhouette of the person/seat, this text is shown when region 3000 is invoked to be displayed (e.g., when icon 2714 of FIG. 27B is selected) but when a user interacts with region 3000 (e.g., via a touch input), the text disappears, providing a more clean and decluttered interface to better visualize other visual elements. For example, once a user interacts with a touchscreen displaying the user interface of FIG. 30A to move oval element 3002 to a new location shown in FIG. 30B, this text disappears, as shown in FIG. 30B.

Given the air vents described in the embodiments herein that output air in a flow pattern that a user may not be traditionally familiar with, region 3000 indicates the expected airflow intensity for directions/locations surrounding the indicated direction/location of concentrated airflow (e.g., based on location of oval element 3002 within region 3000). For example, oval element 3002 identifies the direction/location of the strongest concentrated airflow from one or more air vents facing a user. However, because airflow from the vent(s) diffuses as it travels, the direction/location of airflow is not restricted to the specific direction/spot corresponding to the location of the oval element 3002. As shown in FIGS. 30A-30E, the relative intensities of airflow surrounding the indicated directions/locations of concentrated airflows are visually indicated using a gradient shading in the appropriate corresponding locations in region 3000. Denser gradient indicates a stronger airflow intensity at the corresponding direction/location. The color of the gradient shading may indicate whether the output air is heated or cooled. For example, the gradient shading is colored blue if the corresponding air output is cooled (e.g., air conditioned) or not heated and the gradient shading is colored red/orange if the corresponding air output is heated.

Figure 30C:
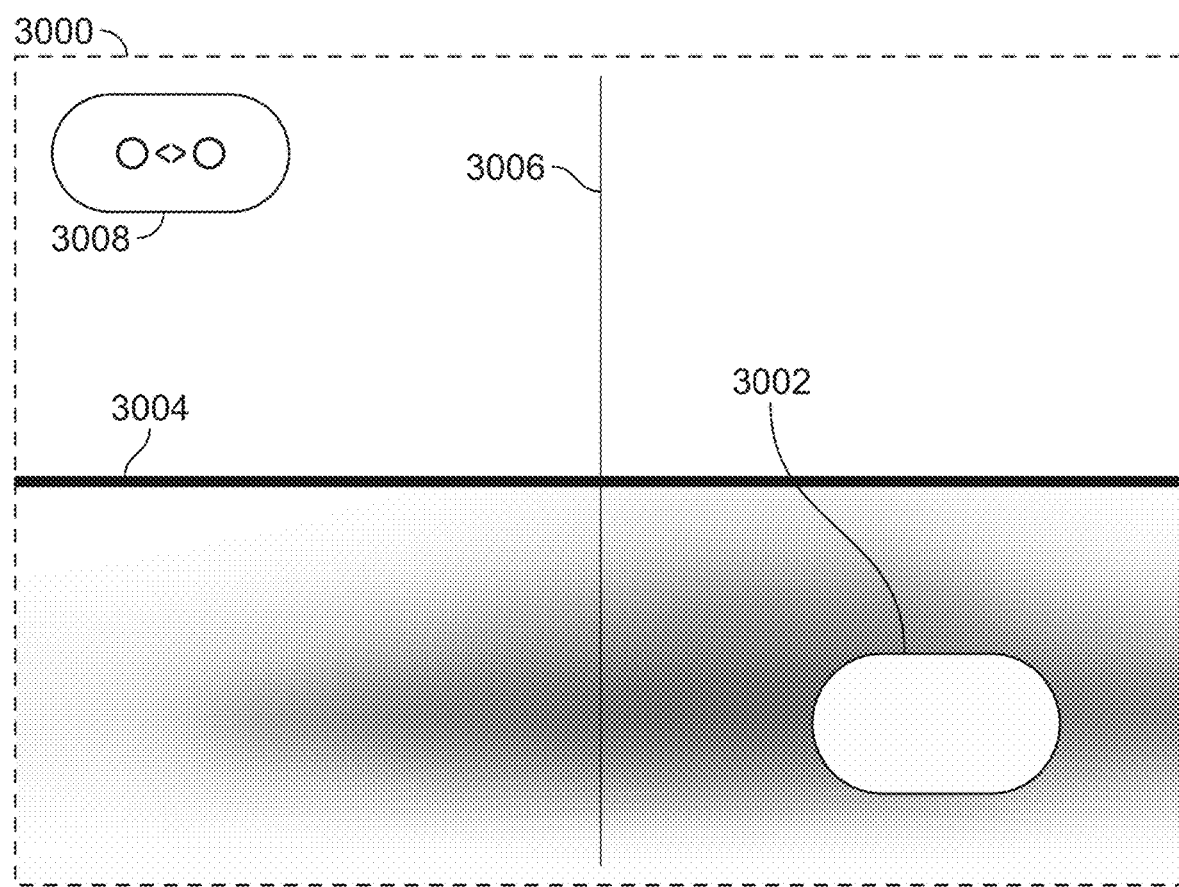

Not only does the relative location of the diffusion flow intensity pattern of airflow depend on the specified direction/location of the central concentration of airflow, the shape, width, and/or length of the flow intensity pattern may vary based on the specified direction/location of central concentration of airflow (e.g., due to the shape and mechanics of the air vents, vanes, and/or air channels of various embodiments described herein). FIGS. 30A-30C show different example locations of oval element 3002 and the corresponding different gradient shading visualizing the corresponding diffused airflow intensity pattern.

In some embodiments, when an indication of a new location of oval element 3002 within region 3000 is received, a gradient shading visualization of the flow intensity pattern of the diffused airflow corresponding to the new location is determined (e.g., using a predetermined mapping between location of oval element 3002 to the corresponding gradient shading visualization or a calculation/model that outputs the parameters of the corresponding gradient shading visualization based on the location of element 3002) and provided for display in region 3000.

Because button 3008 is placed within region 3000, button 3008 may obscure the gradient shading visualization. In some embodiments, based on a location of oval element 3002, location of button 3008 is moved to not obscure the gradient shading visualization. For example, button 3008 is at a first location within region 3000 if a vertical location component of oval element 3002 is within a first range and button 3008 is at a second location within region 3000 if the vertical location component of oval element 3002 is within a second range. FIG. 30A shows button 3008 at a first position and FIG. 30C shows button 3008 at a second position as to not obscure the corresponding gradient shading visualizations.

Selection of button 3008 on the interface of FIG. 30A causes the climate control system to enter a mode where the concentrated stream of air from a vent of a group of one or more interacting vents facing a user is split into two different directions. FIGS. 3D-3E show interfaces that are used to visualize and control the split concentrated streams of airflow. Rather than providing oval element 3002 of FIGS. 30A-30C corresponding to a single desired concentrated airflow direction/location, oval element 3002 has been effectively split into two different circle elements 3010 and 3012. Circle elements 3010 and 3012 are each smaller than oval element 3002 to visually indicate the relatively lower volume of air corresponding to each different circle element (e.g., due to splitting of airflow). In this split airflow mode, the graphic on button 3008 shown in FIGS. 3D and 3E has been updated to indicate that selection of button 3008 causes the split airflow to be joined together (exit the split airflow mode), returning to the combined flow mode shown in FIGS. 30A-30C. Thus button 3008 can be used to toggle between the split airflow mode and combined airflow mode.

Circle elements 3010 and 3012 can be used to specify desired directions/locations of two different concentrated airflows from the same vent or the same group of one or more interacting vents (e.g., common stream of air from a vent has been split into two different directions). Locations where circle element 3010 can be placed within region 3000 are confined/limited within the left half of region 3000 (e.g., left of vertical line 3006), and locations where circle element 3012 can be placed are confined within the right half of region 3000 (e.g., right of vertical line 3006). In some embodiments, circle element 3010 may be moved (e.g., dragged via touch input or instantly moved to selected touch input location) within region 3000 independently from circle element 3012. In some embodiments, movement of circle element 3010 or circle element 3012 within region 3000 causes other circle elements to move correspondingly due to physical limitations of the climate control vent system. Circle elements 3010 and 3012 may be required to be at the same vertical location because the airflow from the group of one or more interacting vents is unable to be split vertically in two different directions. For example, movement of circle element 3010 within region 3000 causes element 3012 to also automatically move in unison to the same vertical location, and vice versa. In some embodiments, horizontal location of circle element 3010 is mirrored about vertical line 3006 with the horizontal location of circle element 3012 such that a horizontal distance between circle element 3010 and vertical line 3006 is the same as a horizontal distance between circle element 3012 and vertical line 3006. For example, movement of circle element 3010 or 3012 towards vertical line 3006 causes the other circle element to move horizontally in unison towards vertical line 3006 and movement of circle element 3010 or 3012 away from vertical line 3006 causes the other circle element to move horizontally in unison away from vertical line 3006.

Each different possible location combination of circle elements 3010 and 3012 within region 3000 may correspond to a different mechanical configuration of the climate control system described herein to achieve the desired split concentrated airflows at the desired directions/locations within the vehicle cabin corresponding to the locations of circle elements 3010 and 3012 within region 3000. In some embodiments, the horizontal location components of locations of circle elements 3010 and 3012 within region 3000 control flow guiding positions of vanes of an air vent (e.g., position of the first set of flow-guiding vanes 120*a* of FIG. 13 corresponds to the location circle element 3010 and position of the second set of flow-guiding vanes 120*b* corresponds to the location of circle element 3012 shown in FIG. 13). For example, when in split flow mode, vanes of the air vent are placed in the split flow-guiding position where a first group of vanes is oriented in one direction while a second group of vanes are oriented in another direction. Despite being at different orientations, the orientation of the second group of vanes may be tied to the orientation of the first group of vanes, allowing a single actuator to control in unison both the first and second groups of vanes oriented in different directions.

In some embodiments, degrees of rotations of different groups of flow-guiding vanes are controlled via an actuator/motor (e.g., actuator 458 shown in FIGS. 4, 5, and 7) and different possible horizontal locations of circle elements 3010 and 3012 within region 3000 map to different rotational positions of the actuator corresponding to the different degrees of rotations of the different groups of flow-guiding vanes. When a user indicates new locations for circle elements 3010 and 3012, the new locations are received at a processor, and a horizontal component of the new locations in region 3000 may be mapped (e.g., using a data structure) to a specific corresponding rotational position of an actuator controlling positions of vane groups and an instruction/signal is sent to cause the actuator to be placed in the corresponding determined rotational position.

In some embodiments, much like oval element 3002, the vertical location components of locations of circle elements 3010 and 3012 within region 3000 control an interaction between different streams (e.g., planes) of air to control a vertical flow direction of the combined airstream (e.g., control different relative strengths of air streams from vents 1508 and 1510 shown in FIG. 15, vents 1616 and 1614 of FIGS. 16-19, vents 2006 and 2008 of FIG. 20 and/or vents 2504 and 2506 of FIG. 25). Different possible vertical locations of circle elements 3010 and 3012 within region 3000 may map to different rotational positions of one or more actuators controlling amounts of opening of air channel doors/dampers. When a user indicates new locations for circle elements 3010 and 3012 and the new locations are received at a processor, a vertical component of the new locations in region 3000 may be mapped (e.g., using a data structure) to a specific corresponding rotational position of one or more actuators controlling positions and amount of opening of channel doors/dampers and an instruction/signal is sent to cause the one or more actuators to be placed in the corresponding determined rotational position(s).

Figure 30D:
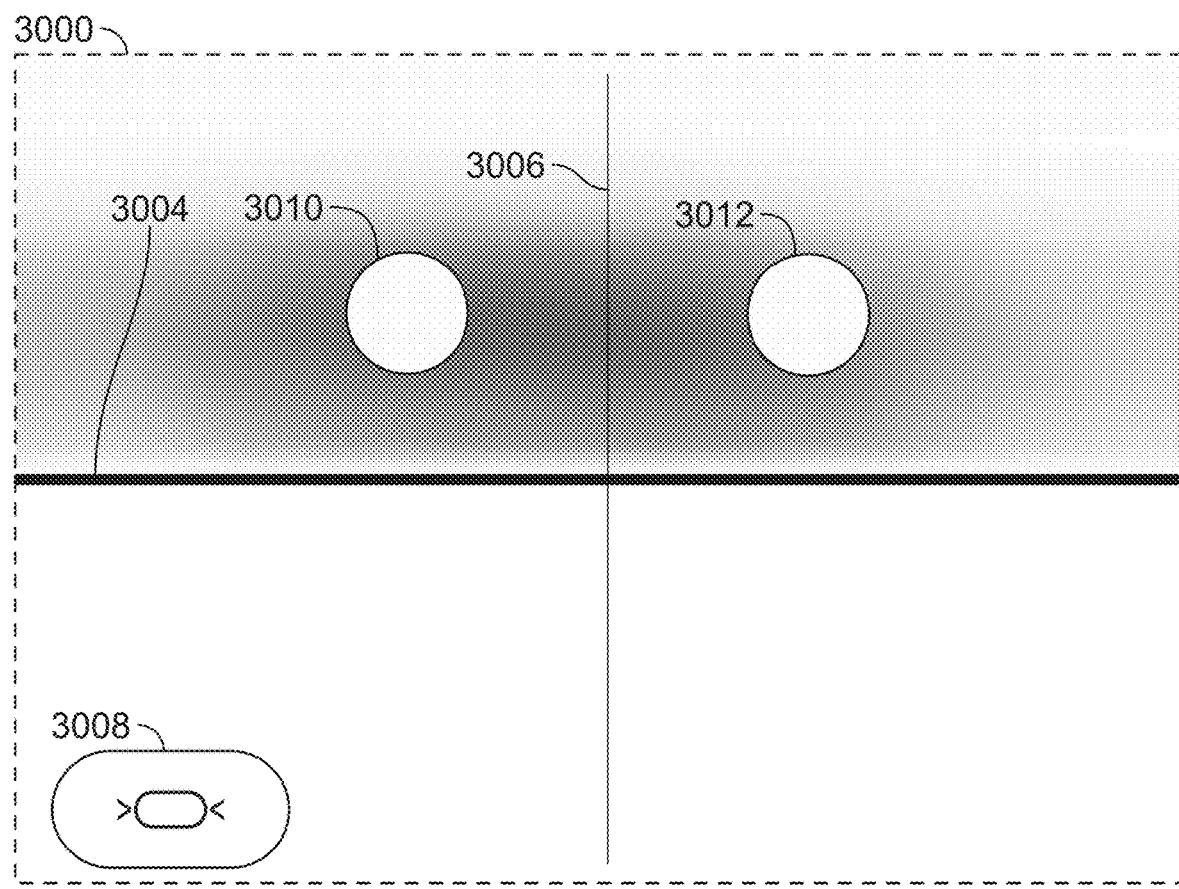
Figure 30E:
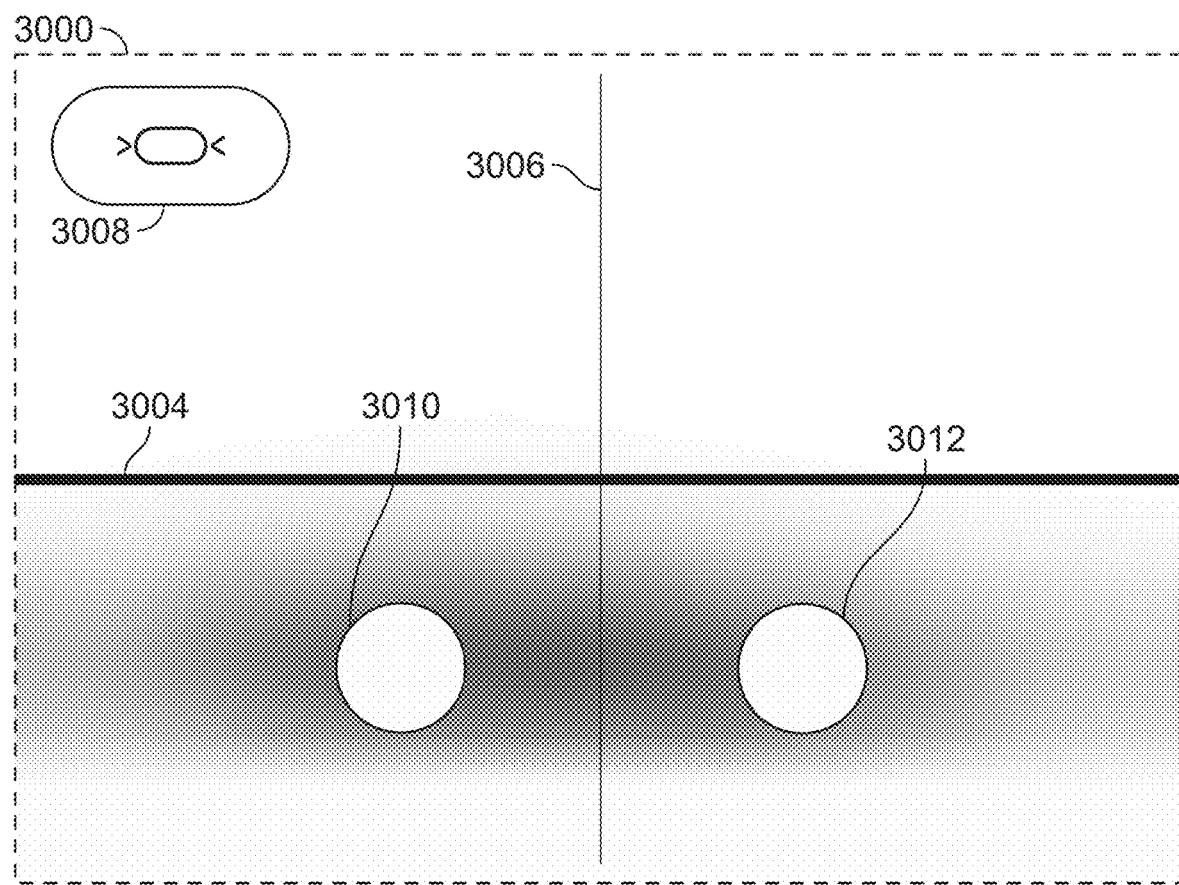

FIGS. 30D-30E show different example locations of circle elements 3010 and 3012 and the corresponding different gradient shadings visualizing the corresponding flow intensity pattern of diffused airflow. In some embodiments, when an indication of new locations of circle elements 3010 and 3012 within region 3000 is received, a gradient shading visualization of the flow intensity pattern of airflow corresponding to the new locations is identified (e.g., using a predetermined mapping between locations of elements 3010 and 3012 to the corresponding gradient shading visualization or a calculation/model that outputs the parameters of the corresponding gradient shading visualization based on circle element locations) and provided for display in region 3000. Because button 3008 is placed within region 3000, button 3008 may obscure the gradient shading visualization. In some embodiments, based on locations of circle elements 3010 and 3012, the location of button 3008 is moved to not obscure the gradient shading visualization. For example, button 3008 is at a first location within region 3000 if a vertical location component of circle elements 3010 and 3012 is within a first range and button 3008 is at a second location within region 3000 if the vertical location component of circle elements 3010 and 3012 is within a second range. FIG. 30D shows button 3008 at a first position and FIG. 30E shows button 3008 at a second position as to not obscure the corresponding gradient shading visualizations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
providing a first moveable graphical user interface object, wherein the first moveable graphical user interface object is moveable within a bounded graphical region, wherein a location of the first moveable graphical user interface object in the bounded graphical region corresponds to a first direction of concentrated airflow from a set of vanes of an air vent, wherein the bounded graphical region comprises a plurality of display regions, wherein each display region dynamically changes between an active display region and an inactive display region based on the location of the first moveable graphical user interface object, wherein a particular display region of the plurality of display regions is the active display region when the location of the first moveable graphical user interface object is within the particular display region;
receiving, via an airflow control graphical user interface object in the bounded graphical region, a user indication to split the concentrated airflow into a plurality of different directions, wherein a location of the airflow control graphical user interface object within the bounded graphical region dynamically changes so as to be located in the inactive display region of the plurality of display regions; and responsive to said receiving the user indication, replacing the first moveable graphical user interface object with a plurality of additional moveable graphical user interface objects, wherein a location of a first object of the plurality of additional moveable graphical user interface objects in the bounded graphical region corresponds to a direction of concentrated airflow from a first group of vanes of the set of vanes, and wherein a location of a second object of the plurality of additional moveable graphical user interface objects in the bounded graphical region corresponds to a direction of concentrated airflow from a second group of vanes of the set of vanes.

2. The method of claim 1, wherein vertical locations of the plurality of additional moveable graphical user interface objects within the bounded graphical region are linked to each other.

3. The method of claim 1, wherein a horizontal movement of one of the plurality of additional moveable graphical user interface objects causes a mirrored horizontal movement of another one of the plurality of additional moveable graphical user interface objects.

4. The method of claim 1, further comprising, in response to the user indication, actuating an actuator to move the first group of vanes to a first orientation and move the second group of vanes to a second orientation.

5. The method of claim 1, wherein the user indication is a first user indication, the method further comprising receiving, via the airflow control graphical user interface object, a second user indication to combine the plurality of different directions into a combined direction of concentrated airflow.

6. The method of claim 1, wherein the first moveable graphical user interface object has a first size, wherein each of the plurality of additional moveable graphical user interface objects has a second size, wherein the second size is less than the first size.

7. The method of claim 1, wherein the first moveable graphical user interface object has a first shape, wherein each of the plurality of additional moveable graphical user interface objects has a second shape, wherein the second shape is different than the first shape.

8. The method of claim 1, wherein the location of the airflow control graphical user interface object within the bounded graphical region is dynamically based at least in part on at least one of the location of the first object of the plurality of additional moveable graphical user interface objects in the bounded graphical region or the location of the second object of the plurality of additional moveable graphical user interface objects in the bounded graphical region.

9. The method of claim 1, wherein the particular display region of the plurality of display regions is the inactive display region when the location of the first moveable graphical user interface object is not within the particular display region.

10. A method, comprising:
providing a first moveable graphical user interface object, wherein the first moveable graphical user interface object is moveable within a bounded graphical region, wherein a first location of the first moveable graphical user interface object in the bounded graphical region corresponds to first direction of concentrated airflow, wherein the bounded graphical region includes a visual indication of a diffused airflow pattern corresponding to the first direction of concentrated airflow, wherein the bounded graphical region comprises a plurality of display regions;
receiving, via an airflow control graphical user interface object in the bounded graphical region, a user indication to direct the concentrated airflow into a plurality of different directions, wherein a location of the airflow control graphical user interface object is based on a location of the visual indication of a diffused airflow pattern, wherein the location of the airflow control graphical user interface object dynamically changes such that the airflow control graphical user interface and visual indication of the diffused airflow pattern are located in different display regions of the plurality of display regions at all times; and
based on said receiving the user indication, replacing the first moveable graphical user interface object with a plurality of additional moveable graphical user interface objects, wherein locations of the plurality of additional moveable graphical user interface objects in the bounded graphical region correspond to the plurality of different directions of the concentrated airflow.

11. The method of claim 10, wherein the visual indication of the diffused airflow pattern includes a gradient shading.

12. The method of claim 10, wherein a color of the visual indication indicates whether the concentrated airflow has been heated.

13. The method of claim 10, wherein vertical locations of the plurality of additional moveable graphical user interface objects within the bounded graphical region are linked to each other.

14. The method of claim 10, wherein a horizontal movement of at least one of the plurality of additional moveable graphical user interface objects causes a mirrored horizontal movement of at least one other one of the plurality of additional moveable graphical user interface objects.

15. A method, comprising:
providing a first moveable graphical user interface object, wherein the first moveable graphical user interface object is moveable within a bounded graphical region, wherein a location of the first moveable graphical user interface object in the bounded graphical region corresponds to a first direction of concentrated airflow and a first climate control mechanical configuration;
receiving, via an airflow control graphical user interface object in the bounded graphical region, an indication to separate the concentrated airflow into a plurality of directions, wherein the bounded graphical region comprises a plurality of display regions, wherein each display region dynamically changes between an active display region and an inactive display region based on the location of the first moveable graphical user interface object, wherein a location of the airflow control graphical user interface object within the bounded graphical region dynamically changes so as to be located in the inactive display region of the plurality of display region; and
based on said receiving the indication, replacing the first moveable graphical user interface object with a plurality of additional moveable graphical user interface objects, wherein each of the plurality of additional moveable graphical user interface objects corresponds to a different direction of the plurality of directions of the concentrated airflow.

16. The method of claim 15, wherein the bounded graphical region includes a visual representation of at least one of a seat or a person.

17. The method of claim 15, wherein the first moveable graphical user interface object is associated with a first set of one or more vents.

18. The method of claim 15, further comprising, in response to the indication, actuating an actuator to move a first group of vanes of an air vent in a first orientation and move a second group of vanes of an air vent in a second orientation.

19. The method of claim 15, wherein vertical locations of the plurality of additional moveable graphical user interface objects within the bounded graphical region are linked to each other.

20. The method of claim 15, wherein the first moveable graphical user interface object has a first size and a first shape, wherein each of the plurality of additional moveable graphical user interface objects has a second size and a second shape, wherein at least one of the second size is different from the first size or the second shape is different from the first shape.

\* \* \* \* \*